US012539588B2

(12) United States Patent
Moriwaki

(10) Patent No.: US 12,539,588 B2

(45) Date of Patent: Feb. 3, 2026

(54) DRIVING TOOL

(71) Applicant: Max Co., Ltd., Tokyo (JP)

(72) Inventor: Kousuke Moriwaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 37 days.

(21) Appl. No.: 18/393,614

(22) Filed: Dec. 21, 2023

(65) Prior Publication Data

US 2024/0208018 A1 Jun. 27, 2024

(30) Foreign Application Priority Data

Dec. 22, 2022 (JP) ................................ 2022-205695
Dec. 22, 2022 (JP) ................................ 2022-205726
Nov. 13, 2023 (JP) ................................ 2023-192980

(51) Int. Cl.
*B25C 1/00* (2006.01)
*B25C 1/04* (2006.01)

(52) U.S. Cl.
CPC ................ *B25C 1/005* (2013.01); *B25C 1/04* (2013.01)

(58) Field of Classification Search
CPC ............ B25C 1/005; B25C 1/04; B25C 1/003
USPC .......................................................... 227/120
See application file for complete search history.

(56) References Cited

U.S. PATENT DOCUMENTS 4,251,017 A * 2/1981 Doyle ..................... B25C 1/003 227/116
4,319,705 A * 3/1982 Geist ....................... B25C 1/044 91/461
4,600,135 A * 7/1986 Mukoyama ............. B25C 1/003 227/120
4,909,419 A * 3/1990 Yamada .................. B25C 1/045 227/1
5,240,161 A * 8/1993 Kaneko ................... B25C 1/003 227/136
5,297,713 A 3/1994 Perra et al.
5,558,264 A * 9/1996 Weinstein ............... B25C 1/003 227/112
7,225,962 B2 * 6/2007 Porth .................... B25C 5/1627 227/135
7,296,721 B1 * 11/2007 Wen ........................ B25C 1/045 227/8
7,699,201 B2 * 4/2010 Hagan ..................... B25C 1/003 227/135

(Continued)

FOREIGN PATENT DOCUMENTS

JP 5459097 B2 4/2014
JP 5482825 B2 5/2014

OTHER PUBLICATIONS

Apr. 3, 2024—(EP) Extended EP Search Report—EP App 23219251.8.

*Primary Examiner* — Thomas M Wittenschlaeger
*Assistant Examiner* — Katie L Gerth
(74) *Attorney, Agent, or Firm* — Banner & Witcoff, Ltd.

(57) ABSTRACT

There is provided a driving tool including: a magazine configured to accommodate a connected fastener obtained by connecting a plurality of fasteners; an injection passage provided with an injection port for injecting at least one fastener of the plurality of fasteners; and a driving-out portion configured to drive out the fastener supplied to the injection passage from the injection port. The driving-out portion is configured to idle-drive without driving out the fastener from the injection port in a state where the connected fastener is accommodated in the magazine.

19 Claims, 44 Drawing Sheets

(56) References Cited

U.S. PATENT DOCUMENTS

| | | | | |
|---|---|---|---|---|
| 7,866,521 | B2 * | 1/2011 | Gross | B25C 1/001 227/135 |
| 7,950,556 | B2 * | 5/2011 | Hagan | B25C 1/003 227/128 |
| 9,975,229 | B2 * | 5/2018 | Haehndel | B25C 1/003 |
| 11,865,683 | B2 * | 1/2024 | Leathrum | B25C 1/047 |
| 2006/0118596 | A1 * | 6/2006 | Wojcicki | B25C 5/1627 227/138 |
| 2006/0208027 | A1 * | 9/2006 | Hagan | B25C 1/003 227/128 |
| 2021/0347022 | A1 * | 11/2021 | Leathrum | B25C 1/047 |
| 2024/0238955 | A1 * | 7/2024 | Hirooka | B25C 1/003 |

* cited by examiner

DRIVING TOOL

CROSS-REFERENCE TO RELATED APPLICATIONS

This application is based on and claims priority under 35 USC 119 from Japanese Patent Application No. 2022-205726 filed on Dec. 22, 2022, Japanese Patent Application No. 2023-192980 filed on Nov. 13, 2023, and Japanese Patent Application No. 2022-205695 filed on Dec. 22, 2022, the contents of which are incorporated herein by reference.

TECHNICAL FIELD

The present disclosure relates to a driving tool for driving a fastener to a fastening target object.

BACKGROUND ART

A driving tool that injects a fastener such as a screw and a nail includes a magazine that accommodates the fastener. The driving tool has a configuration in which the fastener accommodated in the magazine is supplied to an injection passage provided in a member referred to as a nose portion, and the fastener supplied to the injection passage is driven out by a driver (for example, see JP5482825B2).

When the fastener is driven into a portion harder than other portions depending on a driving target material such as a knot portion of a wooden piece by using the driving tool, the fastener may be lifted. When the fastener driven into the driving target material is further driven in order to drive the lifted fastener to a predetermined depth, a manual hammer is used in the related art. Further, when the driving tool is used, it is necessary to take out fasteners accommodated in the magazine, further drive the fastener driven into the driving target material by idle-driving of the driving tool, and then load the fasteners into the magazine again.

Accordingly, it is desired to develop a driving tool capable of further driving the fastener driven into the driving target material.

In addition, as the driving tool, a tool for driving a fastener such as a nail or a pin to a building member such as a wooden piece, a steel plate, or concrete is widely known. In the driving tool, a driver is driven by using compressed air, gas combustion pressure, a spring force, or the like, and then the fastener is driven by the driver. Further, in a driving tool having a function of automatically feeding a fastener, a next fastener can be set in conjunction with a driving operation, and the fastener can be driven continuously.

For example, the driving tool described in JP5459097B2 is used by accommodating connected fasteners wound in a coil shape in a magazine and setting a leading fastener pulled out from the magazine in an injection passage in a nose portion. When the fastener in the injection passage is driven, a fastener feeding mechanism operates in conjunction with this driving operation, and a next fastener is set in the injection passage.

The fastener feeding mechanism includes a feeding claw and a one-way claw. The feeding claw is engaged with the connected fasteners in the injection passage and can reciprocate in a feeding direction of the fastener. The one-way claw regulates the connected fasteners from returning toward the magazine.

A feeding operation of the fastener feeding mechanism is executed by reciprocating of the feeding claw. That is, the feeding claw moves forward in a state of being engaged with the connected fasteners so as to feed one fastener toward the injection passage. Then, when the feeding claw moves backward, since the one-way claw operates and backward movement of the connected fasteners is prevented, the feeding claw moves backward while pivoting in a manner of avoiding the connected fasteners, and is engaged with a subsequent fastener.

However, in recent years, for the purpose of quake resistance, fire resistance, and fire prevention, laminated veneer lumber (LVL), wood-based adhering-molded shaft materials (PSL, LSL), and the like are frequently used as building materials. Such a wooden piece is manufactured by adhering veneers. However, since the amount of an adhesive for adhering the veneers is not uniform, there is a problem in that a driving depth varies when the fastener is driven. Specifically, since a portion at which the amount of the adhesive is large is harder than other portions, there is a problem that the fastener cannot be deeply driven and the fastener is lifted.

In addition, even for a solid wood material, a knot portion is harder than other portions, and thus the fastener may be lifted.

A general driving tool has a function of adjusting a driving force and a driving amount. Therefore, when the driving force and the driving amount are set to be high, the lifting of the fastener when the fastener is driven into the hard portion can be eliminated. However, when the driving force and the driving amount of the driving tool are set in accordance with the hard portion, there is a possibility that the fastener is driven too deep at other construction positions, and a construction problem such as a reduction in pullout strength resistance of the fastener occurs. Since the hard portion is partial, the energy is excessively consumed at other construction positions, which is not desirable.

Therefore, generally, when the driving force and the driving amount of the driving tool are set in accordance with the portions that are not hard, the fastener is lifted, and the fastener is often manually driven by using a hammer or the like. However, the manual driving of the fastener into the hard portion at which the fastener cannot be driven even by using a machine requires considerable labor.

As a method of driving the lifted fastener with the machine, there is a method of idle-driving the fastener with the driving tool as described above. That is, when the driving tool strikes the lifted fastener in a state in which the fasteners are not loaded, the lifted fastener can be driven by using the machine.

However, there is a problem that an operation of driving all the fasteners loaded in the driving tool or an operation of removing the connected fasteners from the driving tool is necessary in order to perform the idle-driving of the driving tool, which takes time and effort. In addition, the connected fasteners that have been removed once may be deformed, and reloading thereof may be difficult.

Due to the above circumstances, it is desired to develop a driving tool capable of executing the idle-driving without driving all the fasteners loaded in the driving tool or removing the connected fasteners from the driving tool.

SUMMARY OF INVENTION

According to an illustrative aspect of the present disclosure, a driving tool may include: an injection passage provided with an injection port for injecting a fastener; a driving-out portion that drives out the fastener supplied to the injection passage from the injection port; and a retracting portion that retracts the fastener supplied to the injection passage from a portion other than the injection port to the outside of the injection passage, for example.

According to this configuration, when the driving-out portion operates in a state in which the retracting portion retracts the fastener supplied to the injection passage from the injection passage to the outside of the injection passage, a fastener driven into a driving target material is driven by the driving-out portion. In addition, after the fastener driven into the driving target material is further driven, the fastener retracted to the outside of the injection passage is supplied to the injection passage again by the retracting portion, and a state in which a next fastener can be driven is restored.

Therefore, when the retracting portion retracts the fastener supplied to the injection passage, the fastener driven into the driving target material can be further driven by using the driving tool without driving out a fastener by the driving-out portion. In addition, after the fastener driven into the driving target material is further driven, the fastener retracted to the outside of the injection passage can be supplied to the injection passage again by the retracting portion, and the driving tool can be returned to the state in which the next fastener can be driven.

According to another illustrative aspect of the present disclosure, a driving tool may include: a magazine capable of accommodating a connected fastener obtained by connecting a plurality of fasteners; a nose portion in which an injection passage for guiding the injection of the fastener is formed; a supply path that guides the connected fasteners pulled out from the magazine to the injection passage; a feeding portion configured to sequentially supply the fastener from the supply path to the injection passage; and a switcher configured to switch between a feeding-enabled state in which the feeding portion feeds the fastener to the injection passage, and a feeding-disabled state in which the feeding portion does not feed the fastener to the injection passage, for example.

According to this configuration, the driving tool includes the switcher that switches between the feeding-enabled state in which the feeding portion feeds the fastener to the injection passage, and the feeding-disabled state in which the feeding portion does not feed the fastener to the injection passage. Therefore, after the feeding-disabled state is set, the next fastener is not fed to the injection passage when the fastener set in the injection passage is driven out, and thus idle-driving is possible. Therefore, it is possible to execute the idle-driving without driving all the fasteners loaded in the driving tool or removing the connected fasteners from the driving tool.

DESCRIPTION OF EMBODIMENTS

Hereinafter, embodiments of a nail driving machine as an example of a driving tool of the present disclosure according to an aspect of the present disclosure will be described with reference to the drawings.

Figure 1A:
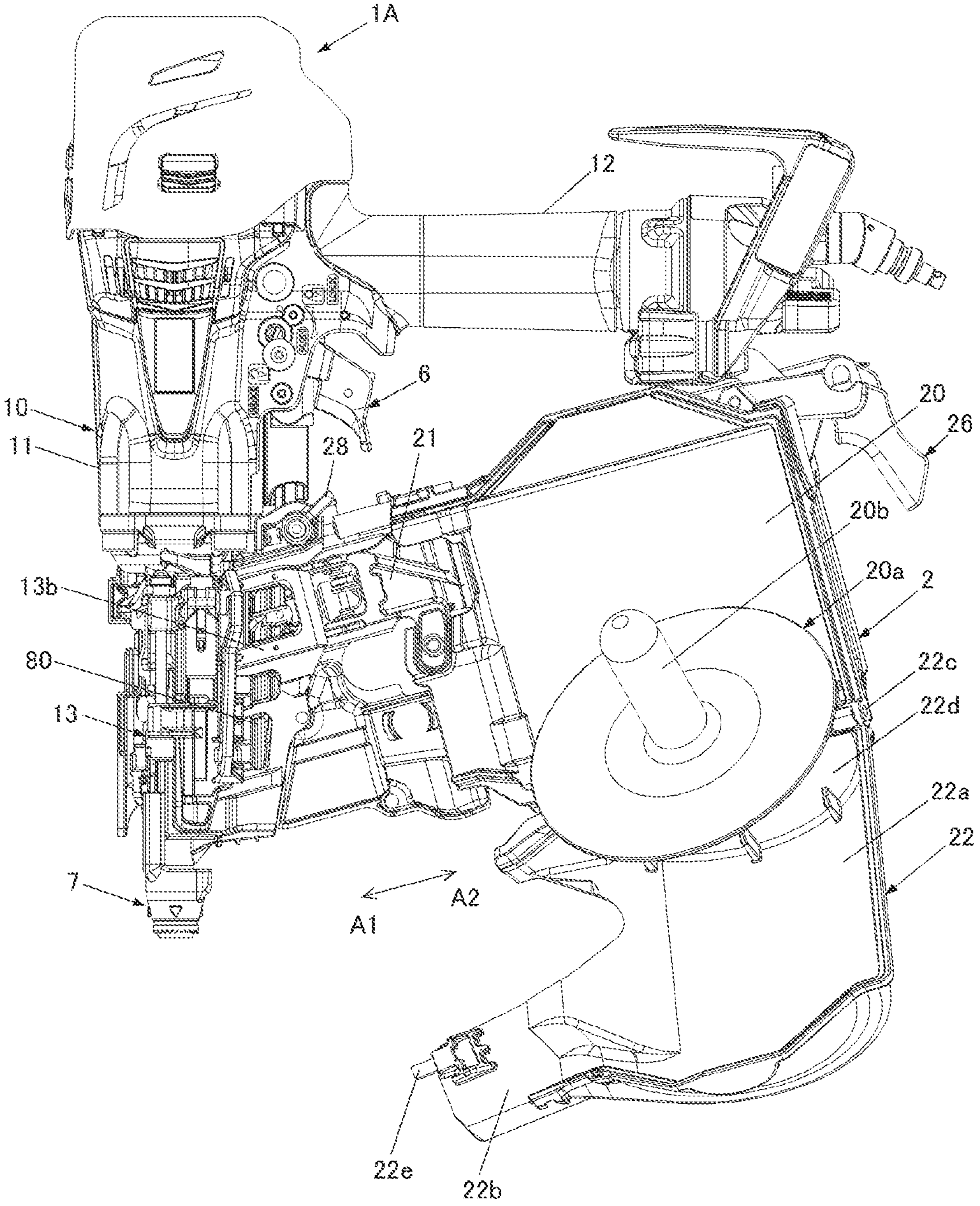
FIG. 1A is a side view illustrating an example of a nail driving machine (a driving tool) according to a first embodiment related to an aspect of the present disclosure.
Figure 1B:
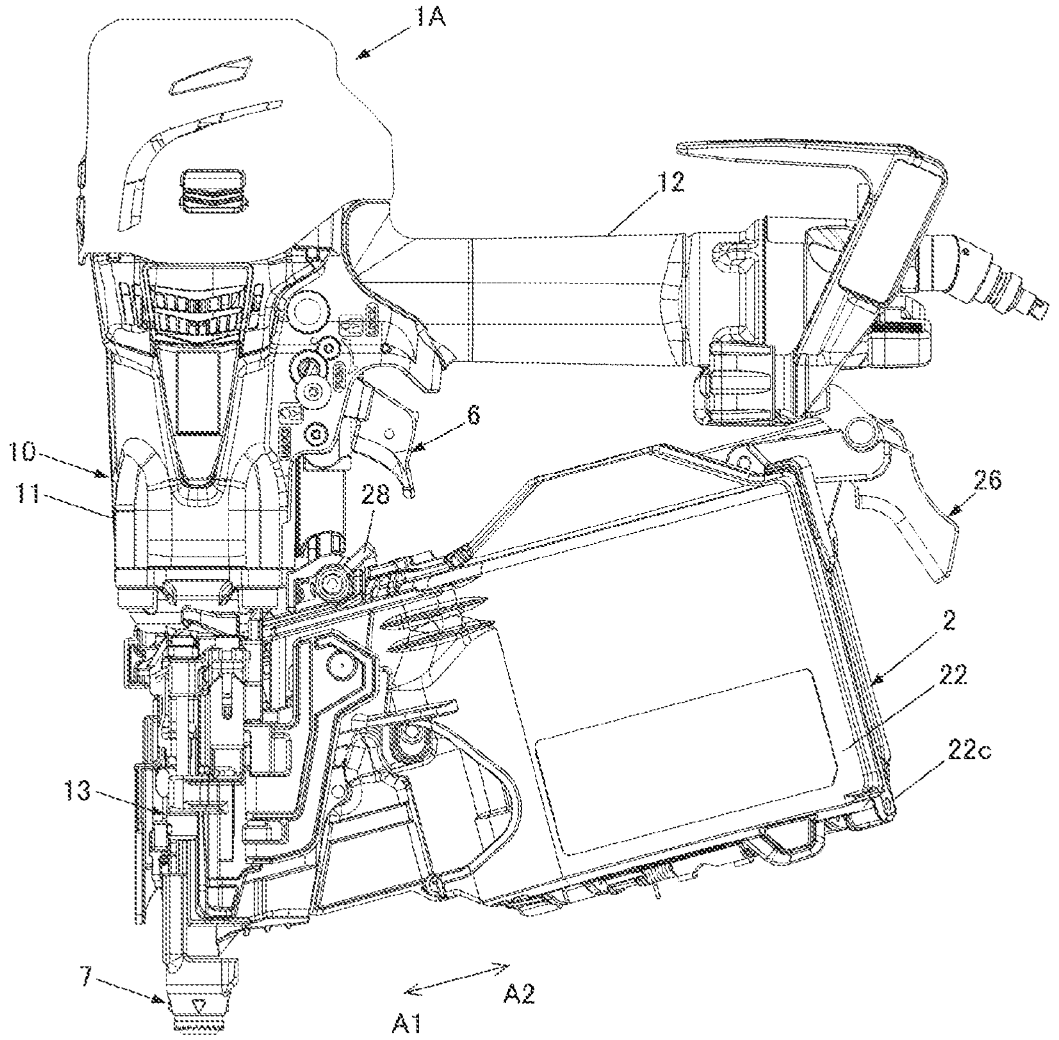
FIG. 1B is a side view illustrating the example of the nail driving machine according to the first embodiment related to the aspect of the present disclosure.

Configuration Example of Nail Driving Machine According to Present Embodiment Related to Aspect of Present Disclosure FIGS. 1A and 1B are side views illustrating an example of a nail driving machine according to a first embodiment, and FIG. 1A illustrates a state in which a cap portion for opening and closing a magazine is opened. FIG. 1B illustrates a state in which the cap portion is held in a closed state.

Figure 2A:
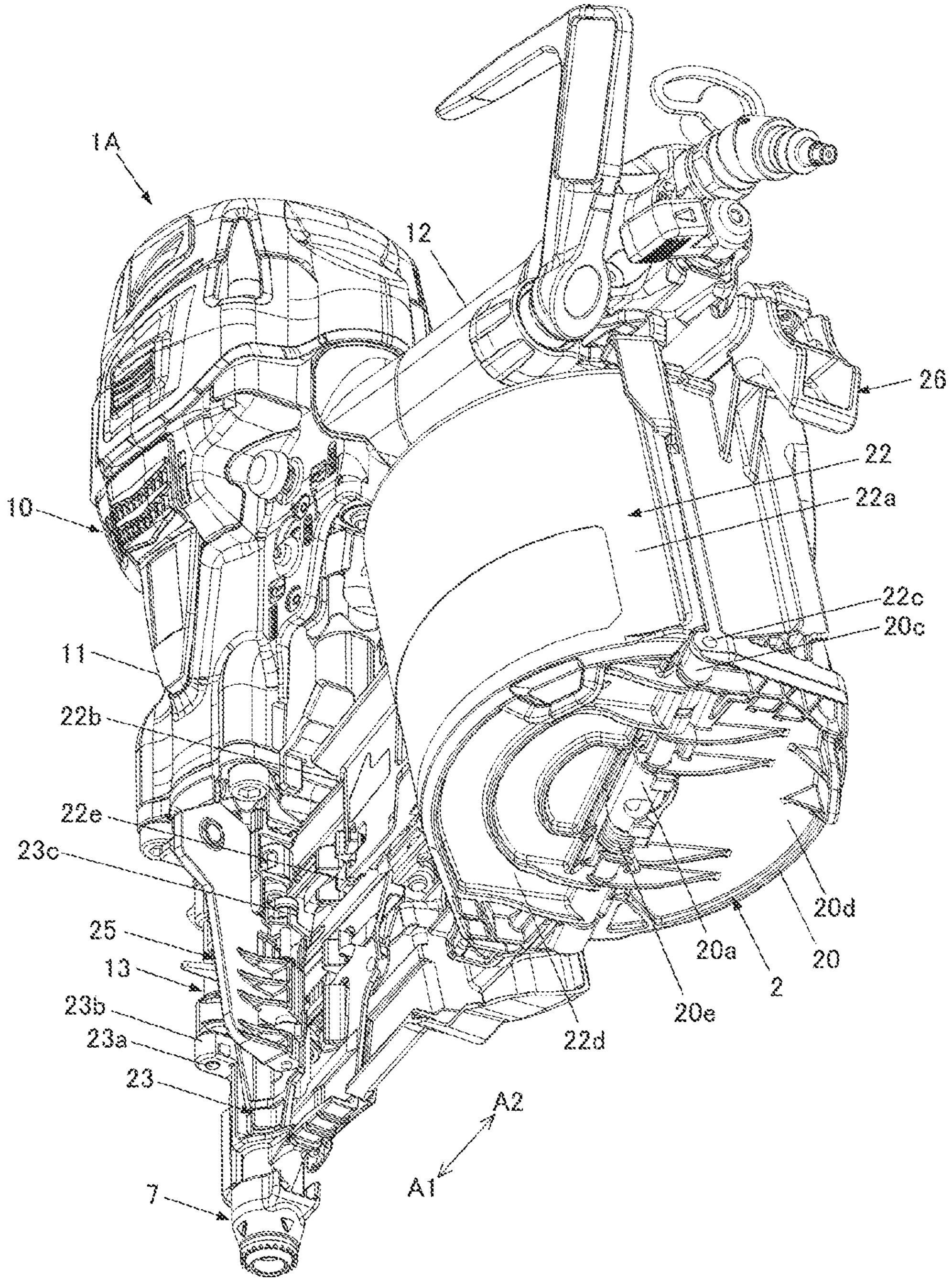
FIG. 2A is a perspective view illustrating the example of the nail driving machine according to the first embodiment related to the aspect of the present disclosure.
Figure 2B:
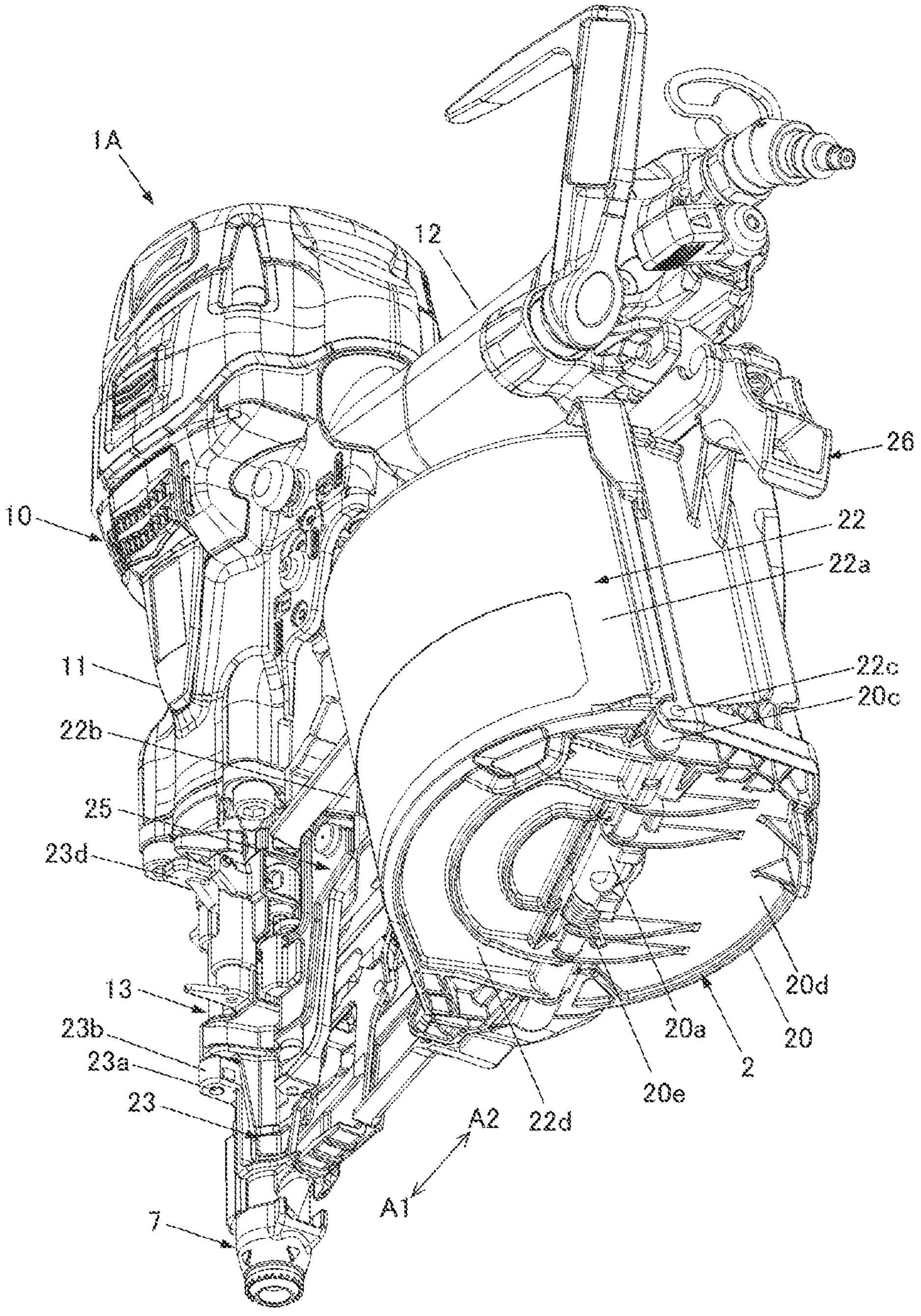
FIG. 2B is a perspective view illustrating the example of the nail driving machine according to the first embodiment related to the aspect of the present disclosure.

Further, FIGS. 2A and 2B are perspective views illustrating the example of the nail driving machine according to the first embodiment, and FIG. 2A illustrates a state in which the cap portion can be opened. FIG. 2B illustrates a state in which the cap portion is held in the closed state.

Figure 3A:
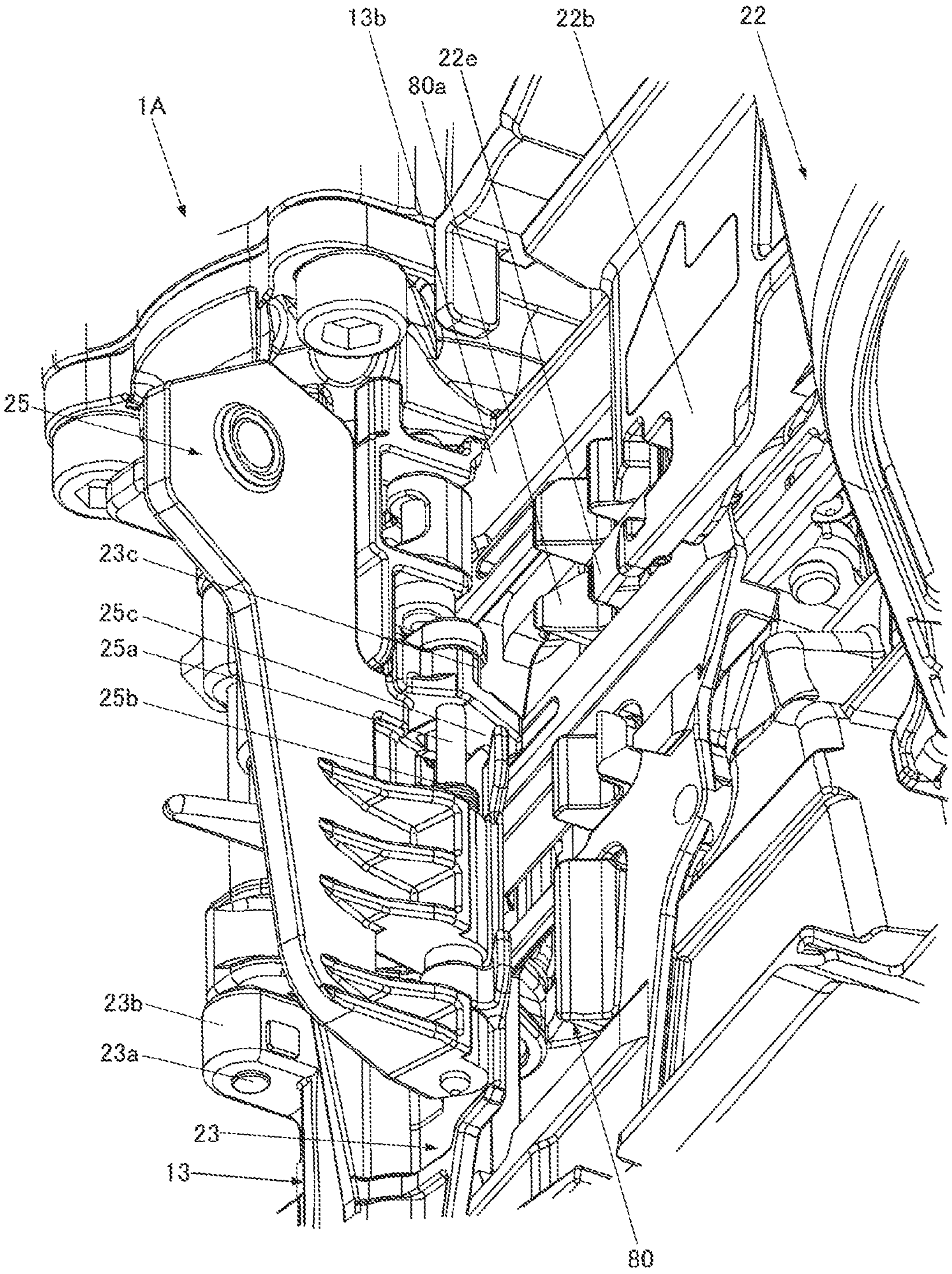
FIG. 3A is a perspective view of a main part illustrating the example of the nail driving machine according to the first embodiment related to the aspect of the present disclosure.
Figure 3B:
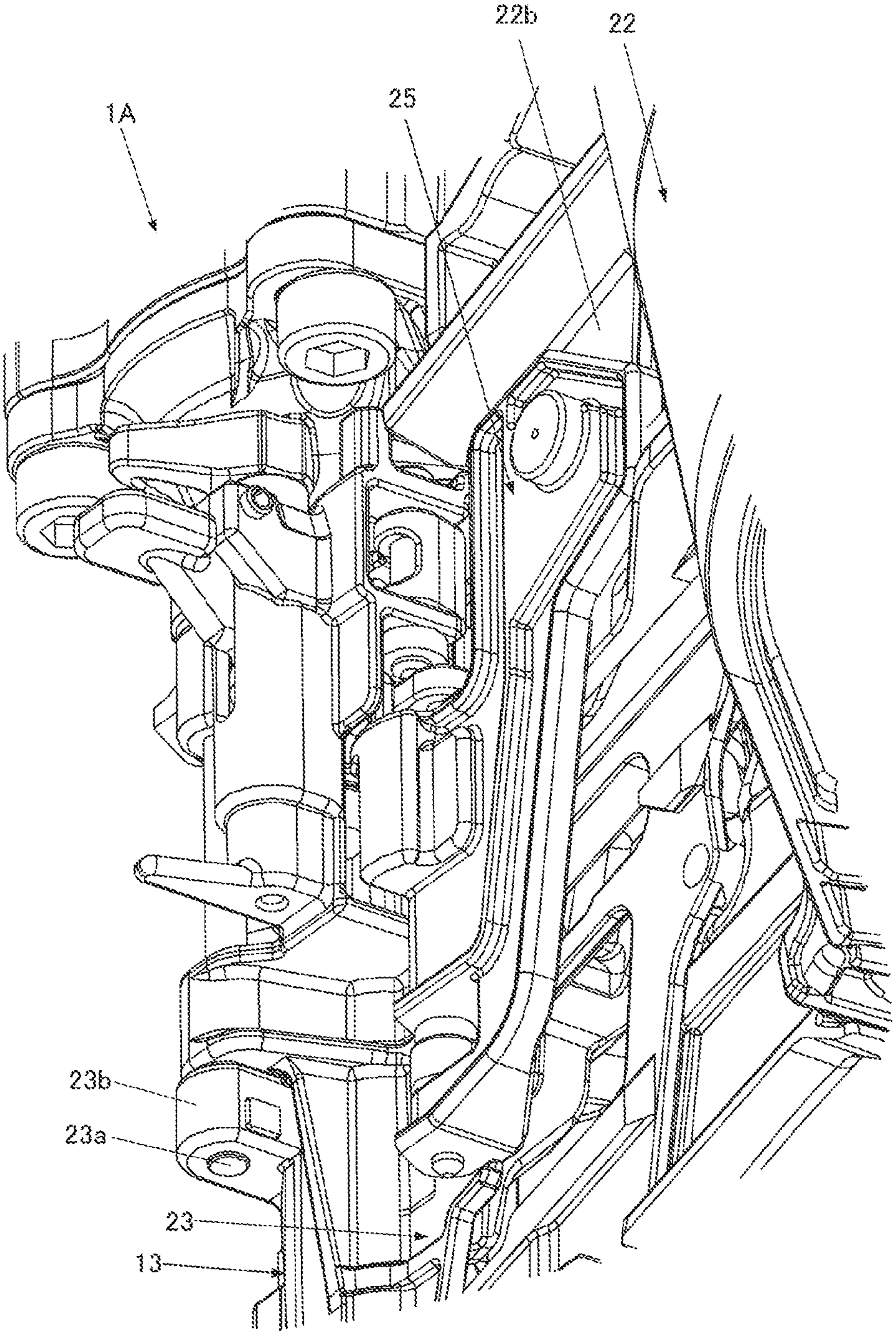
FIG. 3B is a perspective view of the main part illustrating the example of the nail driving machine according to the first embodiment related to the aspect of the present disclosure.

Further, FIGS. 3A and 3B are perspective views of a main part illustrating the example of the nail driving machine according to the first embodiment, and FIG. 3A illustrates a state in which the cap portion can be opened. FIG. 3B illustrates a state in which the cap portion is held in the closed state.

Figure 4A:
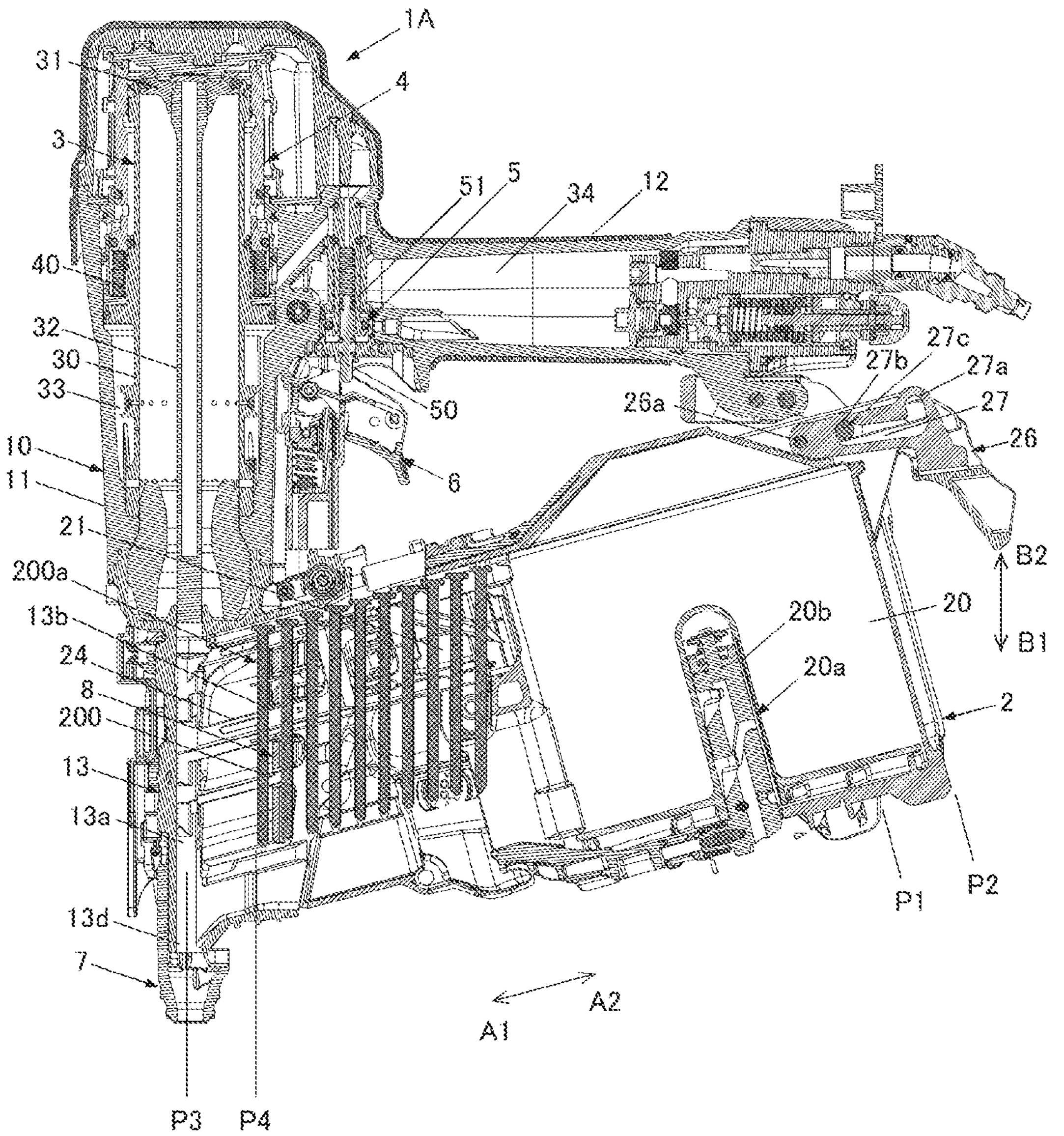
FIG. 4A is a side cross-sectional view illustrating the example of the nail driving machine according to the first embodiment related to the aspect of the present disclosure.
Figure 4B:
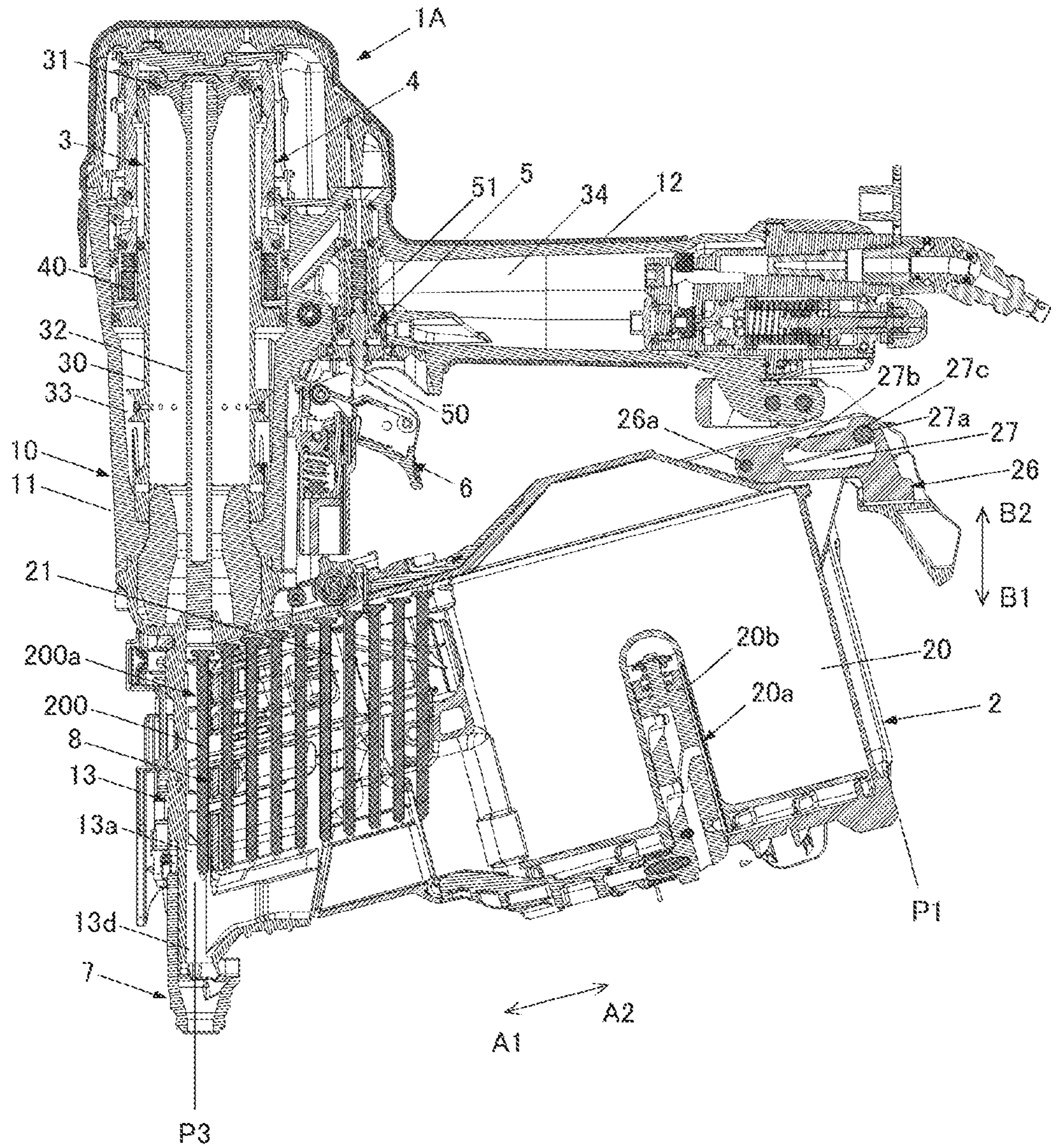
FIG. 4B is a side cross-sectional view illustrating the example of the nail driving machine according to the first embodiment related to the aspect of the present disclosure.

Further, FIGS. 4A and 4B are side cross-sectional views illustrating the example of the nail driving machine according to the first embodiment, and FIG. 4A illustrates a state in which the cap portion can be opened. FIG. 4B illustrates a state in which the cap portion is held in the closed state.

Figure 5A:
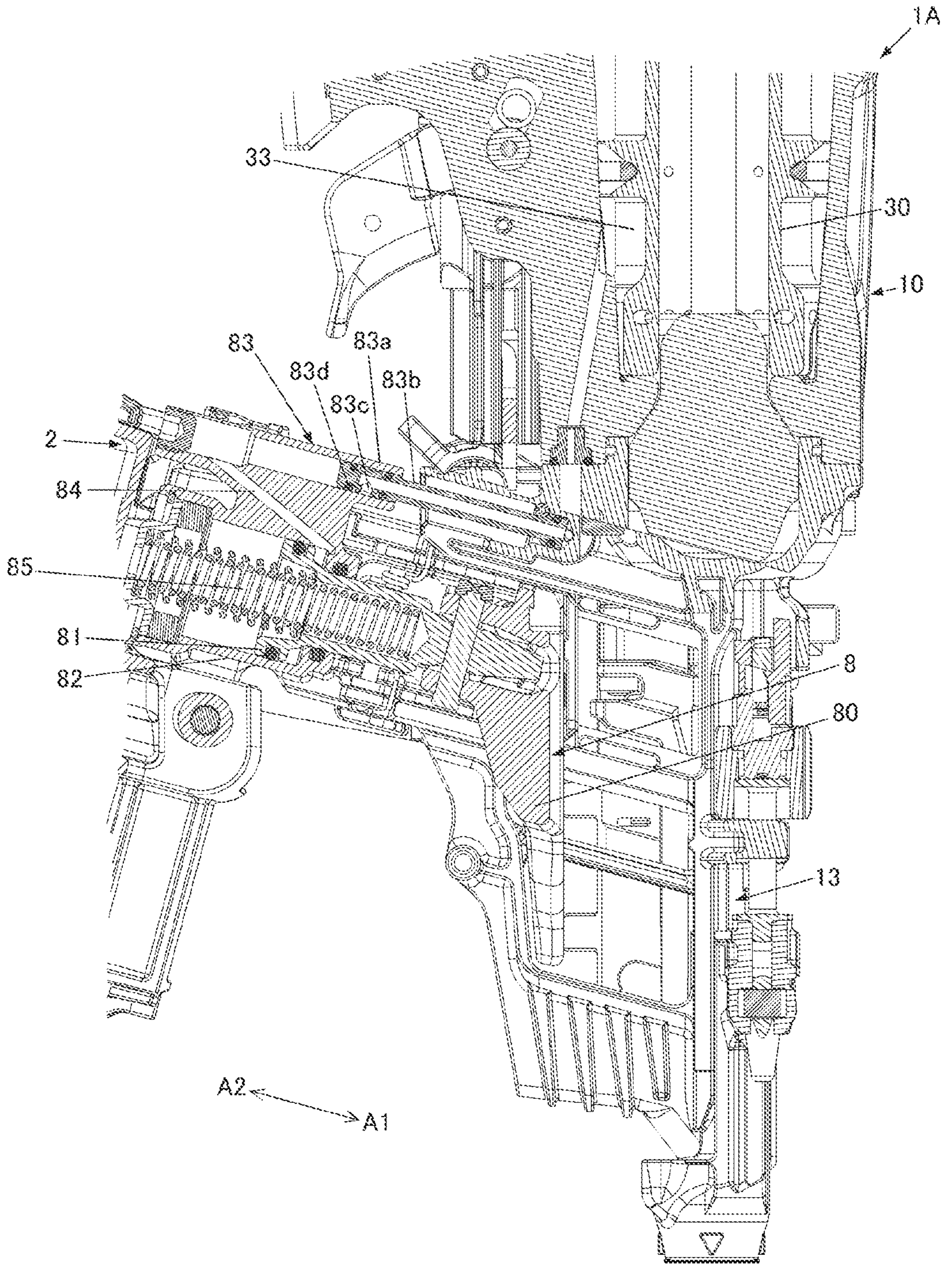
FIG. 5A is a side cross-sectional view of the main part illustrating the example of the nail driving machine according to the first embodiment related to the aspect of the present disclosure.
Figure 5B:
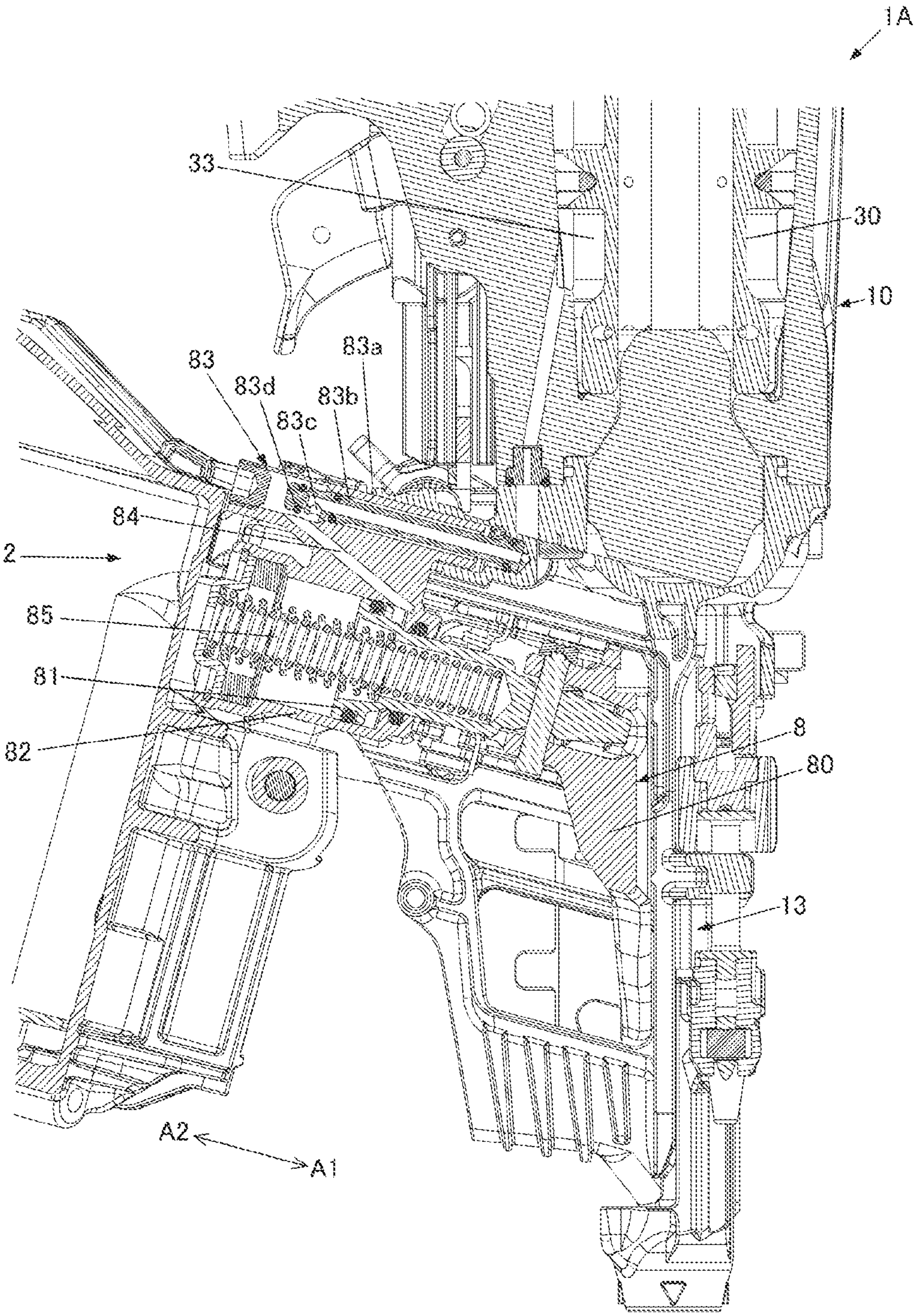
FIG. 5B is a side cross-sectional view of the main part illustrating the example of the nail driving machine according to the first embodiment related to the aspect of the present disclosure.

Further, FIGS. 5A and 5B are side cross-sectional views of the main part illustrating the example of the nail driving machine according to the first embodiment, and FIG. 5A illustrates a state in which the cap portion can be opened. FIG. 5B illustrates a state in which the cap portion is held in the closed state.

Figure 6A:
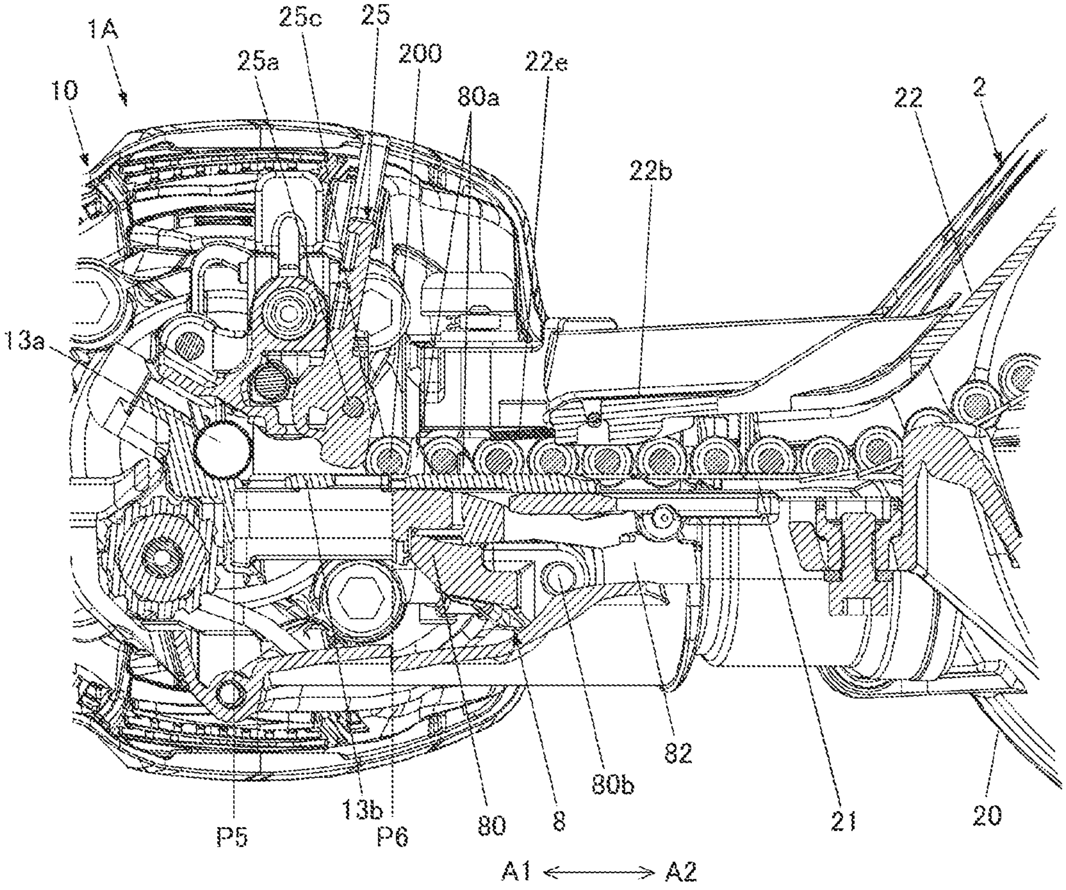
FIG. 6A is a bottom cross-sectional view of the main part illustrating the example of the nail driving machine according to the first embodiment related to the aspect of the present disclosure.
Figure 6B:
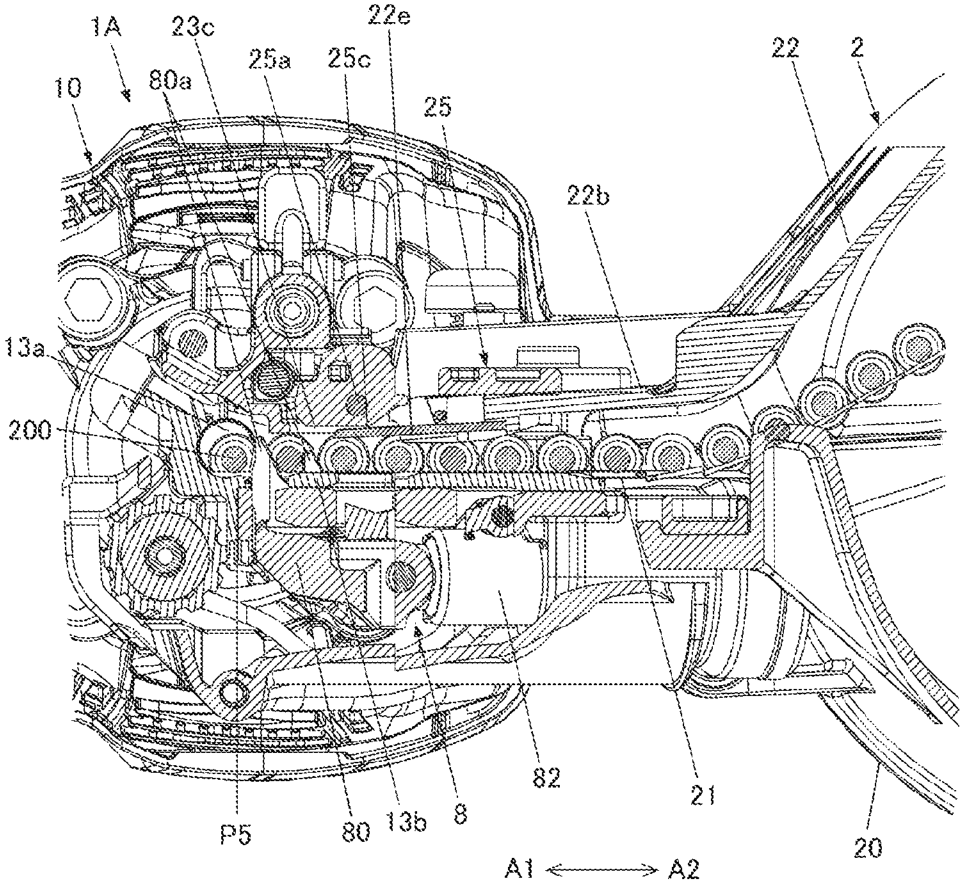
FIG. 6B is a bottom cross-sectional view of the main part illustrating the example of the nail driving machine according to the first embodiment related to the aspect of the present disclosure.

Further, FIGS. 6A and 6B are bottom cross-sectional views of the main part illustrating the example of the nail driving machine according to the first embodiment, and FIG. 6A illustrates a state in which the cap portion can be opened. FIG. 6B illustrates a state in which the cap portion is held in the closed state.

Figure 7A:
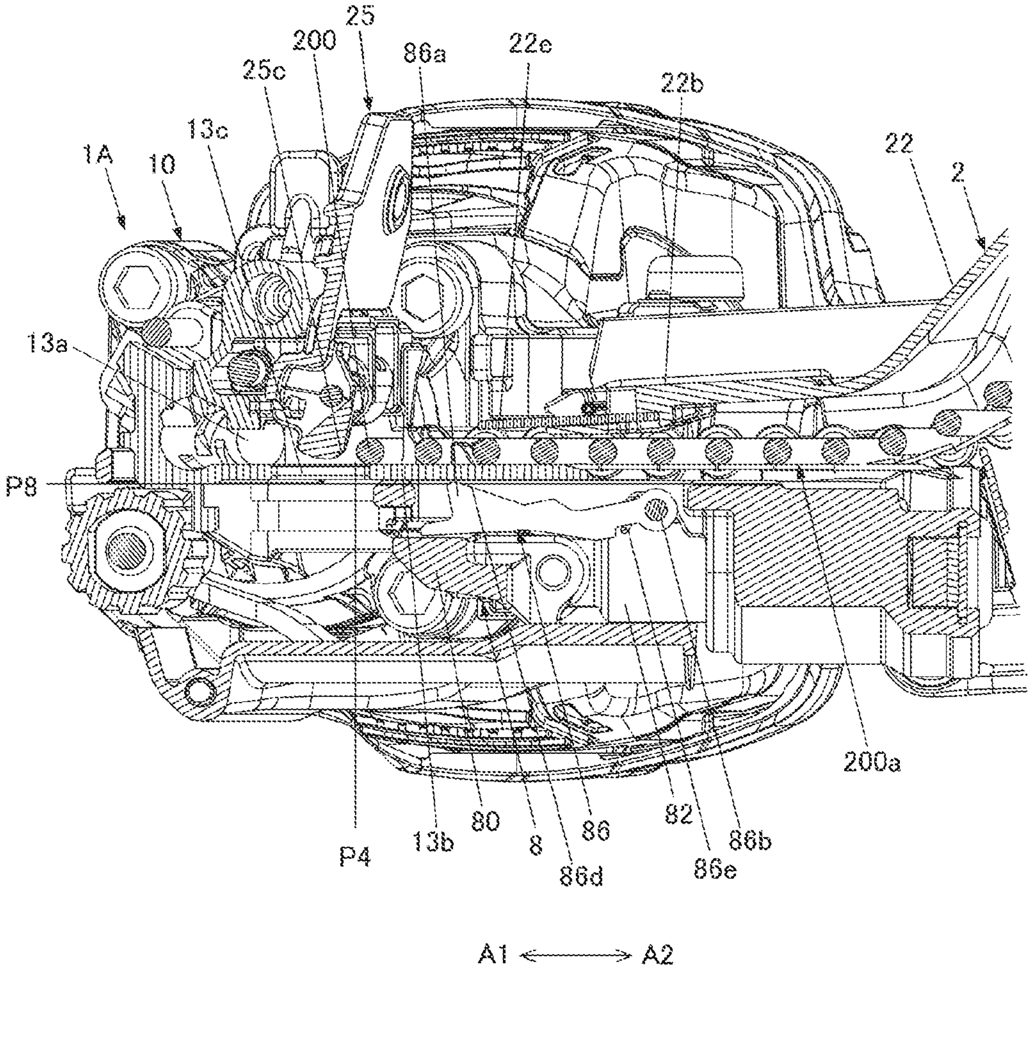
FIG. 7A is a cross-sectional perspective view of the main part illustrating the example of the nail driving machine according to the first embodiment related to the aspect of the present disclosure.
Figure 7B:
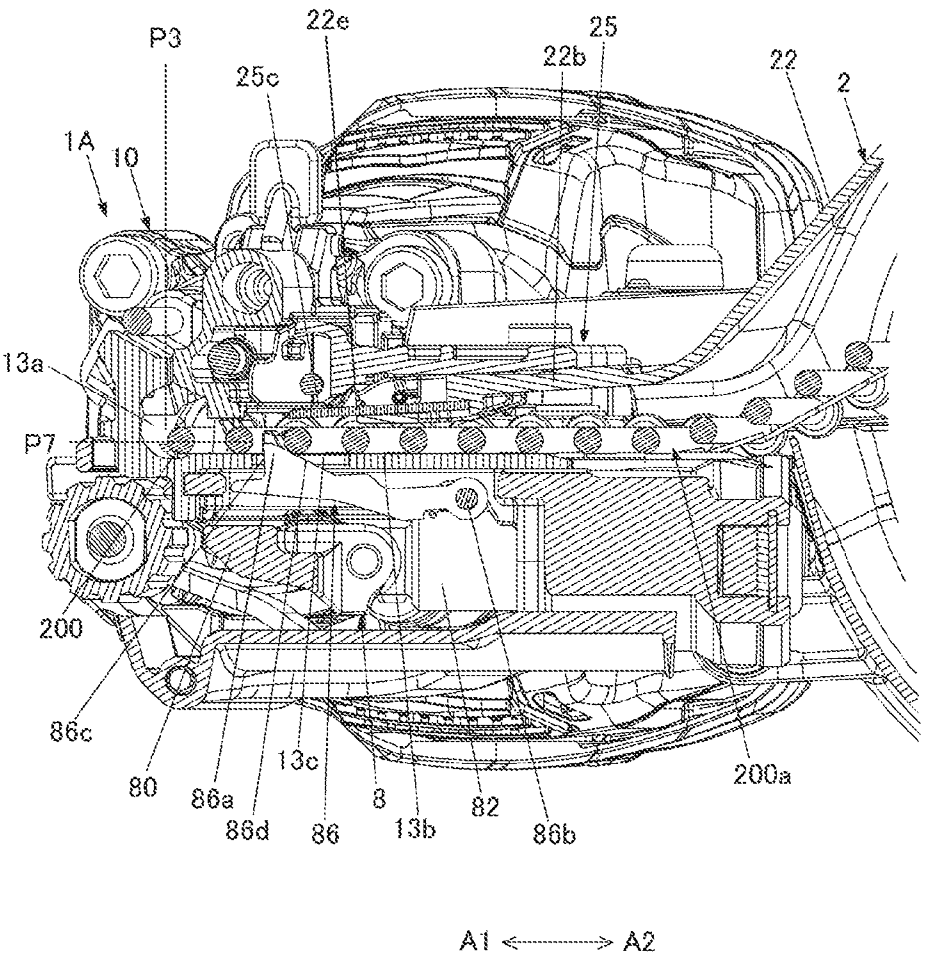
FIG. 7B is a cross-sectional perspective view of the main part illustrating the example of the nail driving machine according to the first embodiment related to the aspect of the present disclosure.

Further, FIGS. 7A and 7B are cross-sectional perspective views of the main part illustrating the example of the nail driving machine according to the first embodiment, and FIG. 7A illustrates a state in which the cap portion can be opened. FIG. 7B illustrates a state in which the cap portion is held in the closed state.

Figure 8:
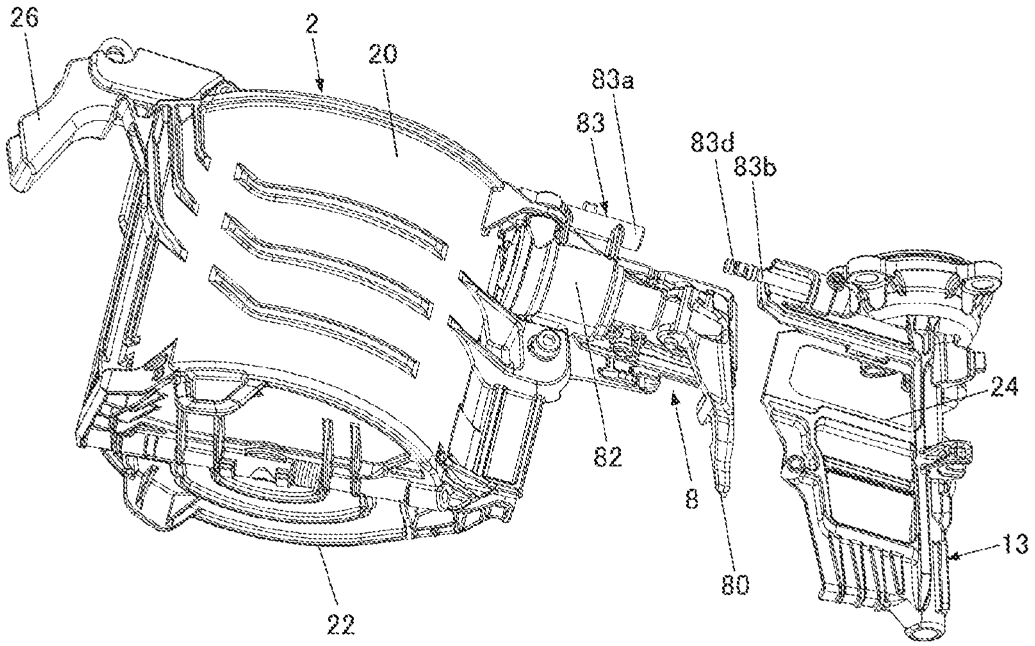
FIG. 8 is an exploded perspective view of the main part illustrating the example of the nail driving machine according to the first embodiment related to the aspect of the present disclosure.

Further, FIG. 8 is an exploded perspective view of the main part illustrating the example of the nail driving machine according to the first embodiment. In each of the drawings described above, a nail driven into a driving target material can be driven again by using the nail driving machine in a manner of idle-driving in the state in which the cap portion can be opened.

A nail driving machine 1A includes a magazine 2 that accommodates nails 200, and a main body portion 10 having a mechanism for driving out the nails 200, a mechanism for receiving an operation of driving out the nails 200, an injection passage for the nails 200, and the like. The main body portion 10 includes a trunk portion 11 provided with a striking portion 3 and the like for driving out the nails 200, and a handle portion 12 extending in a direction intersecting the trunk portion 11. The main body portion 10 includes a nose portion 13 having an injection passage 13*a* through which the nails 200 accommodated in the magazine 2 are supplied. The nail driving machine 1A includes a feeding portion 8 that feeds the nails 200 to the injection passage 13*a* of the nose portion 13. In the nail driving machine 1A, the nails 200 supplied to the injection passage 13*a* by the feeding portion 8 are driven out from an injection port 13*d* of the injection passage 13*a* by the striking portion 3. The nails 200 driven out by the striking portion 3 pass through the injection passage 13*a*.

In the nail driving machine 1A, one side along an extending direction of the trunk portion 11, which is a side on which the nose portion 13 is provided, is a lower side, and the other side along the extending direction of the trunk portion 11, which is a side opposite to the side on which the nose portion 13 is provided, is an upper side. The nail driving machine 1A is provided with the magazine 2 on a lower side of the handle portion 12.

In the nail driving machine 1A, a plurality of nails 200 as fasteners are connected by a connection band (not shown), and for example, connected nails 200*a* wound in a spiral shape are accommodated in the magazine 2.

Next, the magazine 2 and a mechanism for opening and closing the magazine 2 will be described. The magazine 2 is an example of a retracting portion, and includes an accommodating portion 20 in which a spirally wound portion of the connected nails 200*a* is accommodated, and a first passage portion 21 through which a portion pulled out from the spirally wound portion passes.

The accommodating portion 20 is implemented by a space having a shape capable of accommodating the spirally wound portion of the connected nails 200*a*. The first passage portion 21 extends along a feeding direction of the nails 200 from the accommodating portion 20 toward the nose portion 13. The accommodating portion 20 and the first passage portion 21 of the magazine 2 are integrally formed.

The nose portion 13 includes a second passage portion 13*b* connected to the injection passage 13*a*. The second passage portion 13*b* is an example of a passage portion (a fastener supply path), and extends along the feeding direction of the nails 200 from the accommodating portion 20 toward the nose portion 13. The second passage portion 13*b* is connected to the injection passage 13*a* on a downstream side of the nails 200 in the above feeding direction, and is connected to the first passage portion 21 on an upstream side of the nails 200 in the above feeding direction. The nose portion 13 may not include the second passage portion 13*b*, and the first passage portion 21 of the magazine 2 may be connected to the injection passage 13*a*. In such a configuration, the first passage portion 21 is an example of the passage portion (the fastener supply path).

The magazine 2 includes a fastener support portion 20*a* that rotatably supports the spirally wound portion of the connected nails 200*a*. The fastener support portion 20*a* includes a support shaft 20*b* inserted into the center of the spirally wound portion of the connected nails 200*a*.

The magazine 2 includes the accommodating portion 20 and a cap portion 22 that opens and closes the first passage portion 21 and a part of the second passage portion 13*b* on a side close to the first passage portion 21. The cap portion 22 includes a first portion 22*a* with which the accommodating portion 20 is covered, and a second portion 22*b* with which the first passage portion 21 and a part of the second passage portion 13*b* on the side close to the first passage portion 21 are covered, which are integrally formed. The cap portion 22 opens and closes the accommodating portion 20, the first passage portion 21, and a part of the second passage portion 13*b* on the side close to the first passage portion 21 in a rotation operation with a shaft 22*c* as a fulcrum.

The shaft 22*c* is supported by a shaft support portion 20*c* provided in the accommodating portion 20 in the magazine 2. The magazine 2 includes a wall portion 20*d* that constitutes a part of a lower surface of the accommodating portion 20. The shaft support portion 20*c* is provided on the wall portion 20*d*. The cap portion 22 includes a wall portion 22*d* that constitutes a part of a lower surface of the first portion 22*a*. The wall portion 22*d* of the cap portion 22 is supported by the shaft 22*c*. One end of the support shaft 20*b* of the fastener support portion 20*a* is supported by the shaft 22*c*. The fastener support portion 20*a* rotates from an accommodation position to a loading position with the shaft 22*c* as a fulcrum.

The fastener support portion 20*a* is biased by a biasing member 20*e* in an opening direction of the cap portion 22. The fastener support portion 20*a* rotates to the loading position with the shaft 22*c* as a fulcrum such that the support shaft 20*b* protrudes in an oblique direction from the accommodating portion 20 by the biasing of the biasing member 20*e* in conjunction with an operation of opening the cap portion 22. The cap portion 22 is biased in the opening direction by a force for the biasing member 20*e* biasing the fastener support portion 20*a*, and is held in an opened state.

The nail driving machine 1A includes a door portion 23 that opens and closes the injection passage 13*a* and a remaining portion of the second passage portion 13*b* of the nose portion 13 on a side close to the injection passage 13*a*. The door portion 23 is formed to cover a part or the whole of a side portion of the injection passage 13*a* intersecting with a direction in which the nails 200 are driven out and the remaining portion of the first passage portion 21 other than a portion covered with the second portion 22*b* of the cap portion 22, and the door portion 23 opens and closes the injection passage 13*a* and the remaining portion of the second passage portion 13*b* in a rotation operation with a shaft 23*a* as a fulcrum. The door portion 23 may be formed integrally with the cap portion 22, and the injection passage 13*a* and the remaining portion of the second passage portion 13*b* may be opened and closed in an operation of opening and closing the accommodating portion 20 by the cap portion 22. The door portion 23 may be fixed to the nose portion 13 and may not be opened or closed.

The shaft 23*a* is supported by a shaft support portion 23*b* provided on the nose portion 13. The shaft support portion 23*b* is provided on the nose portion 13 on an opposite side to the second passage portion 13*b* connected to the injection passage 13*a*. The door portion 23 includes a door operation unit 23*d* that receives an operation of releasing the holding of a closed state. When the door operation unit 23*d* is operated, the door portion 23 is released from being held in the closed state, and the injection passage 13*a* and the remaining portion of the second passage portion 13*b* can be opened and closed in the rotation operation with the shaft 23*a* as a fulcrum.

The nail driving machine 1A includes a magazine support portion 24 that movably supports the magazine 2. The magazine support portion 24 is an example of the retracting portion, and is provided on the nose portion 13 in this example. The magazine support portion 24 constitutes a part of the second passage portion 13*b*.

The magazine 2 can slide in a first direction indicated by an arrow A1 and a second direction indicated by an arrow A2 opposite to the first direction along the feeding direction of the nails 200 in the first passage portion 21 and the second passage portion 13*b* by the guide of the magazine support portion 24. A feeding member 80, which will be described later, of the feeding portion 8, which is an example of the retracting portion, is attached to the magazine 2. Further, a feeding piston 81 and a feeding cylinder 82 to be described later are attached to the magazine 2. In addition, a switching cylinder 83*a* of a switcher 83 to be described later is attached to the magazine 2. Accordingly, w % ben the magazine 2 is moved by the guide of the magazine support portion 24, the feeding member 80, the feeding piston 81, the feeding cylinder 82, and the switching cylinder 83*a* of the feeding portion 8 move together with the magazine 2 in the same direction as a movement direction of the magazine 2.

The cap portion 22 is connected to the magazine 2 via the shaft 22*c* and moves together with the magazine 2.

The magazine 2 is moved between a closed position P1 at which the cap portion 22 is held in the closed state and an openable and closable position P2 at which the cap portion 22 is released from the closed state and can be opened and closed. The closed position P1 is a first position, and the openable and closable position P2 is a second position.

The magazine 2 is moved in the first direction indicated by the arrow A1 from the openable and closable position P2 to the closed position P1 The first direction is a direction in which the magazine 2 approaches the main body portion 10, in this example, the nose portion 13. In addition, the magazine 2 is moved in the second direction indicated by the arrow A2 from the closed position P1 to the openable and closable position P2. The second direction is a direction in which the magazine 2 is separated from the main body portion 10, in this example, the nose portion 13.

The door portion 23 includes an engaging portion 23*c* that is engaged with the cap portion 22 in a state in which the magazine 2 is moved to the closed position P1. The cap portion 22 includes an engaged portion 22*e* that is engaged with the engaging portion 23*c* in the state in which the magazine 2 is moved to the closed position P1. When the magazine 2 is closed in a state in which the magazine 2 is moved to the openable and closable position P2, the second portion 22*b* of the cap portion 22 faces the door portion 23 along the movement direction of the magazine 2. The engaged portion 22*e* is provided in the second portion 22*b* facing the door portion 23 in the cap portion 22 by which the magazine 2 is closed. The engaged portion 22*e* protrudes from the second portion 22*b* toward the door portion 23 in the direction indicated by arrow A1 along the movement direction of the magazine 2. The engaging portion 23*c* is provided at a portion of the door portion 23 by which the injection passage 13*a* and the remaining portion of the second passage portion 13*b* are closed, the portion faces the engaged portion 22*e* of the cap portion 22 by which the magazine 2 is closed. The engaging portion 23*c* extends along the movement direction of the magazine 2, and is provided with a recessed portion into which the engaged portion 22*e* can be inserted and removed.

Accordingly, the magazine 2 is moved in the first direction from the openable and closable position P2 to the closed position P1 by the guide of the magazine support portion 24, whereby the engaged portion 22*e* of the cap portion 22 is engaged with the engaging portion 23*c* of the door portion 23. In addition, the magazine 2 is moved in the second direction from the closed position P1 to the openable and closable position P2, whereby the engagement between the engaged portion 22*e* and the engaging portion 23*c* is released.

The door portion 23 includes a pressing portion 25 that presses the cap portion 22 by which the magazine 2 is closed. The pressing portion 25 has a shape so as to cover a part of the cap portion 22, and moves between a pressing position for pressing the cap portion 22 and a release position for releasing the pressing of the cap portion 22 in a rotation operation with a shaft 25*a* as a fulcrum.

The pressing portion 25 is biased by a biasing member 25*b* such as a torsion coil spring in a rotation direction from the pressing position to the release position.

The pressing portion 25 includes an acting portion 25*c* that is pressed against the engaged portion 22*e*. The acting portion 25*c* is provided on a movement path of the engaged portion 22*e* as the magazine 2 moves.

The acting portion 25*c* is pressed against the engaged portion 22*e* as the magazine 2 moves, and the pressing portion 25 rotates from the release position to the pressing position in the rotation operation with the shaft 25*a* as a fulcrum. The pressing portion 25 is held at the pressing position when the acting portion 25*c* is pressed against the engaged portion 22*e*. Further, when the engaged portion 22*e* is separated from the acting portion 25*c* as the magazine 2 moves, the pressing portion 25 rotates from the pressing position to the release position by the biasing of the biasing member 25*b*.

The nail driving machine 1A includes an operation unit 26 that receives an operation of moving the magazine 2. The operation unit 26 is attached to the accommodating portion 20 of the magazine 2 via a shaft 26*a*.

The operation unit 26 includes a holding portion 27 that holds the magazine 2 at the closed position P1 and the openable and closable position P2.

The holding portion 27 is formed in an elongated hole shape extending along the movement direction of the magazine 2, and is provided with a first engaging recessed portion 27*a* extending in a direction intersecting with an extending direction of the holding portion 27 at one end in the extending direction. In addition, the holding portion 27 is provided with a second engaging recessed portion 27*b* extending in a direction intersecting with the extending direction of the holding portion 27 at the other end in the extending direction.

A shaft 27*c* provided on a handle portion 12 side is inserted into the holding portion 27. The shaft 27*c* does not move with respect to the movement of the magazine 2. On the other hand, the holding portion 27 is displaced with respect to the shaft 27*c* by the movement of the magazine 2 and the rotation of the operation unit 26 with the shaft 26*a* as a fulcrum.

When the magazine 2 is moving to the closed position P1, the first engaging recessed portion 27*a* of the holding portion 27 faces the shaft 27*c*. When the operation unit 26 rotates in a first rotation direction indicated by an arrow B1, which is one direction with the shaft 26*a* as a fulcrum, the first engaging recessed portion 27*a* of the holding portion 27 is engaged with the shaft 27*c*. Accordingly, the magazine 2 is held at the closed position P1.

In a state in which the holding portion 27 is moving to the closed position P1 and in a state in which the first engaging recessed portion 27*a* is engaged with the shaft 27*c*, when the operation unit 26 rotates in a second rotation direction indicated by an arrow B2, which is another direction with the shaft 26*a* as a fulcrum, the engagement between the first engaging recessed portion 27*a* and the shaft 27*c* is released. Accordingly, the magazine 2 can move from the closed position P1 to the openable and closable position P2. Therefore, the magazine 2 and the cap portion 22 integrally move in the second direction by applying a force for rotating the operation unit 26 in the second rotation direction and then moving the operation unit 26 in the second direction indicated by the arrow A2 in a state in which the magazine 2 is moving to the closed position P1.

When the magazine 2 is moving to the openable and closable position P2, the second engaging recessed portion 27*b* of the holding portion 27 faces the shaft 27*c*. When the operation unit 26 rotates in the first rotation direction with the shaft 26*a* as a fulcrum, the second engaging recessed portion 27*b* of the holding portion 27 is engaged with the shaft 27*c*. Accordingly, the magazine 2 is held at the openable and closable position P2.

In a state in which the holding portion 27 is moving to the openable and closable position P2 and in a state in which the second engaging recessed portion 27*b* is engaged with the shaft 27*c*, when the operation unit 26 rotates in the second rotation direction indicated by the arrow B2 with the shaft 26*a* as a fulcrum, the engagement between the second engaging recessed portion 27*b* and the shaft 27*c* is released. Accordingly, the magazine 2 can move from the openable and closable position P2 to the closed position P1. Therefore, the magazine 2 and the cap portion 22 integrally move in the first direction by applying a force for rotating the operation unit 26 in the second rotation direction and then moving the operation unit 26 in the first direction indicated by the arrow A1 in a state in which the magazine 2 is moving to the openable and closable position P2.

The nail driving machine 1A includes a sub-operation unit 28 that regulates the opening of the cap portion 22 in a state in which the magazine 2 is moved to the openable and closable position P2. The sub-operation unit 28 can press the cap portion 22 by which the accommodating portion 20 is closed in the state in which the magazine 2 is moved to the openable and closable position P2. The sub-operation unit 28 may press the cap portion 22 by which the accommodating portion 20 is closed in the state in which the magazine 2 is moved to the closed position P1, and may move integrally with the magazine 2 while maintaining a state in which the sub-operation unit 28 presses the cap portion 22 in an operation of moving the magazine 2 from the closed position P1 to the openable and closable position P2.

Next, the mechanism for driving out the nails 200, the mechanism for receiving an operation of driving out the nails 200, a mechanism for feeding the nails 200, and the like will be described. The nail driving machine 1A includes a main valve 4 that switches whether to supply compressed air to the striking portion 3, a starting valve 5 that causes the main valve 4 to operate, and a trigger 6 that causes the starting valve 5 to operate. In addition, the nail driving machine 1A includes a contact portion 7 that comes into contact with the driving target material (not shown) and switches between a sign-in state in which the starting valve 5 is operable and a sign-off state in which the starting valve 5 is not operable in cooperation with an operation of the trigger 6. Further, the nail driving machine 1A includes the feeding portion 8 that feeds the nails 200 to the injection passage 13*a* of the nose portion 13.

The striking portion 3 is an example of a driving-out portion, and includes a striking cylinder 30 to which the compressed air is supplied. The striking cylinder 30 is provided inside the trunk portion 11 so as to extend vertically. The striking cylinder 30 is provided with a striking piston 31 in a cylindrical internal space so as to be slidable. The striking portion 3 is provided with a driver 32 that is attached to the striking piston 31 so as to protrude on a lower side of the striking piston 31.

The nail driving machine 1A includes a blowback chamber 33 connected to the striking cylinder 30. The nail driving machine 1A supplies the compressed air from the striking cylinder 30 to the blowback chamber 33 in an operation of moving the striking piston 31 from a top dead center position to a bottom dead center position. Then, when the sign-off state is achieved and the air on the striking piston 31 of the striking cylinder 30 is discharged, the compressed air in the blowback chamber 33 is discharged via the striking cylinder 30, whereby the striking piston 31 returns to the top dead center position by an air pressure of the compressed air supplied from the blowback chamber 33 to below the striking piston 31 of the striking cylinder 30. In addition, the nail driving machine 1A causes the feeding portion 8 to operate by an air pressure of the compressed air supplied from the blowback chamber 33 to the feeding portion 8.

The main valve 4 opens and closes an air flow path connecting the striking cylinder 30 and a main chamber 34 to which the compressed air is supplied from an external air compressor (not shown). In the starting valve 5, a pilot valve 51 is operated when a valve stem 50 is pressed in a combination of the operation of the trigger 6 and an operation of pressing the contact portion 7 against the driving target material. The starting valve 5 changes an air pressure applied to the main valve 4 by operating the pilot valve 51.

The main valve 4 is operated by the balance between a biasing force of a main valve spring 40 and the air pressure applied to the main valve 4.

The feeding portion 8 is an example of the retracting portion, and includes the feeding member 80 that feeds the connected nails 200*a*, the feeding piston 81 connected to the feeding member 80, and the feeding cylinder 82 that causes the feeding piston 81 to operate. In addition, the feeding portion 8 includes the switcher 83 that switches whether to supply the compressed air from the blowback chamber 33 to the feeding cylinder 82.

The feeding member 80 includes a claw portion 80*a* protruding to the second passage portion 13*b*. The claw portion 80*a* of the feeding member 80 is engaged with the nails 200. The feeding member 80 is supported movably with respect to the second passage portion 13*b*. The feeding member 80 can move in a direction in which the claw portion 80*a* approaches the injection passage 13*a* of the nose portion 13 and a direction in which the claw portion 80*a* is separated from the injection passage 13*a* of the nose portion 13. In addition, the feeding member 80 can move in a direction in which the claw portion 80*a* protrudes from the second passage portion 13*b* and a direction in which the claw portion 80*a* retracts from the second passage portion 13*b* in a rotation operation with a shaft 80*b* as a fulcrum. The claw portion 80*a* of the feeding member 80 is located in the second direction with respect to the door portion 23 in the state in which the magazine 2 is moved to the openable and closable position P2 at which the cap portion 22 can be opened and closed. Accordingly, when the cap portion 22 is opened, the claw portion 80*a* is exposed to the second passage portion 13*b* even in a state in which the door portion 23 is closed, and the connected nails 200*a* can be loaded.

In a state in which a leading nail 200 of the connected nails 200*a* is located in the injection passage 13*a*, the claw portion 80*a* of the feeding member 80 is engaged with the second nail 200 of the connected nails 200*a*.

The feeding piston 81 is slidably supported in the feeding cylinder 82. The feeding cylinder 82 is connected to the blowback chamber 33 via a feeding flow path 84 and the switcher 83, and is supplied with the compressed air from the blowback chamber 33.

The feeding piston 81 is operated by the air pressure of the compressed air supplied from the blowback chamber 33 to cause the feeding member 80 to move in a direction in which the feeding member 80 is separated from the injection passage 13*a*. The feeding piston 81 is biased by a biasing member 85 such as a coil spring in a direction in which the feeding member 80 approaches the injection passage 13*a*. When an air pressure in the feeding cylinder 82 decreases as a result of the air in the feeding cylinder 82 flowing into the blowback chamber 33 and being discharged via the striking cylinder 30, the feeding piston 81 moves the feeding member 80 in the direction approaching the injection passage 13*a* by the biasing of the biasing member 85.

The switcher 83 includes the switching cylinder 83*a* connected to the feeding flow path 84 and a switching valve 83*b* that opens and closes the feeding flow path 84. The switching valve 83*b* of the switcher 83 is slidably supported in the switching cylinder 83*a*. The switcher 83 switches whether an outflow port 83*c* formed in the switching valve 83*b* is connected to the feeding flow path 84 or a sealing member 83*d* provided in the switching valve 83*b* seals a space between the outflow port 83*c* and the feeding flow path 84 by a relative movement of the switching cylinder 83*a* and the switching valve 83*b*.

The feeding member 80 is attached to the magazine 2. In addition, the feeding piston 81 and the feeding cylinder 82 are attached to the magazine 2. Further, the switching cylinder 83*a* of the switcher 83 is attached to the magazine 2. Accordingly, when the magazine 2 is moved in the first direction by the guide of the magazine support portion 24, the feeding member 80, the feeding piston 81, and the feeding cylinder 82, and the switching cylinder 83*a* of the feeding portion 8 move in the first direction together with the magazine 2. In addition, when the magazine 2 is moved in the second direction by the guide of the magazine support portion 24, the feeding member 80, the feeding piston 81, the feeding cylinder 82, and the switching cylinder 83*a* move in the second direction together with the magazine 2.

The switching valve 83*b* of the switcher 83 is attached to the nose portion 13. Accordingly, in the operation of moving the magazine 2, a relative position of the switching valve 83*b* with respect to the switching cylinder 83*a* changes, whereby the presence or absence of the communication between the outflow port 83*c* and the feeding flow path 84 is switched, and the presence or absence of supply of the compressed air from the blowback chamber 33 to the feeding cylinder 82 is switched.

The feeding member 80 is moved from a feeding operation position P5 to a retraction position P6 by moving together with the magazine 2 in the operation of moving the magazine 2 from the closed position P1 to the openable and closable position P2. When the feeding member 80 is moved to the feeding operation position P5 with the connected nails 200*a* engaged therewith, the feeding member 80 moves the connected nails 200*a* to an injection enable position P3. In addition, when the feeding member 80 is moved to the retraction position P6 with the connected nails 200*a* engaged therewith, the feeding member 80 moves the connected nails 200*a* to an injection avoidance position P4.

Accordingly, in the nail driving machine 1A, the connected nails 200*a* are moved from the injection enable position P3 to the injection avoidance position P4 in the operation of moving the magazine 2 from the closed position P1 to the openable and closable position P2. When the connected nails 200*a* are moving to the injection enable position P3, the leading nail 200 is located in the injection passage 13*a*. In addition, when the connected nails 200*a* are moved to the injection avoidance position P4, the leading nail 200 retracts from a portion other than the injection port 13*d* to the outside of the injection passage 13*a*.

When the magazine 2 is moving to the closed position P1, the feeding piston 81 is biased by the biasing member 85, whereby the feeding member 80 is moved to the feeding operation position P5. When the feeding member 80 is moved to the feeding operation position P5, the leading nail 200 of the connected nails 200*a* engaged with the feeding member 80 is moved to the injection enable position P3.

In the nail driving machine 1A, when the magazine 2 is moving to the closed position P1, after the feeding member 80 is moved from the feeding operation position P5 in the second direction by a predetermined amount by the compressed air being supplied to the feeding cylinder 82 in conjunction with an operation of driving the nails 200 by the striking portion 3, the feeding member 80 is moved in the first direction due to the decrease in the air pressure in the feeding cylinder 82 and the biasing of the biasing member 85 and returns to the feeding operation position P5.

Accordingly, the feeding operation position P5 is a position at which normal nail feeding for moving the nails 200 to the injection enable position P3 is enabled by a reciprocating movement of the feeding member 80 by supplying the compressed air in conjunction with the operation of driving the nails 200 by the striking portion 3.

When the magazine 2 is moved from the closed position P1 to the openable and closable position P2, the feeding member 80 is moved from the feeding operation position P5 to the retraction position P6. When the feeding member 80 is moved to the retraction position P6, the leading nail 200 of the connected nails 200*a* engaged with the feeding member 80 is moved from the injection enable position P3 to the injection avoidance position P4. The injection avoidance position P4 is a position at which the nails 2(*x*) are separated by a predetermined amount in the second direction from a movement path of the driver 32 passing through the injection passage 13*a*.

Accordingly, the retraction position P6 is a position at which the leading nail 200 of the connected nails 200*a* is not driven even when the driver 32 moves.

When the magazine 2 is moving to the closed position P1, the outflow port 83*c* and the feeding flow path 84 are connected to each other by the change in the relative position of the switching valve 83*b* with respect to the switching cylinder 83*a*, and the compressed air can be supplied from the blowback chamber 33 to the feeding cylinder 82. On the other hand, when the magazine 2 is moved from the closed position P1 to the openable and closable position P2, the space between the outflow port 83*c* and the feeding flow path 84 is sealed, and the supply of the compressed air from the blowback chamber 33 to the feeding cylinder 82 is blocked.

Accordingly, in the state in which the magazine 2 is moved to the openable and closable position P2, even when the operation of driving the nails 200 by the striking portion 3 is performed, the feeding member 80 does not reciprocate in a state of being moved to the retraction position P6. On the other hand, the feeding member 80 moved to the retraction position P6 may reciprocate in a range in which the leading nail 200 of the connected nails 200*a* engaged with the feeding member 80 does not move to the injection enable position P3. In this case, even when the magazine 2 is moved from the closed position P1 to the openable and closable position P2, the compressed air may be supplied from the blowback chamber 33 to the feeding cylinder 82.

The feeding member 80 is moved between the feeding operation position P5 and the retraction position P6 by moving in the first direction and the second direction similarly to the magazine 2, and may move in a direction different from that of the magazine 2. For example, in order to move the feeding member 80 from the feeding operation position P5 to the retraction position P6, the magazine 2 and the feeding cylinder 82 may be moved in an oblique direction gradually separated from the second direction, and the feeding member 80 may be moved in the second direction.

As described above, in the nail driving machine 1A, when the feeding member 80 is moved from the feeding operation position P5 in the second direction by the predetermined amount in the state in which the magazine 2 is moving to the closed position P1, the connected nails 200*a* are regulated from moving in a direction separated from the injection passage 13*a*.

Therefore, the feeding portion 8 includes a regulating portion 86 that switches whether the connected nails 200*a* are regulated from moving from the injection enable position P3 illustrated in FIG. 7B to the injection avoidance position P4 illustrated in FIG. 7A.

The regulating portion 86 includes a claw portion 86*a* that is engaged with the nail 200. The regulating portion 86 is biased by a biasing member (not shown) in a direction in which the claw portion 86*a* protrudes from a hole portion 13*c* of the second passage portion 13*b* in a rotation operation with a shaft 86*b* as a fulcrum.

The regulating portion 86 has a regulating surface 86*c* implemented by a surface substantially perpendicular to the feeding direction of the connected nails 200*a* on a side facing the injection passage 13*a* on the claw portion 86*a*. In addition, the regulating portion 86 has an inclined surface 86*d* implemented by a surface inclined in a direction in which an amount of protrusion from the hole portion 13*c* decreases toward the accommodating portion 20 with respect to the feeding direction of the connected nails 200*a* on a side facing the accommodating portion 20 on the claw portion 86*a*.

When the magazine 2 is moving to the closed position P1 as illustrated in FIG. 4B, the claw portion 86*a* of the regulating portion 86 faces the hole portion 13*c* of the second passage portion 13*b* as illustrated in FIG. 7B. Accordingly, the regulating portion 86 is biased by a biasing member 86*e*, so that the regulating portion 86 moves to a movement regulation position P7 at which the claw portion 86*a* protrudes from the hole portion 13*c* to a surface side of the second passage portion 13*b* in the rotation operation with the shaft 86*b* as a fulcrum.

The regulating portion 86 is attached to the magazine 2. In this example, the shaft 86*b* is supported by the feeding cylinder 82, and thus the regulating portion 86 can move integrally with the magazine 2. As illustrated in FIG. 4A, in the regulating portion 86, when the magazine 2 is moved from the closed position P1 to the openable and closable position P2, the inclined surface 86*d* of the claw portion 86*a* is pressed against an opening edge of the hole portion 13*c*. Accordingly, as illustrated in FIG. 7A, the regulating portion 86 moves to a regulation release position P8 at which the regulating portion 86 retracts to a back side of the second passage portion 13*b* in the rotation operation with the shaft 86*b* as a fulcrum.

Example of Opening and Closing Operation of Magazine According to Aspect of Present Disclosure Next, an example of an opening and closing operation of the cap portion 22 will be described.

When the magazine 2 is moving to the closed position P1, the cap portion 22 closes the accommodating portion 20, and the cap portion 22 is held in a state in which the accommodating portion 20 is closed. That is, in the magazine 2, the engaged portion 22*e* of the cap portion 22 is engaged with the engaging portion 23*c* of the door portion 23.

When the magazine 2 is moving to the closed position P1, the first engaging recessed portion 27*a* of the holding portion 27 of the operation unit 26 faces the shaft 27*c*. When the operation unit 26 rotates in the first rotation direction with the shaft 26*a* as a fulcrum, the first engaging recessed portion 27*a* of the holding portion 27 is engaged with the shaft 27*c*.

When the magazine 2 is moving to the closed position P1, the acting portion 25*c* is pressed against the engaged portion 22*e*, and the pressing portion 25 rotates from the release position to the pressing position in the rotation operation with the shaft 25*a* as a fulcrum and is held at the pressing position. Accordingly, the magazine 2 is held at the closed position P1.

When the magazine 2 is moving to the closed position P1, the outflow port 83*c* is connected to the feeding flow path 84 by the relative movement of the switching cylinder 83*a* and the switching valve 83*b* of the switcher 83 of the feeding portion 8.

In order to open the cap portion 22, the magazine 2 is moved in the second direction. Therefore, first, the operation unit 26 is moved in a direction in which the magazine 2 is moved in the second direction. When the operation unit 26 receives a force for moving the magazine 2 in the second direction, the operation unit 26 rotates in the second rotation direction with the shaft 26*a* as a fulcrum. When the operation unit 26 rotates in the second rotation direction, the engagement between the first engaging recessed portion 27*a* and the shaft 27*c* is released. Accordingly, the magazine 2 can move from the closed position P1 to the openable and closable position P2.

In the magazine 2, the accommodating portion 20 and the cap portion 22 integrally move in the second direction by an operation of further moving the operation unit 26 in the second direction. When the magazine 2 is moved from the closed position P1 to the openable and closable position P2, the engaged portion 22*e* is disengaged from the engaging portion 23*c*, and the engagement between the engaged portion 22*e* and the engaging portion 23*c* is released. In this way, by moving the operation unit 26 in the direction in which the magazine 2 is moved in the second direction, the operation of releasing the engagement between the first engaging recessed portion 27*a* and the shaft 27*c* and the operation of moving the magazine 2 from the closed position Pt to the openable and closable position P2 can be performed simultaneously.

When the magazine 2 is moved from the closed position P1 to the openable and closable position P2, the engaged portion 22*e* is separated from the acting portion 25*c*, and the pressing portion 25 rotates from the pressing position to the release position by the biasing of the biasing member 25*b*.

Accordingly, the cap portion 22 can be opened toward the accommodating portion 20. In a state in which the nails 200 are not accommodated in the magazine 2, the fastener support portion 20*a* is biased by the biasing member 20*e* in the opening direction of the cap portion 22, whereby the cap portion 22 is opened in conjunction with the fastener support portion 20*a*.

When the magazine 2 is moved from the closed position P1 to the openable and closable position P2, the first passage portion 21 is separated from the second passage portion 13*b*. Further, when the magazine 2 is moved from the closed position P1 to the openable and closable position P2, the feeding member 80 of the feeding portion 8 moves in the second direction in conjunction with the magazine 2. When the magazine 2 is moved from the closed position P1 to the openable and closable position P2, the regulating portion 86 moves to the regulation release position P8 at which the claw portion 86*a* retracts to the back side of the second passage portion 13*b*. Accordingly, when the magazine 2 is moved to the openable and closable position P2 in a state in which the nails 200 are accommodated in the magazine 2, the nail 200 is engaged with the claw portion 80*a*, whereby the connected nails 200*a* are moved in the second direction, and the leading nail 200 is moved from the injection passage 13*a* to a first passage portion 21 side and retracts from the injection passage 13*a*.

When the magazine 2 is moved to the openable and closable position P2, the feeding portion 8 seals the space between the outflow port 83*c* and the feeding flow path 84 with the sealing member 83*d* by the relative movement of the switching cylinder 83*a* and the switching valve 83*b* of the switcher 83. Accordingly, in the state in which the magazine 2 is moving to the openable and closable position P2, even when the nail driving machine 1A is operated, the compressed air is not supplied to the feeding portion 8, and the feeding portion 8 does not operate.

When the magazine 2 is moved to the openable and closable position P2 and the force for moving the magazine 2 in the second direction is not applied to the operation unit 26 in a state in which the second engaging recessed portion 27*b* faces the shaft 27*c*, the operation unit 26 rotates in the first rotation direction with the shaft 26*a* as a fulcrum. When the operation unit 26 rotates in the first rotation direction, the second engaging recessed portion 27*b* is engaged with the shaft 27*c*. Accordingly, the magazine 2 is held at the openable and closable position P2.

In order to load the nails 200 into the magazine 2, the spirally wound portion of the connected nails 200*a* is inserted into the support shaft 20*b* of the fastener support portion 20*a*. The fastener support portion 20*a* rotates to the accommodation position due to a weight of the connected nails 200*a* as the connected nails 200*a* are loaded.

When the nails 200 are loaded into the magazine 2, a portion pulled out from the spirally wound portion of the connected nails 200*a* is loaded into the first passage portion 21 and the second passage portion 13*b*. In a state in which the cap portion 22 is opened, the claw portion 80*a* of the feeding member 80 is exposed to the second passage portion 13*b*. Accordingly, the nail 200 is engaged with the claw portion 80*a* in the operation of loading the portion pulled out from the spirally wound portion of the connected nails 200*a* into the first passage portion 21 and the second passage portion 13*b*. The leading nail 200 does not need to be loaded into the injection passage 13*a* of the nose portion 13 in an operation of loading the connected nails 200*a* into the first passage portion 21 and the second passage portion 13*b*.

After the nails 200 are loaded into the magazine 2, the cap portion 22 is closed. In the state in which the magazine 2 is moving to the openable and closable position P2, the cap portion 22 is not held in a closed state even when the cap portion 22 is closed.

After the cap portion 22 is closed, the magazine 2 is moved in the first direction. Therefore, first, the operation unit 26 is rotated in the second rotation direction with the shaft 26*a* as a fulcrum. When the operation unit 26 rotates in the second rotation direction, the engagement between the second engaging recessed portion 27*b* and the shaft 27*c* is released. Accordingly, the magazine 2 can be moved from the openable and closable position P2 to the closed position P1 by moving the operation unit 26 in a direction in which the magazine 2 is moved in the first direction. When a force for directly pressing the magazine 2 to cause the magazine 2 to move in the first direction is applied after the cap portion 22 is closed, the engagement between the second engaging recessed portion 27*b* and the shaft 27*c* is held until a predetermined load is applied. When the magazine 2 is directly pressed and the predetermined load is applied, the operation unit 26 rotates in the second rotation direction with the shaft 26*a* as a fulcrum, and the engagement between the second engaging recessed portion 27*b* and the shaft 27*c* is released. Accordingly, the magazine 2 can also be moved from the openable and closable position P2 to the closed position P1 by directly pressing the magazine 2 in the direction of moving in the first direction.

The accommodating portion 20 and the cap portion 22 of the magazine 2 integrally move in the first direction in an operation of further moving the operation unit 26 in the first direction. When the magazine 2 is moved from the openable and closable position P2 to the closed position P1 in the state in which the cap portion 22 is closed, the engaged portion 22*e* presses the acting portion 25*c* of the pressing portion 25.

When the acting portion 25*c* is pressed against the engaged portion 22*e*, the pressing portion 25 rotates from the release position to the pressing position in the rotation operation with the shaft 25*a* as a fulcrum. The pressing portion 25 is held at the pressing position when the acting portion 25*c* is pressed against the engaged portion 22*e*.

When the magazine 2 is moved from the openable and closable position P2 to the closed position P1 in the state in which the cap portion 22 is closed, the engaged portion 22*e* is engaged with the engaging portion 23*c*. Accordingly, the magazine 2 is moved to the closed position P1, whereby the cap portion 22 is held in the state in which the accommodating portion 20 is closed. In addition, the cap portion 22 in the closed state is pressed by the pressing portion 25.

When the magazine 2 is moved from the openable and closable position P2 to the closed position P1, the first passage portion 21 and the second passage portion 13*b* are connected to each other. In addition, when the magazine 2 is moved from the openable and closable position P2 to the closed position P1, the feeding member 80 of the feeding portion 8 is moved in the first direction in conjunction with the magazine 2. Accordingly, when the magazine 2 is moved to the closed position P1 in the state in which the nails 200 are accommodated in the magazine 2, the nail 200 is engaged with the claw portion 80*a*, whereby the nails 200 are moved in the first direction, and the leading nail 200 is moved to the injection passage 13*a*.

When the magazine 2 is moved from the openable and closable position P2 to the closed position P1, the regulating portion 86 moves to the movement regulation position P7 at which the claw portion 86*a* protrudes from the hole portion 13*c* to the surface side of the second passage portion 13*b*. Accordingly, the regulating portion 86 regulates the connected nails 200*a* from moving in the direction separated from the injection passage 13*a*.

When the magazine 2 is moved to the closed position P1, the outflow port 83*c* is connected to the feeding flow path 84 by the relative movement of the switching cylinder 83*a* and the switching valve 83*b* of the switcher 83 of the feeding portion 8. Accordingly, in the state in which the magazine 2 is moving to the closed position P1, when the nail driving machine 1A is operated, the compressed air is supplied to the feeding portion 8 at a predetermined timing, and the feeding portion 8 is operated.

When the magazine 2 is moved to the closed position P1 and the force for moving the magazine 2 in the first direction is not applied to the operation unit 26 in the state in which the first engaging recessed portion 27*a* faces the shaft 27*c*, the operation unit 26 rotates in the first rotation direction with the shaft 26*a* as a fulcrum. When the operation unit 26 rotates in the first rotation direction, the first engaging recessed portion 27*a* is engaged with the shaft 27*c*. Accordingly, the magazine 2 is held at the closed position P1.

The nail driving machine 1A can also be operated to open the cap portion 22 by releasing the holding of the door portion 23 in the closed state and opening the door portion 23 in the operation of the door operation unit 23*d*, similarly to the configuration in the related art. That is, when the door portion 23 is opened, the engaging portion 23*c* is displaced from a position at which the engaging portion 23*c* is engaged with the engaged portion 22*e*, and the pressing portion 25 is displaced from a position at which the cap portion 22 is pressed. Accordingly, when the door portion 23 is opened, the cap portion 22 is opened, and the claw portion 80*a* of the feeding member 80 is exposed.

Nail Driving Operation Example of Nail Driving Machine According to Present Embodiment Related to Aspect of Present Disclosure Next, the operation of driving the nails 200 by the nail driving machine 1A will be described. As described above, when the nails 200 are loaded into the magazine 2 in the operation of moving the magazine 2 from the openable and closable position P2 to the closed position P1, the leading nail 200 is located in the injection passage 13*a*.

When the nails 200 are to be driven by the nail driving machine 1A, an operator presses the contact portion 7 against the driving target material (not shown) and operates the trigger 6.

The valve stem 50 of the starting valve 5 is pressed in the combination of the operation of the trigger 6 and the operation of pressing the contact portion 7 against the driving target material. In the starting valve 5, when the valve stem 50 is moved from a standby position, the balance of an air pressure of compressed air applied to the pilot valve 51 changes, whereby the pilot valve 51 is operated, and the pilot valve 51 is moved from the standby position.

When the pilot valve 51 is moved from the standby position, the balance between an air pressure of compressed air applied to the main valve 4 and the biasing force of the main valve spring 40 changes, whereby the main valve 4 is opened.

When the main valve 4 is opened, the striking portion 3 supplies the compressed air to the striking cylinder 30. When the striking portion 3 supplies the compressed air to the striking cylinder 30, the striking piston 31 to which the driver 32 is attached is pressed by the air pressure, and moves downward from the top dead center position to the bottom dead center position. As the striking piston 31 moves from the top dead center position to the bottom dead center position, the striking portion 3 drives the nail 200 located in the injection passage 13*a* into the driving target material by the driver 32.

When the striking piston 31 moves downward from the top dead center position in the operation of driving the nails 200, the blowback chamber 33 is supplied with the air on an upper side of the striking piston 31, and a pressure in the blowback chamber 33 increases.

In the striking portion 3, when the pressure in the blowback chamber 33 increases, the compressed air in the blowback chamber 33 is supplied from the feeding flow path 84 to the feeding cylinder 82. Accordingly, in the feeding portion 8, the feeding member 80 connected to the feeding piston 81 is moved in the second direction separated from the injection passage 13*a*.

When the magazine 2 is moving to the closed position P1, the regulating portion 86 is moved to the movement regulation position P7 at which the claw portion 86*a* protrudes from the hole portion 13*c* to the surface side of the second passage portion 13*b* as illustrated in FIG. 7B. When the feeding member 80 is moved in the direction separated from the injection passage 13*a*, the nail 200 comes into contact with the regulating surface 86*c* of the claw portion 86*a* of the regulating portion 86. Accordingly, the regulating portion 86 regulates the connected nails 200*a* from moving in the direction separated from the injection passage 13*a*.

When the feeding member 80 of the feeding portion 8 moves in the direction separated from the injection passage 13*a* in the state in which the regulating portion 86 regulates the connected nails 200*a* from moving in the direction separated from the injection passage 13*a*, the claw portion 80*a* is pressed against the nail 200 and retracts from the second passage portion 13*b* in the rotation operation with the shaft 80*b* as a fulcrum. When the feeding member 80 of the feeding portion 8 moves to a position at which the claw portion 80*a* passes through the leading nail 200, the claw portion 80*a* protrudes to the second passage portion 13*b* and is engaged with the next nail 200.

When the driving of the nails 200 ends, the operator moves the nail driving machine 1A in a direction separated from the driving target material. Further, the operation of the trigger 6 ends.

When the nail driving machine 1A moves in the direction separated from the driving target material, the contact portion 7 is separated from the driving target material and returns to the standby position, or when the operation of the trigger 6 ends, the valve stem 50 of the starting valve 5 returns to the standby position. In the starting valve 5, when the valve stem 50 returns to the standby position, the balance of the air pressure of the compressed air applied to the pilot valve 51 changes, whereby the pilot valve 51 returns to the standby position.

When the pilot valve 51 returns to the standby position, the balance between the air pressure of the compressed air applied to the main valve 4 and the biasing force of the main valve spring 40 changes, whereby the main valve 4 is closed.

In the striking portion 3, when the main valve 4 is closed, the supply of the compressed air to the striking cylinder 30 is stopped, and the air in the striking cylinder 30 is discharged, whereby a pressure in the striking cylinder 30 decreases. In the striking portion 3, when the pressure in the striking cylinder 30 decreases, the compressed air in the blowback chamber 33 is supplied to a space below the striking piston 31, and the striking piston 31 moves to the top dead center position.

In the blowback chamber 33, when the compressed air is supplied from the blowback chamber 33 to the striking cylinder 30, the pressure in the blowback chamber 33 decreases.

When the compressed air in the blowback chamber 33 is supplied to the striking cylinder 30 and the pressure in the blowback chamber 33 decreases, in the feeding portion 8, the air in the feeding cylinder 82 flows into the blowback chamber 33 and is discharged via the striking cylinder 30, whereby the air pressure in the feeding cylinder 82 decreases. In the feeding portion 8, when the air pressure in the feeding cylinder 82 decreases, an air pressure applied to the feeding piston 81 decreases, and the feeding member 80 connected to the feeding piston 81 moves in the direction approaching the injection passage 13*a* by the biasing of the biasing member 85. When the feeding member 80 is moved in the direction approaching the injection passage 13*a*, the feeding portion 8 feeds the next nail 200 engaged with the claw portion 80*a* to the injection passage 13*a*.

In an operation of feeding the next nail 200 to the injection passage 13*a*, the further next nail 200 of the connected nails 200*a* comes into contact with the inclined surface 86*d* of the claw portion 86*a* of the regulating portion 86. Accordingly, the inclined surface 86*d* of the claw portion 86*a* of the regulating portion 86 is pressed against the nail 200 and retracts from the second passage portion 13*b*. When the leading nail 200 of the connected nails 200*a* is fed to be located in the injection passage 13*a* and the nail 200 passes through the claw portion 86*a*, the claw portion 86*a* of the regulating portion 86 protrudes to the second passage portion 13*b*, and regulates the connected nails 200*a* from moving in the direction separated from the injection passage 13*a*. Accordingly, the next nail 200 can be driven out.

Next, an operation referred to as "additional driving" of driving the nail 200 driven into the driving target material again by using the nail driving machine 1A will be described.

In recent years, for the purpose of quake resistance, fire resistance, and fire prevention, laminated woods such as LSL and LVL are frequently used as building materials. The laminated woods are difficult to be laminated by uniformly applying an adhesive, and a portion at which the amount of the adhesive is large is harder. Therefore, a driving depth of the nail varies. Since the portion at which the amount of the adhesive is large is hard, a head portion of the nail may be lifted from the driving target material even when the nail driving machine is used. Since it is difficult to specify the amount of the adhesive from the appearance of the laminated woods, it is difficult to perform construction while avoiding the hard portion. In addition, a knot is present even in a solid wood material, and a knot portion is harder than other portions, and thus the nail may be lifted. When an upper material is placed on the solid wood material, it becomes difficult to visually recognize the knot, and thus it is difficult to perform construction while avoiding the knot.

When a driving force and a driving amount of the nail driving machine are set in accordance with a hard portion of the driving target material, there is a possibility that the nail is driven too deep at other construction positions, and a construction problem such as a reduction in pullout strength resistance of the nail occurs. In addition, since the hard portion of the driving target material is partial, excessive power is applied to other construction positions, and the amount of used compressed air increases.

Therefore, in the related art, the driving force and the driving amount are adjusted such that the head portion of the nail is flush with the portions of the driving target material that are not hard, and when the nail is lifted, the nail is driven again by a manual tool such as a hammer. However, when the nail is driven again by the manual tool such as a hammer, it requires labor.

On the other hand, there is also a method of driving the lifted nail again by idle-driving the lifted nail with the nail driving machine. However, it is necessary to take out the connected nails loaded in the magazine in order to perform the idle-driving by using the nail driving machine, and it takes time and effort to attach and detach the connected nails. In addition, in order to return to a normal state in which the nail driving machine can be used, it is necessary to load the connected nails again, and it also takes time and effort.

Therefore, the time and effort for the idle-driving are reduced by allowing the nails 200 to be retracted from the injection passage 13*a* by the movement of the magazine 2. In a case of performing the additional driving by the idle-driving of the nail driving machine 1A, the accommodating portion 20 is closed by the cap portion 22, the magazine 2 is moved from the closed position P1 to the openable and closable position P2, and the cap portion 22 by which the accommodating portion 20 is closed is pressed by the sub-operation unit 28.

The operation of moving the magazine 2 to the openable and closable position P2 is the same as the operation of opening the cap portion 22 described above. When the magazine 2 of the nail driving machine 1A is moved to the openable and closable position P2, the leading nail 200 of the connected nails 200*a* is moved from the injection passage 13*a* to the first passage portion 21 side and retracts from the injection passage 13*a*.

In addition, the feeding portion 8 seals the space between the feeding flow path 84 connected to the feeding cylinder 82 and the outflow port 83*c* of the switching valve 83*b* with the sealing member 83*d*, and even when the nail driving machine 1A is operated, the compressed air is not supplied to the feeding portion 8, and the feeding portion 8 does not operate. Accordingly, in the operation of moving the magazine 2 to the openable and closable position P2, the compressed air is not supplied to the feeding cylinder 82, the feeding cylinder 82 moves in the direction separated from the injection passage 13*a*, and a position of the feeding piston 81 is fixed with respect to the feeding cylinder 82.

Further, the operation unit 26 holds the magazine 2 at the openable and closable position P2, and prevents the magazine 2 from moving from the openable and closable position P2 due to vibration caused by the movement of the striking piston 31, vibration caused by the driving of the nails 200 by the driver 32, or the like.

In this state, the operator aligns a position of the contact portion 7 with the nail 200 driven into the driving target material, presses the contact portion 7 against the driving target material (not shown), and operates the trigger 6.

In the nail driving machine 1A, the starting valve 5 is operated in a combination of the operation of the trigger 6 and the operation of pressing the contact portion 7 against the driving target material, and the main valve 4 is opened by the operation of the starting valve 5.

In the nail driving machine 1A, since the main valve 4 is opened, the compressed air is supplied to the striking cylinder 30, and the striking piston 31 to which the driver 32 is attached moves from the top dead center position to the bottom dead center position. In the nail driving machine 1A, since the striking piston 31 moves from the top dead center position to the bottom dead center position in a state in which the nail 200 retracts from the injection passage 13*a*, the driver 32 drives the nail 200 again, which protrudes from the contact portion 7 and is driven into the driving target material, and the driving depth is increased.

In the nail driving machine 1A, when the striking piston 31 moves downward from the top dead center position, the pressure in the blowback chamber 33 increases. However, when the magazine 2 is moving to the openable and closable position P2, even when the pressure in the blowback chamber 33 increases, the compressed air is not supplied to the feeding cylinder 82, and the feeding portion 8 does not operate.

When the driving of the nail 200 ends and the nail driving machine 1A moves in the direction separated from the driving target material, the contact portion 7 is separated from the driving target material and returns to the standby position, or when the operation of the trigger 6 ends, the main valve 4 is closed by the operation of the starting valve 5, and the striking piston 31 moves to the top dead center position.

Then, the holding of the magazine 2 at the openable and closable position P2 is released by an operation of the operation unit 26 for moving the magazine 2 from the openable and closable position P2 to the closed position P1. When the magazine 2 is moved from the openable and closable position P2 to the closed position P1, the connected nails 200*a* move in the first direction, and the leading nail 200 moves to the injection passage 13*a*. Accordingly, the next nail 200 can be driven out.

Figure 9:
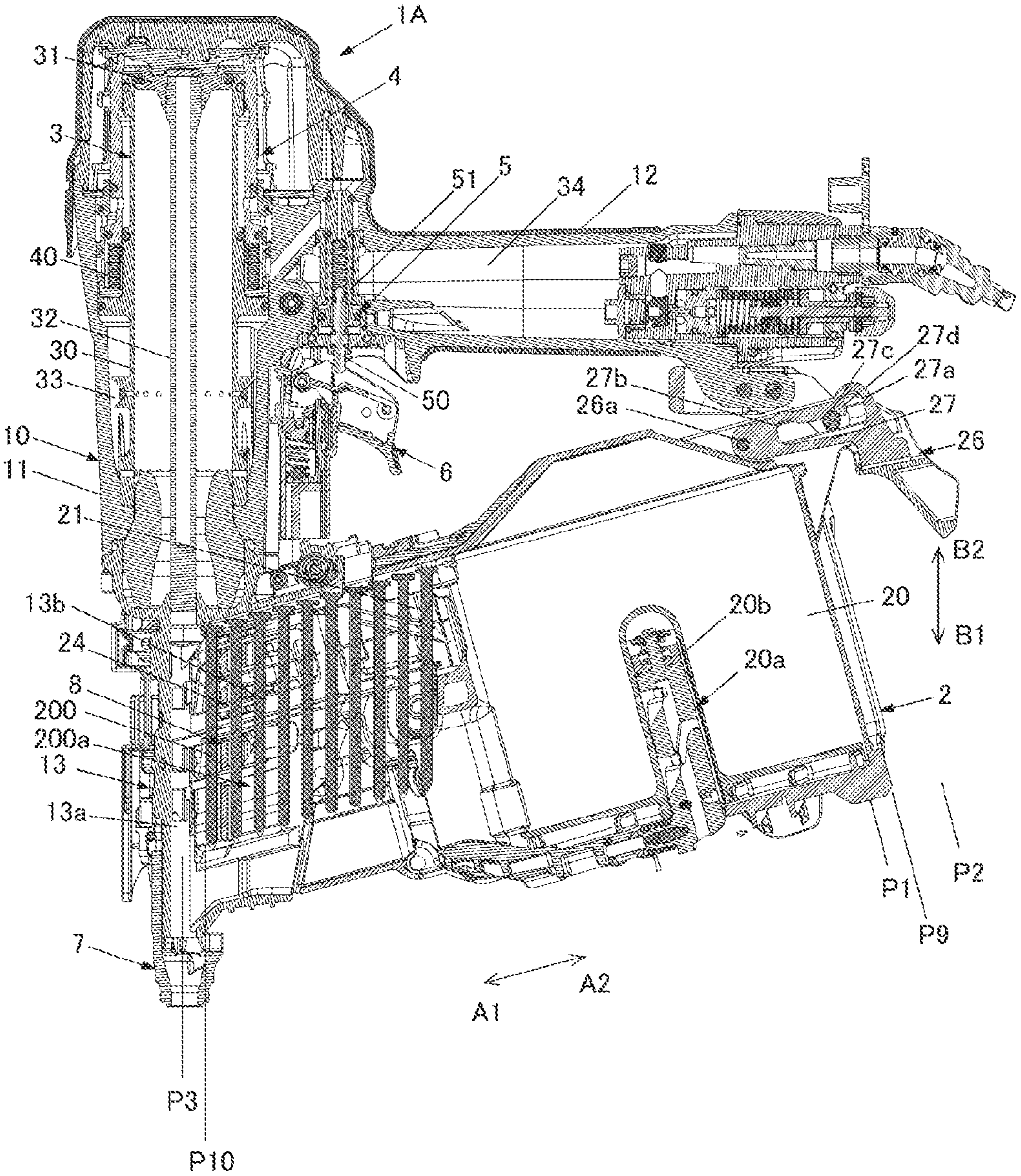
FIG. 9 is a side cross-sectional view illustrating another example of the nail driving machine according to the first embodiment related to the aspect of the present disclosure.

FIG. 9 is a side cross-sectional view illustrating another example of the nail driving machine according to the first embodiment, and illustrates a state in which the idle-driving is possible. The nail driving machine 1A may set an idle-driving enable position P9 as a third position on the movement path of the magazine 2 between the closed position P1 and the openable and closable position P2. The idle-driving enable position P9 is a position at which the nails 200 are moved from the injection enable position P3 to a second injection regulation position P10 and the nail 200 located in the injection passage 13*a* is retracted to the outside of the injection passage 13*a*. The idle-driving enable position P9 is a position at which the engagement between the engaging portion 23*c* and the engaged portion 22*e* is not released. Further, the idle-driving enable position P9 is a position at which the space between the outflow port 83*c* and the feeding flow path 84 is sealed with the sealing member 83*d*. The holding portion 27 may include a third engaging recessed portion 27*d* with which the shaft 27*c* is engaged when the magazine 2 is moving to the idle-driving enable position P9, and may hold the magazine 2 at the idle-driving enable position P9.

When the magazine 2 is moved to the idle-driving enable position P9, the cap portion 22 is held in the closed state by the engagement between the engaging portion 23*c* and the engaged portion 22*e*, and the idle-driving described above is possible.

Figure 10A:
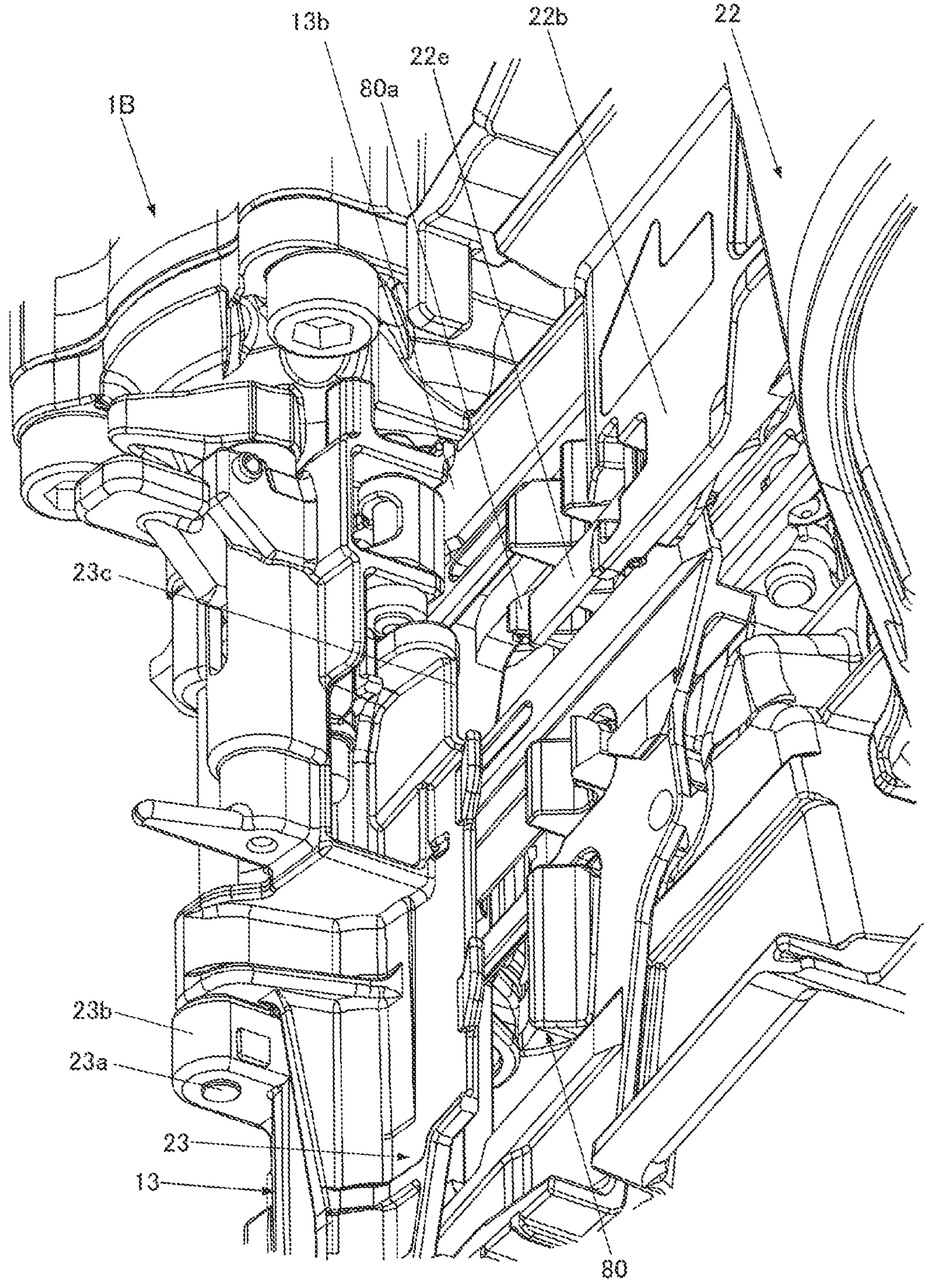
FIG. 10A is a perspective view of a main part illustrating an example of a modification of the nail driving machine according to the first embodiment related to the aspect of the present disclosure.
Figure 10B:
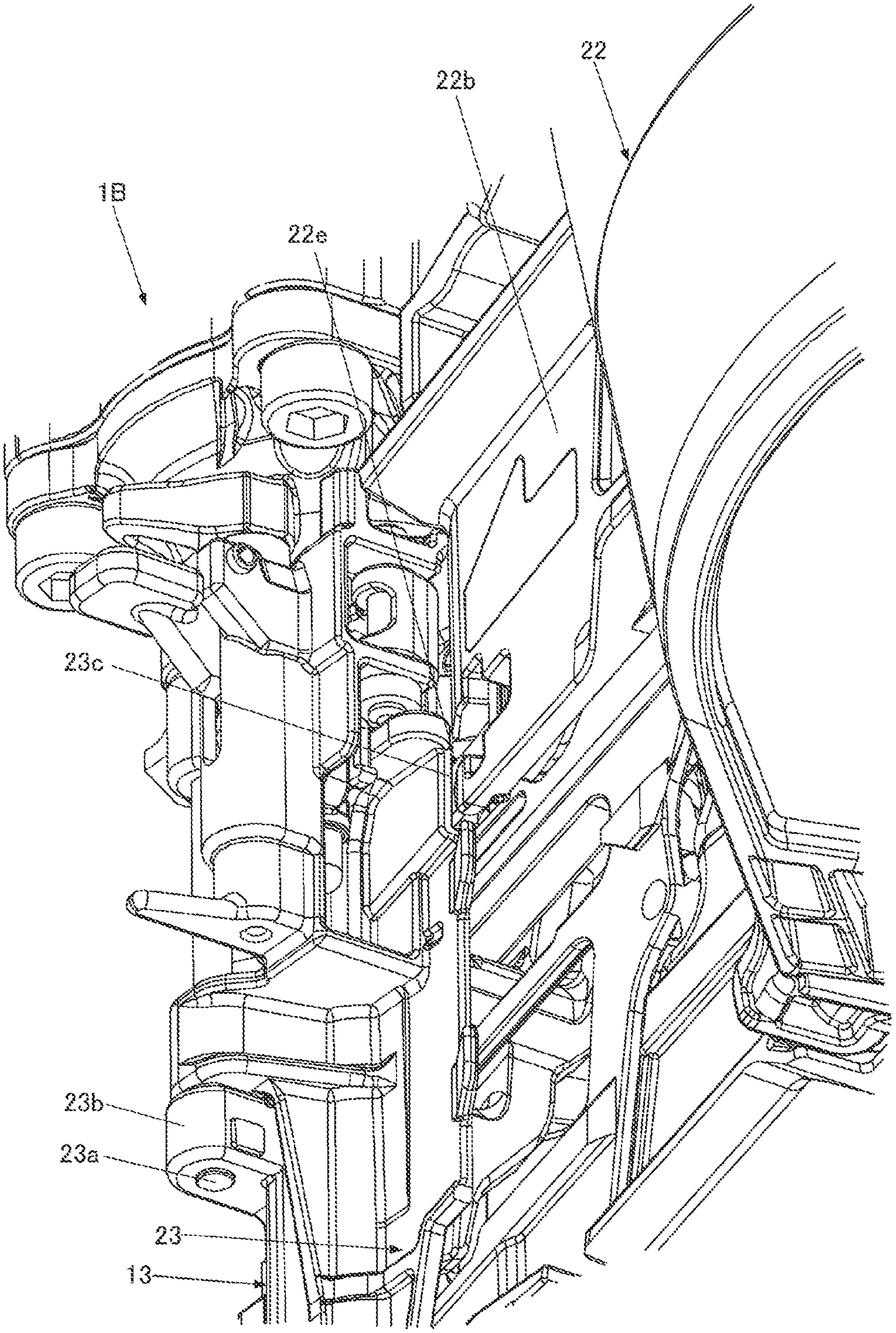
FIG. 10B is a perspective view of the main part illustrating the example of the modification of the nail driving machine according to the first embodiment related to the aspect of the present disclosure.

Modification of Nail Driving Machine According to Present Embodiment Related to Aspect of Present Disclosure FIGS. 10A and 10B are perspective views of a main part illustrating an example of a modification of the nail driving machine according to the first embodiment, and FIG. 10A illustrates a state in which the cap portion can be opened FIG. 10B illustrates a state in which the cap portion is held in the closed state.

In the nail driving machine 1A including the pressing portion 25, the pressing portion 25 moves to the release position at which the pressing of the cap portion 22 is released, whereby the pressing portion 25 retracts from the movement path of the engaged portion 22*e* in the operation of opening the cap portion 22. Accordingly, an amount of movement of the magazine 2 until the engagement between the engaged portion 22*e* and the engaging portion 23*c* is released is reduced. In addition, a force for holding the cap portion 22 in the closed state is dispersed by the engagement between the engaged portion 22*e* and the engaging portion 23*c* and a force by which the pressing portion 25 presses the cap portion 22. Therefore, even if a length of a portion at which the engaged portion 22*e* and the engaging portion 23*c* are engaged with each other is reduced, the force for holding the cap portion 22 in the closed state can be secured by the engagement between the engaged portion 22*e* and the engaging portion 23*c*. Therefore, by reducing a length of the engaged portion 22*e*, the amount of movement of the magazine 2 until the engagement between the engaged portion 22*e* and the engaging portion 23*c* is released is reduced.

On the other hand, a nail driving machine 1B according to the modification does not include the pressing portion 25, and thus the length of the portion at which the engaged portion 22*e* and the engaging portion 23*c* are engaged with each other is increased by increasing the length of the engaged portion 22*e*, and the force for holding the cap portion 22 in the closed state is secured by the engagement between the engaged portion 22*e* and the engaging portion 23*c*. The nail driving machine 1B does not include the pressing portion 25, and thus the number of components to be moved can be reduced.

Figure 11:
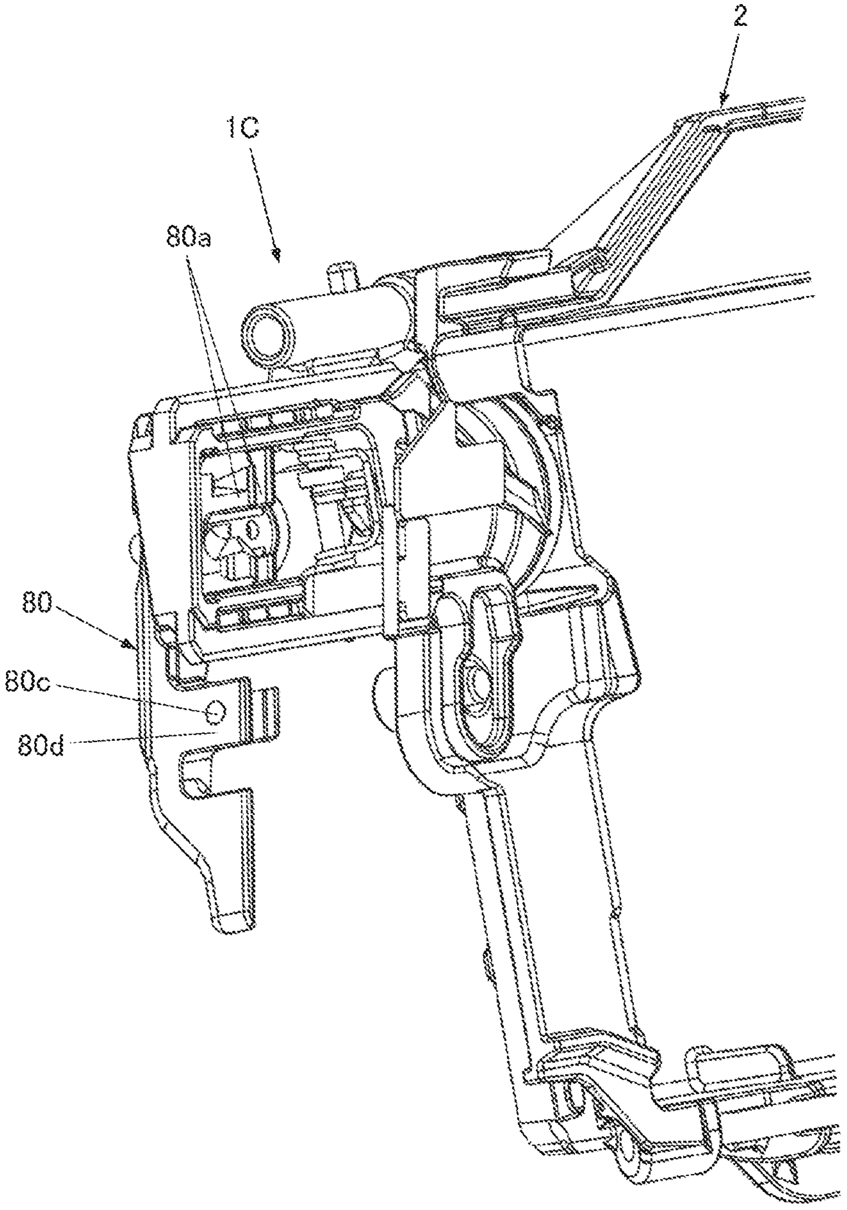
FIG. 11 is an exploded perspective view of a main part illustrating an example of a nail driving machine according to a second embodiment related to the aspect of the present disclosure.

FIG. 11 is an exploded perspective view of a main part illustrating an example of a nail driving machine according to a second embodiment. In a nail driving machine 1C according to the second embodiment, configurations similar to those of the nail driving machine 1A according to the first embodiment are denoted by the same reference numerals.

As illustrated in FIG. 4B and the like, the nail driving machine 1C includes a magnet 80*c* that engages the nail 200 located in the injection passage 13*a* with the feeding member 80. The magnet 80*c* is an example of a fastener engaging portion, and is provided in an injection passage forming portion 80*d* of the feeding member 80. When the magazine 2 is moved to the closed position P1 described above, the injection passage forming portion 80*d* is exposed to the injection passage 13*a* and forms a part of the injection passage 13*a*. The magnet 80*c* is a magnet that does not interfere with the driving out of the nails 200 by the striking portion 3, and attracts the nail 200 located in the injection passage 13*a* to the injection passage forming portion 80*d*.

In the nail driving machine 1C, the feeding member 80 is moved in the second direction from the feeding operation position P5 in the operation of moving the magazine 2 from the closed position P1 to the openable and closable position P2. When the feeding member 80 is moved in the second direction, the second nail 200 of the connected nails 200*a* engaged with the claw portion 80*a* moves in the second direction. Accordingly, the connected nails 200*a* located in the second passage portion 13*b* move in the second direction, and the leading nail 200 of the connected nails 200*a* moves in the second direction following the connected nails 200*a*. When the feeding member 80 is moved to the retraction position P6, the leading nail 200 of the connected nails 200*a* is retracted from the injection passage 13*a* to the second passage portion 13*b*.

The nail 200 located in the injection passage 13*a* is attracted to the injection passage forming portion 80*d* by the magnet 80*c*. Accordingly, when the magazine 2 is moved from the closed position P1 to the openable and closable position P2, the nail 200 located in the injection passage 13*a* moves in the second direction following the injection passage forming portion 80*d*. Therefore, when the magazine 2 is moved from the closed position P1 to the openable and closable position P2 in a state in which there is no nail 200 to be engaged with the claw portion 80*a* and the last nail 200 of the connected nails 200*a* is located in the injection passage 13*a*, the last nail 200 located in the injection passage 13*a* moves in the second direction following the injection passage forming portion 80*d*.

Accordingly, in the nail driving machine 1C, the last nail 200 of the connected nails 200*a* located in the injection passage 13*a* can be reliably retracted to the second passage portion 13*b* in the operation of moving the magazine 2 from the closed position P1 to the openable and closable position P2.

Figure 12A:
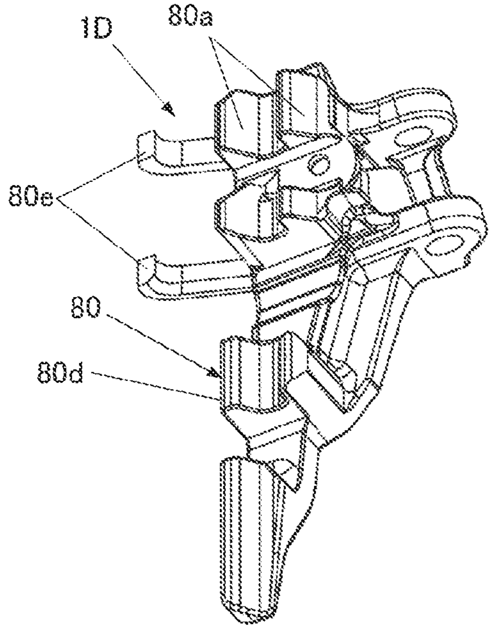
FIG. 12A is an exploded perspective view of a main part illustrating an example of a nail driving machine according to a third embodiment related to the aspect of the present disclosure.
Figure 12B:
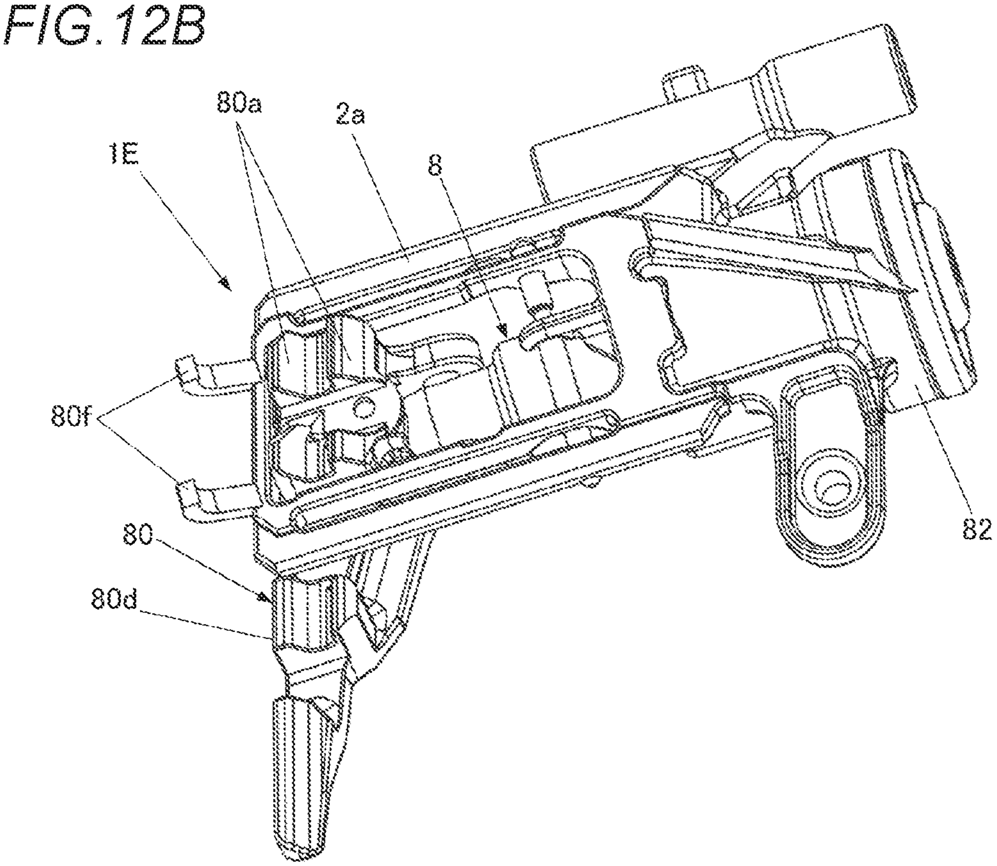
FIG. 12B is an exploded perspective view of a main part illustrating another example of the nail driving machine according to the third embodiment related to the aspect of the present disclosure.

FIG. 12A is an exploded perspective view of a main part illustrating a first example of a nail driving machine according to a third embodiment, and FIG. 12B is an exploded perspective view of a main part illustrating a second example of the nail driving machine according to the third embodiment. In a nail driving machine 1D according to the first example related to the third embodiment illustrated in FIG. 12A and a nail driving machine 1E according to the second example related to the third embodiment illustrated in FIG. 12B, configurations similar to those of the nail driving machine 1A according to the first embodiment are denoted by the same reference numerals.

The nail driving machine 1D illustrated in FIG. 12A includes a hook portion 80*e* that engages the nail 200 located in the injection passage 13*a* with the feeding member 80 as illustrated in FIG. 4B and the like. The hook portion 80*e* is an example of the fastener engaging portion and is provided in the feeding member 80. The hook portion 80*e* is constituted by providing a portion that is bent in a hook shape, and protrudes from the injection passage forming portion 80*d* of the feeding member 80 along the movement direction of the feeding member 80 to face the injection passage forming portion 80*d*. When the magazine 2 is moved to the closed position P1 described above, and the feeding member 80 is moved to the feeding operation position P5, the injection passage forming portion 80*d* is exposed to the injection passage 13*a* and forms a part of the injection passage 13*a*. When the magazine 2 is moved to the closed position P1, and the feeding member 80 is moved to the feeding operation position P5, the hook portion 80*e* faces the injection passage forming portion 80*d* and forms a part of the injection passage 13*a*.

As illustrated in FIG. 4B and the like, the nail driving machine 1E illustrated in FIG. 12B includes a hook portion 80*f* that engages the nail 200 located in the injection passage 13*a* with the feeding member 80. The hook portion 80*f* is an example of the fastener engaging portion, and is provided on a frame portion 2*a* of the magazine 2 guided to the magazine support portion 24. The hook portion 80*f* is constituted by providing a portion that is bent in a hook shape, and protrudes from the frame portion 2*a* along the movement direction of the magazine 2 to face the injection passage forming portion 80*d* of the feeding member 80 moved to the feeding operation position P5. When the magazine 2 is moved to the closed position P1, and the feeding member 80 is moved to the feeding operation position P5, the hook portion 80*f* faces the injection passage forming portion 80*d* and forms a part of the injection passage 13*a*.

Figure 12C:
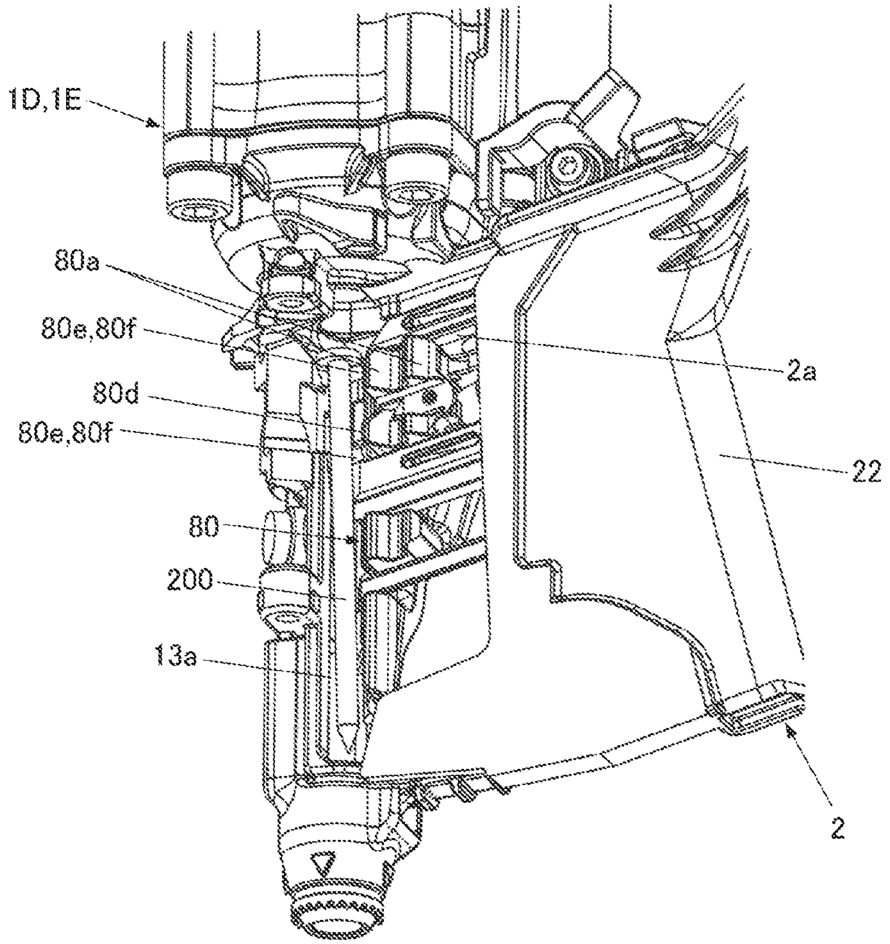
FIG. 12C is an exploded perspective view of the main part illustrating an example of an operation of the nail driving machine according to the third embodiment related to the aspect of the present disclosure.
Figure 12D:
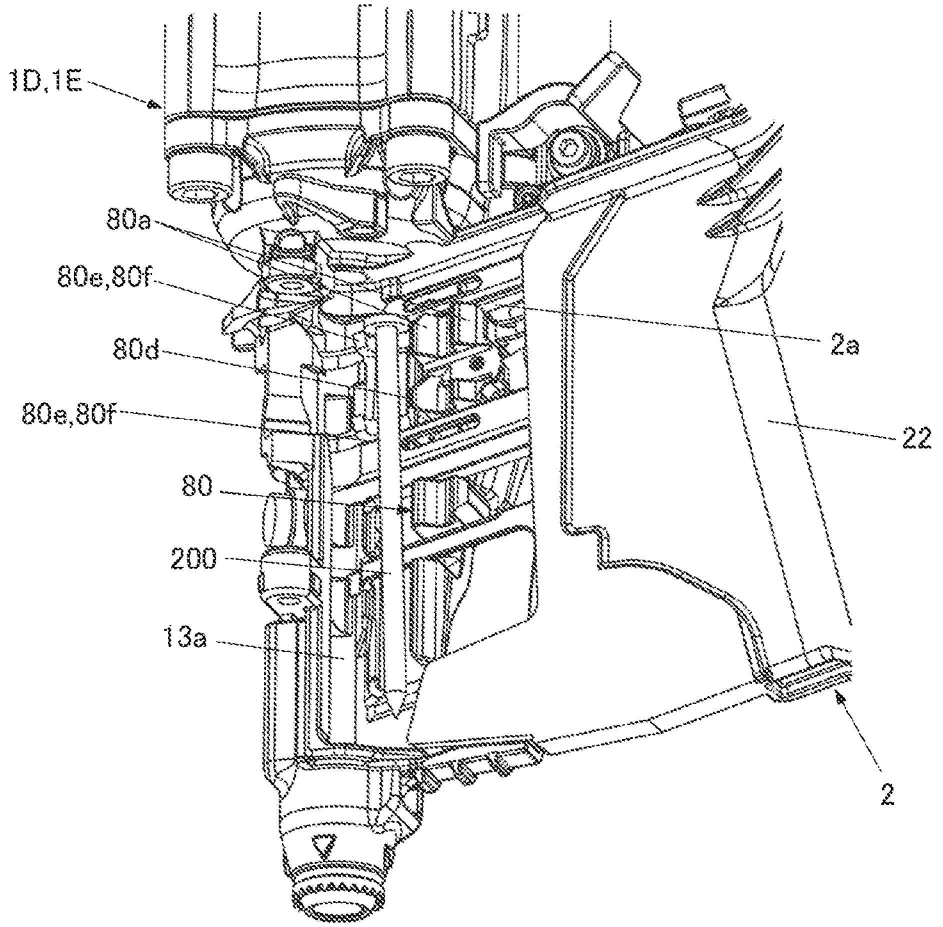
FIG. 12D is an exploded perspective view of the main part illustrating the example of the operation of the nail driving machine according to the third embodiment related to the aspect of the present disclosure.

FIGS. 12C and 12D are exploded perspective views of the main part illustrating an example of an operation of the nail driving machine according to the third embodiment. In FIGS. 12C and 12D, the pressing portion 25 is not shown. An operation of the nail driving machine 1D is described as an example, in the nail driving machine 1D, when the magazine 2 is moved to the closed position P1 and the feeding member 80 is moved to the feeding operation position P5, the injection passage forming portion 80*d* is exposed to the injection passage 13*a*, and the hook portion 80*e* faces the injection passage forming portion 80*d* and forms a part of the injection passage 13*a*. Accordingly, the hook portion 80*e* does not interfere with the driving out of the nails 200 by the striking portion 3.

In the nail driving machine 1D, the feeding member 80 is moved in the second direction from the feeding operation position P5 in the operation of moving the magazine 2 from the closed position P1 to the openable and closable position P2. When the feeding member 80 is moved in the second direction, the second nail 200 of the connected nails 200*a* engaged with the claw portion 80*a* moves in the second direction. Accordingly, the connected nails 200*a* located in the second passage portion 13*b* move in the second direction. When the feeding member 80 is moved in the second direction, the hook portion 80*e* moves in the second direction from the injection passage 13*a*. Accordingly, the leading nail 200 of the connected nails 200*a* located in the injection passage 13*a* is pressed by the hook portion 80*e* and moves in the second direction. When the feeding member 80 is moved to the retraction position P6, the hook portion 80*e* moves to the second passage portion 13*b*, and the leading nail 200 of the connected nails 200*a* is retracted from the injection passage 13*a* to the second passage portion 13*b*.

Further, as illustrated in FIG. 12C, when the magazine 2 is moved from the closed position P1 to the openable and closable position P2 in the state in which there is no nail 200 to be engaged with the claw portion 80*a* and the last nail 200 of the connected nails 200*a* is located in the injection passage 13*a*, the last nail 200 located in the injection passage 13*a* is pressed by the hook portion 80*e* as illustrated in FIG. 12D, and moves in the second direction.

The same applies to the nail driving machine 1E, when the magazine 2 is moved to the closed position P1 and the feeding member 80 is moved to the feeding operation position P5, the injection passage forming portion 80*d* is exposed to the injection passage 13*a*, and the hook portion 80*f* faces the injection passage forming portion 80*d* and forms a part of the injection passage 13*a*. Accordingly, the hook portion 80*f* does not interfere with the driving out of the nails 200 by the striking portion 3.

In the nail driving machine 1E, when the feeding member 80 is moved in the second direction from the feeding operation position P5 in the operation of moving the magazine 2 from the closed position P1 to the openable and closable position P2, as described above, the connected nails 200*a* located in the second passage portion 13*b* move in the second direction. When the feeding member 80 is moved in the second direction, the hook portion 80*f* moves in the second direction from the injection passage 13*a*. Accordingly, the leading nail 200 of the connected nails 200*a* located in the injection passage 13*a* is pressed by the hook portion 80*f* and moves in the second direction. When the feeding member 80 is moved to the retraction position P6, the hook portion 80*f* moves to the second passage portion 13*b*, and the leading nail 200 of the connected nails 200*a* is retracted from the injection passage 13*a* to the second passage portion 13*b*.

Further, as illustrated in FIG. 12C, when the magazine 2 is moved from the closed position P1 to the openable and closable position P2 in the state in which there is no nail 200 to be engaged with the claw portion 80*a* and the last nail 200 of the connected nails 200*a* is located in the injection passage 13*a*, the last nail 200 located in the injection passage 13*a* is pressed by the hook portion 80*f* as illustrated in FIG. 12D, and moves in the second direction.

Accordingly, in the nail driving machines 1D and 1E, the last nail 200 of the connected nails 200*a* located in the injection passage 13*a* can be reliably retracted to the second passage portion 13*b* in the operation of moving the magazine 2 from the closed position P1 to the openable and closable position P2.

Figure 13A:
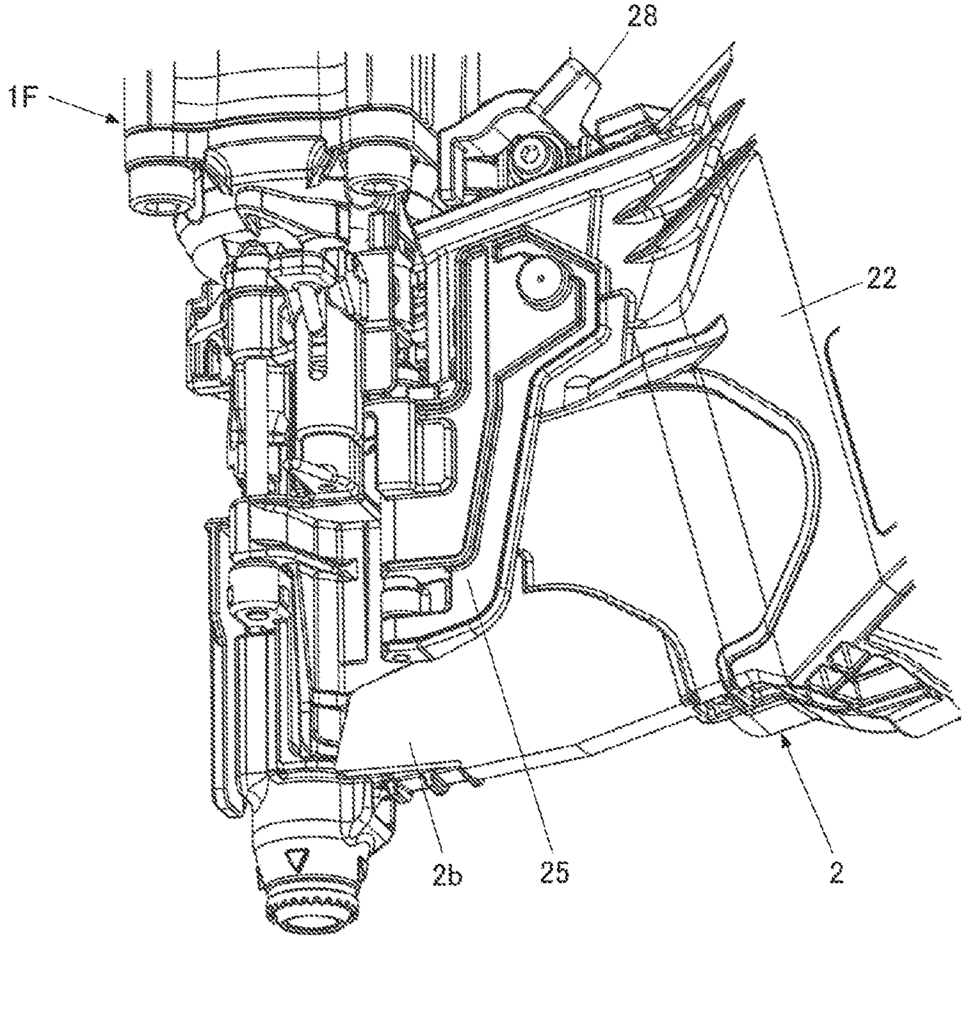
FIG. 13A is a perspective view of a main part illustrating an example of a nail driving machine according to a fourth embodiment related to the aspect of the present disclosure.
Figure 13B:
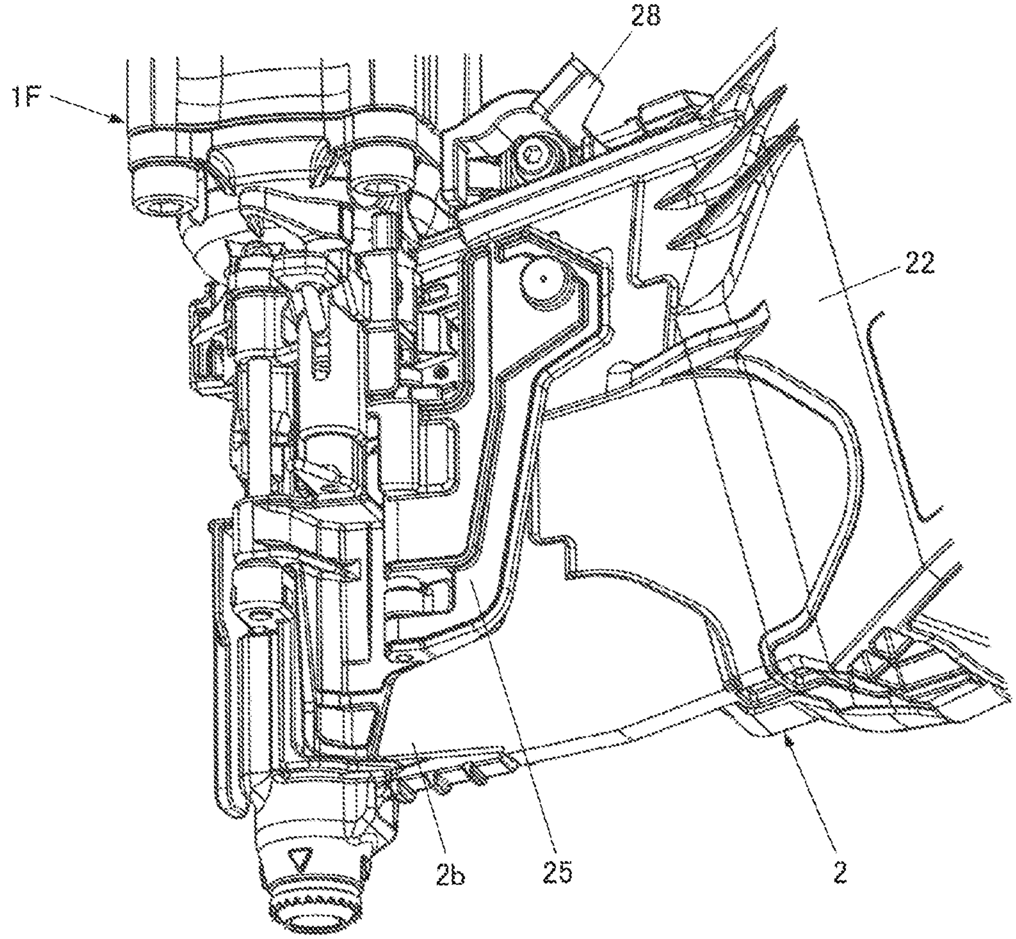
FIG. 13B is a perspective view of the main part illustrating the example of the nail driving machine according to the fourth embodiment related to the aspect of the present disclosure.
Figure 13C:
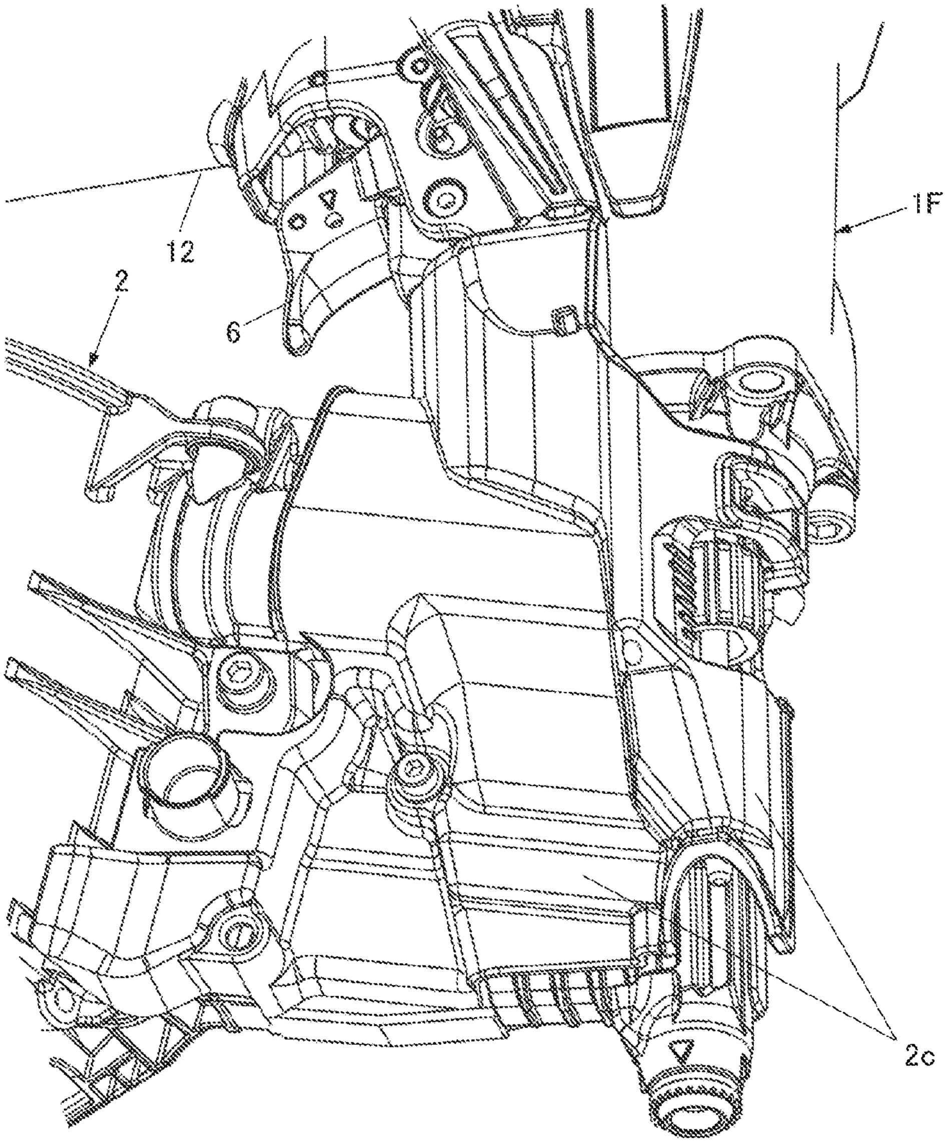
FIG. 13C is a perspective view of the main part illustrating the example of the nail driving machine according to the fourth embodiment related to the aspect of the present disclosure.

FIGS. 13A to 13C are perspective views of a main part illustrating an example of a nail driving machine according to a fourth embodiment. In a nail driving machine 1F according to the fourth embodiment, configurations similar to those of the nail driving machine 1A according to the first embodiment are denoted by the same reference numerals.

FIGS. 13A and 13B are perspective views in the vicinity of the nose portion 13 and the magazine 2 as viewed from a side on which the cap portion 22 is provided, FIG. 13A illustrates the state in which the magazine 2 is moved to the closed position P1, and FIG. 13B illustrates the state in which the magazine 2 is moved to the openable and closable position P2. In the state in which the magazine 2 is moved to the openable and closable position P2, the opening of the cap portion 22 is regulated by the sub-operation unit 28, and the nail driven into the driving target material can be driven again by using the nail driving machine 1F in a manner of idle-driving. In addition, FIG. 13C is a perspective view in the vicinity of the nose portion 13 and the magazine 2 as viewed from a side opposite to the side on which the cap portion 22 is provided.

The nail driving machine 1F includes a cover portion 2*b* that covers, for example, a side of the second passage portion 13*b* close to the injection passage 13*a*. The cover portion 2*b* is provided integrally with the cap portion 22, and moves together with the magazine 2 and the cap portion 22 when the magazine 2 moves between the closed position P1 and the openable and closable position P2.

As illustrated in FIG. 13A, in the state in which the magazine 2 is moved to the closed position P1, the cover portion 2*b* protrudes from the cap portion 22 along the movement direction of the magazine 2 to a position at which the cover portion 2*b* enters under the pressing portion 25 covering the second passage portion 13*b*. In addition, as illustrated in FIG. 13B, the cover portion 2*b* has a length to enter under the pressing portion 25 covering the second passage portion 13*b* even in the state in which the magazine 2 is moved to the openable and closable position P2.

Accordingly, in an operation of driving out the nails 200 by using the striking portion 3 of the nail driving machine 1F in the state in which the magazine 2 is moved to the closed position P1, the second passage portion 13*b* and the periphery thereof are covered with the cover portion 2*b*. Therefore, as illustrated in FIG. 4B, the connected nails 200*a* that are moved to the injection enable position P3 and are located in the second passage portion 13*b* are suppressed from being exposed in a manner of being touched from the outside.

In addition, in the nail driving machine 1F, in the state in which the magazine 2 is moved to the openable and closable position P2, and in a state in which the opening of the cap portion 22 is regulated by the sub-operation unit 28 and the nail 200 driven into the driving target material can be further driven by driving the striking portion 3 in a manner of idle-driving, the second passage portion 13*b* and the periphery thereof are covered with the cover portion 2*b* in an idle-driving operation of the striking portion 3. Therefore, as illustrated in FIG. 4A, the connected nails 200*a* that are moved to the injection avoidance position P4 and are located in the second passage portion 13*b* are suppressed from being exposed in a manner of being touched from the outside.

Further, as illustrated in FIG. 13C, the nail driving machine 1F includes a cover portion 2*c* that covers a portion of the magazine support portion 24 on the side opposite to the side on which the cap portion 22 is provided, a portion of the nose portion 13 on a side opposite to a side on which the door portion 23 is provided, and the like. Accordingly, in a state in which the connected nails 200*a* are moved to the injection enable position P3 or the injection avoidance position P4, the connected nails 200*a* located in the second passage portion 13*b* are suppressed from being exposed in a manner of being touched from the outside on the side opposite to the side on which the cap portion 22 is provided.

Therefore, in the nail driving machine 1F, it is possible to suppress the operator or the like who uses the nail driving machine 1F from inadvertently touching the connected nails 200*a* located in the second passage portion 13*b*.

Figure 14A:
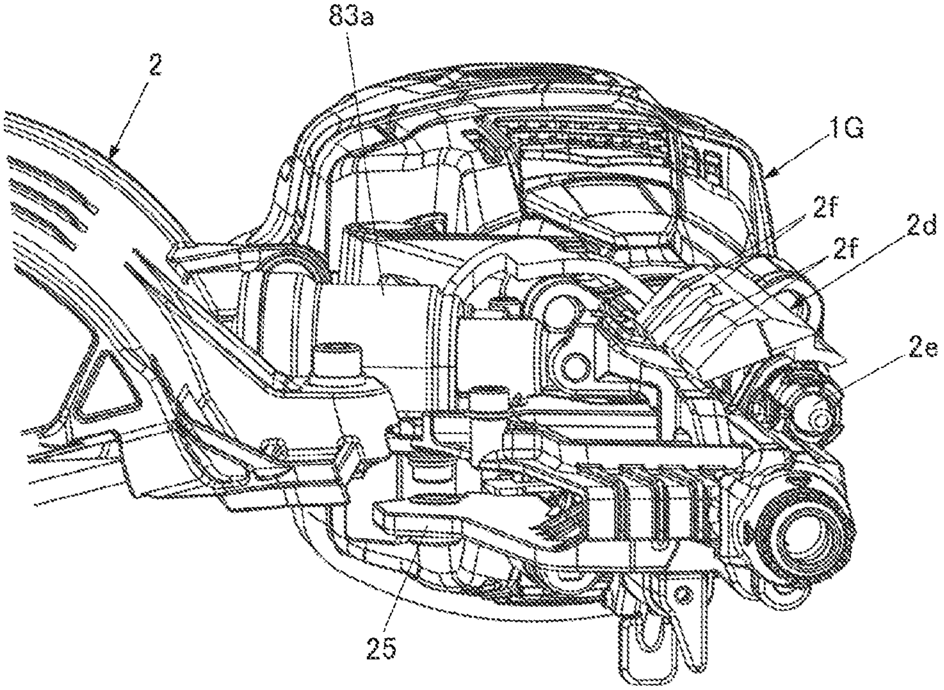
FIG. 14A is an exploded perspective view of a main part illustrating an example of a nail driving machine according to a fifth embodiment related to the aspect of the present disclosure.
Figure 14B:
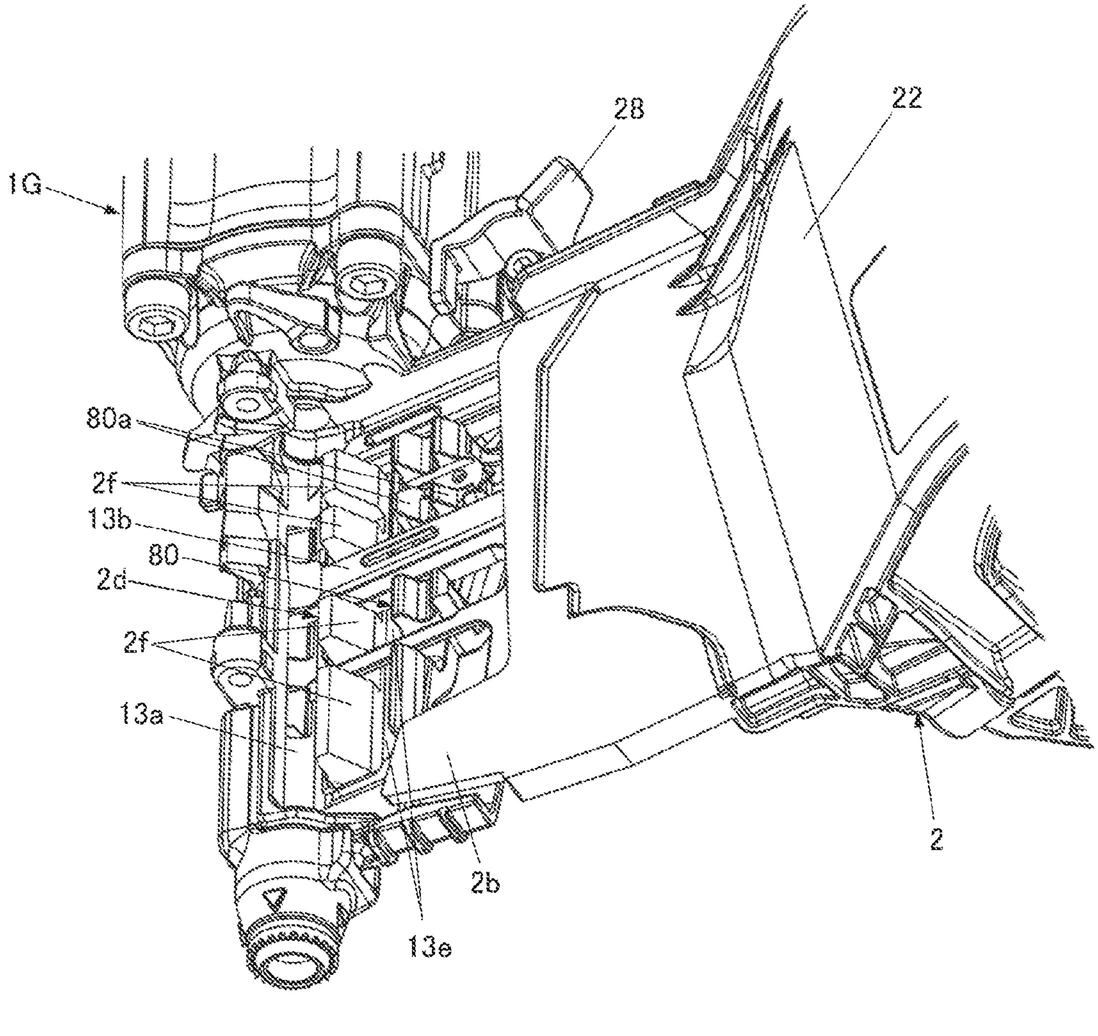
FIG. 14B is an exploded perspective view of the main part illustrating the example of the nail driving machine according to the fifth embodiment related to the aspect of the present disclosure.

FIGS. 14A to 14B are exploded perspective views of a main part illustrating an example of a nail driving machine according to a fifth embodiment. In a nail driving machine 1G according to the fifth embodiment, configurations similar to those of the nail driving machine 1A according to the first embodiment are denoted by the same reference numerals.

FIG. 14A illustrates the state in which the magazine 2 is moved to the closed position P1, and the cap portion 22 is not shown. FIG. 14B illustrates the state in which the magazine 2 is moved to the openable and closable position P2, and the door portion 23 and the pressing portion 25 are not shown.

The nail driving machine 1G includes a fastener passage cover portion 2*d* that has a closing portion 2*f* for closing a space between the injection passage 13*a* and the second passage portion 13*b* in an openable and closable manner. The fastener passage cover portion 2*d* is rotatably supported by the nose portion 13 via a shaft 2*e*. The closing portion 2*f* protrudes in a tangential direction of a rotation trajectory of the fastener passage cover portion 2*d* with the shaft 2*e* as a fulcrum. The nose portion 13 includes a hole portion 13*e* through which the closing portion 2*f* passes between the injection passage 13*a* and the second passage portion 13*b*. In a rotation operation with the shaft 2*e* as a fulcrum, the fastener passage cover portion 2*d* moves between a retraction position at which the closing portion 2*f* is retracted from the hole portion 13*e* to the outside of the second passage portion 13*b* as illustrated in FIG. 14A, and a closing position at which the closing portion 2*f* protrudes from the hole portion 13*e* to the second passage portion 13*b* as illustrated in FIG. 14B.

When the magazine 2 is moved to the closed position P1, the fastener passage cover portion 2*d* operates in conjunction with the movement of the magazine 2 and moves to the retraction position. When the magazine 2 is moved to the openable and closable position P2, the fastener passage cover portion 2*d* operates in conjunction with the movement of the magazine 2 and moves to the closing position.

Accordingly, in the nail driving machine 1G, in the state in which the magazine 2 is moved to the closed position P1, the closing portion 2*f* of the fastener passage cover portion 2*d* is retracted from the second passage portion 13*b*, and the space between the injection passage 13*a* and the second passage portion 13*b* is opened so that the connected nails 200*a* can pass therethrough. Therefore, the fastener passage cover portion 2*d* does not interfere with an operation of supplying the nail 200 from the second passage portion 13*b* to the injection passage 13*a*.

In the nail driving machine 1G, when the magazine 2 is moved to the openable and closable position P2, the closing portion 2*f* of the fastener passage cover portion 2*d* protrudes to the second passage portion 13*b*, and the space between the injection passage 13*a* and the second passage portion 13*b* is closed by the closing portion 2*f* Therefore, in the state in which the magazine 2 is moved to the openable and closable position P2, the feeding member 80 cannot move to a position at which the feeding member 80 forms a part of the injection passage 13*a*, and the connected nails 200*a* located in the second passage portion 13*b* can be suppressed from being inadvertently supplied to the injection passage 13*a*.

Hereinafter, embodiments of a nail driving machine as an example of a driving tool of the present disclosure according to another aspect of the present disclosure will be described with reference to the drawings.

Figure 15:
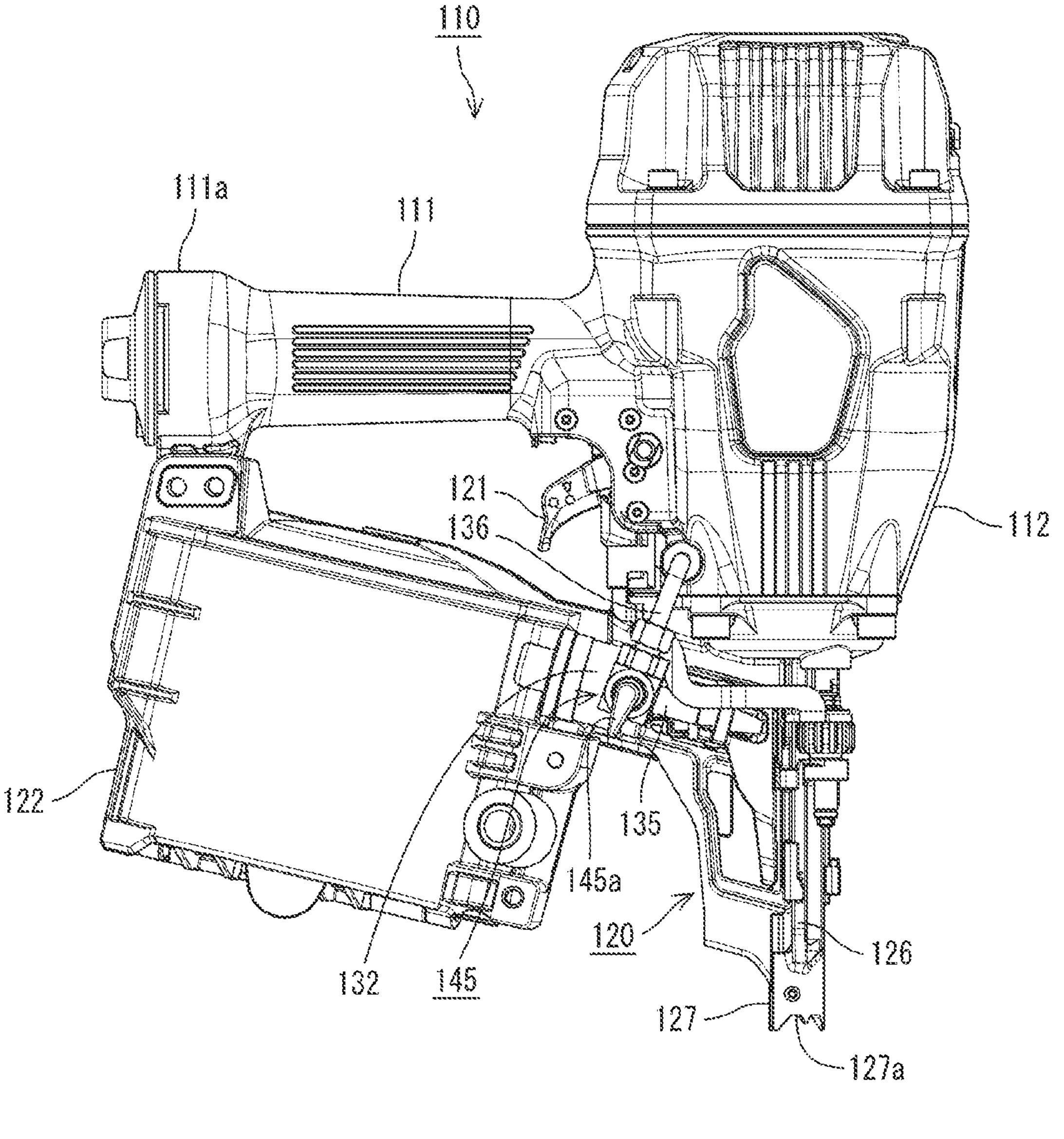
FIG. 15 is a side view of a nail driving machine (a driving tool) according to another aspect of the present disclosure.
Figure 16:
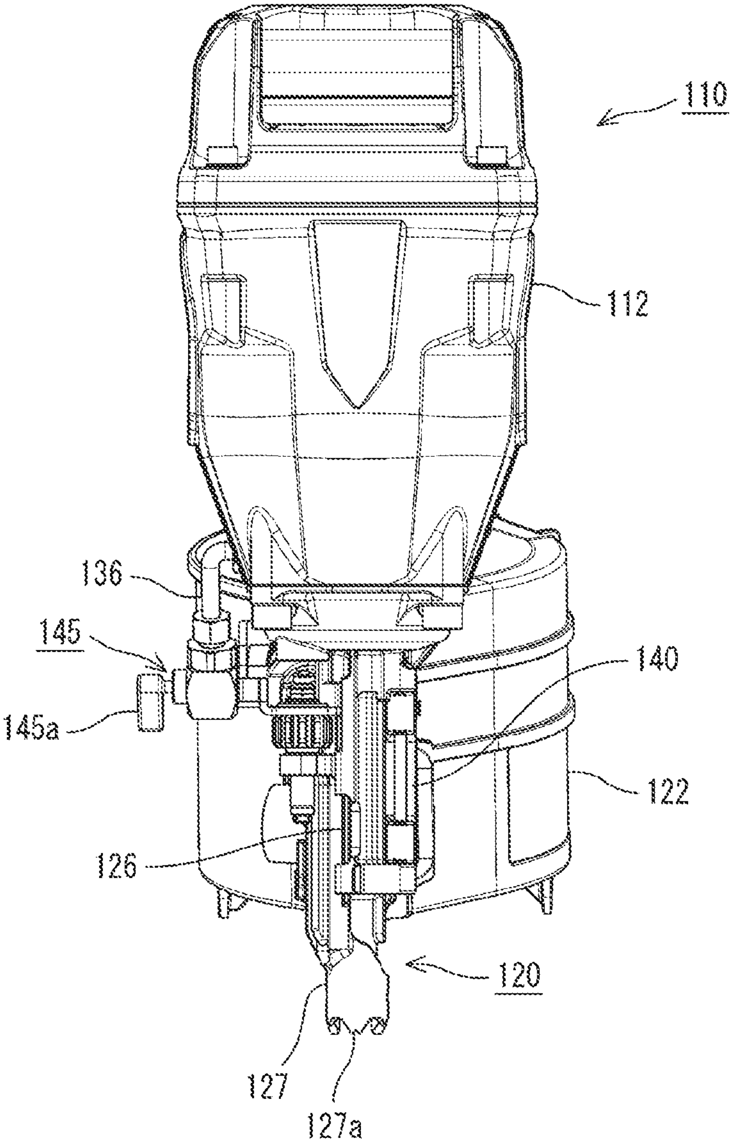
FIG. 16 is a front view of the nail driving machine according to another aspect of the present disclosure.

Configuration Example of Nail Driving Machine According to Present Embodiment Related to Another Aspect of Present Disclosure A nail driving machine 110 according to the present embodiment is a hand-held tool that drives a fastener 160 to a fastening target object. As illustrated in FIGS. 15 and 16, the nail driving machine 110 includes a body housing 112, a grip housing 111, a trigger lever 121, a magazine 122, a nose portion 120, and a contact arm 126. In the following description, a direction in which the fastener 160 is driven out is referred to as a downward direction, a direction opposite to the downward direction is referred to as an upward direction, a direction on a body housing 112 side (a right direction in FIG. 15) as viewed in an extending direction of the grip housing 111 (a direction orthogonal to a vertical direction) is referred to as a forward direction, and a direction opposite to the forward direction (a left direction in FIG. 15) is referred to as a rearward direction.

The body housing 112 is formed in a substantially cylindrical shape and incorporates a driving portion 113 that performs a driving operation of the fastener 160. The nail driving machine 110 according to the present embodiment incorporates the air pressure type driving portion 113 that drives out the fastener 160 by a pressure of compressed air. The driving portion 113 is merely an example, and the driving portion 113 may include other power sources (for example, one that operates with a gas combustion pressure, or one that operates with a motor or a spring).

Figure 17:
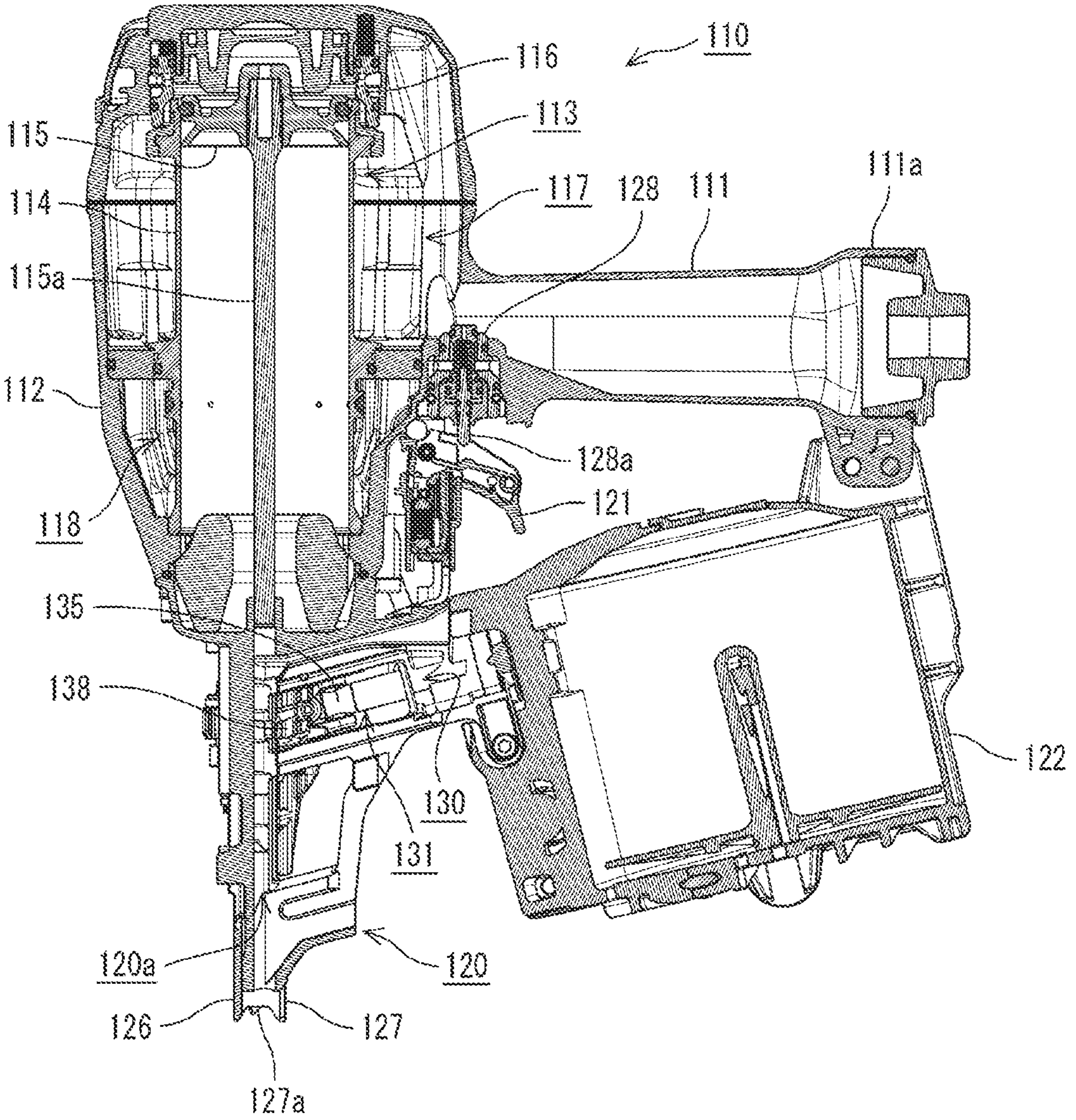
FIG. 17 is a cross-sectional view of the nail driving machine according to another aspect of the present disclosure.

The driving portion 113 is a portion that generates a driving force for the driving operation. As illustrated in FIG. 17, the driving portion 113 includes a cylinder 114, a piston 115, and a driver 115*a*. Specifically, the piston 115 is slidably accommodated in the cylinder 114 which has a cylindrical shape, and the driver 115*a* that strikes the fastener 160 is coupled to a lower surface of the piston 115. When the compressed air is supplied to an upper surface of the piston 115 in the cylinder 114, the piston 115 moves downward in an impact manner, and the fastener 160 is driven out downward by the driver 115*a* that operates integrally with the piston 115. The driving portion 113 activates on a condition that the contact arm 126 to be described later is in a sign-on state. In other words, when the contact arm 126 is not in the sign-on state, the driving portion 113 does not activate, and the fastener 160 is not driven out.

The driving portion 113 includes a main valve portion 116, a main chamber 117, and a pilot valve 128.

The main chamber 117 is a space in which compressed air supplied from the outside is stored. The main chamber 117 communicates with the inside of the grip housing 111. The compressed air stored in the main chamber 117 is supplied to the cylinder 114 to operate the piston 115.

The main valve portion 116 controls the supply of the compressed air to the cylinder 114. The main valve portion 116 is a tubular component provided in a manner of covering the vicinity of an upper end of the cylinder 114, and is disposed in a manner of being vertically movable along an axial direction of the cylinder 114. In a state of waiting for the driving of the fastener 160, the main valve portion 116 waits at a lower portion, and blocks an internal space of the cylinder 114 in a manner of not allowing the communication with the main chamber 117. Then, when driving the fastener 160, the main valve portion 116 moves upward, and allows the communication between the main chamber 117 and the internal space of the cylinder 114. When the main chamber 117 and the internal space of the cylinder 114 are allowed to communicate with each other, compressed air in the main chamber 117 is supplied to the upper surface of the piston 115 in the cylinder 114, and the piston 115 is driven.

The pilot valve 128 is a valve that controls pilot air for operating the main valve portion 116. A valve stem 128*a* is slidably disposed inside the pilot valve 128. The valve stem 128*a* is biased in a protruding direction (downward direction) in a natural state. When the valve stem 128*a* is pushed upward, the pilot valve 128 operates, and the air that applies a pressure in a direction of closing the main valve portion 116 is discharged to the outside. Accordingly, a pressure acting in a direction of opening the main valve portion 116 becomes larger than the pressure acting in the direction of closing the main valve portion 116, and the main valve portion 116 is opened. When the main valve portion 116 is opened, the compressed air in the main chamber 117 is supplied to the upper surface of the piston 115, and one driving operation is started.

The grip housing 111 is a rod-shaped portion to be gripped by the operator when the nail driving machine 110 is used. The grip housing 111 is connected to the body housing 112 described above at a substantially right angle. An internal space of the grip housing 111 functions as a part of the main chamber 117 and stores the compressed air. A supply port for supplying the compressed air from the outside to the main chamber 117 is provided at a rear end (a grip end 111*a*) of the grip housing 111.

The trigger lever 121 is an operation lever provided to be operable to open and close the pilot valve 128. The operator can drive the fastener 160 by operating the trigger lever 121. The trigger lever 121 is provided at a position operable for a hand gripping the grip housing 111. Specifically, when the operator grips the grip housing 111, the trigger lever 121 is disposed at a position at which an index finger is hooked (below the vicinity of a front end of the grip housing 111), and the trigger lever 121 can be pulled and operated by the index finger. When the trigger lever 121 is operated in the sign-on state to be described later, the valve stem 128*a* of the pilot valve 128 is pushed upward. When the valve stem 128*a* is pushed upward, the driving portion 113 operates as described above, and the fastener 160 is driven.

The magazine 122 is used for accommodating connected fasteners in which a plurality of fasteners 160 are connected. The connected fasteners accommodated in the magazine 122 are sequentially supplied to the nose portion 120 to be described later, and a leading fastener 160 is held in a manner of being located immediately below the driver 115*a* (in an injection passage 120*a* illustrated in FIG. 17).

The nose portion 120 is a portion provided integrally with a lower end of the body housing 112. The injection passage 120*a* for guiding the injection of the fastener 160 is formed inside the nose portion 120. In the injection passage 120*a*, the next fastener 160 to be driven out can be in a standby state. When the driver 115*a* described above slides toward the nose portion 120, the fastener 160 waiting in the injection passage 120*a* is driven out from a tip of the nose portion 120.

Further, a fastener supply path 130 and a feeding portion 131 are provided behind the nose portion 120.

Figure 24:
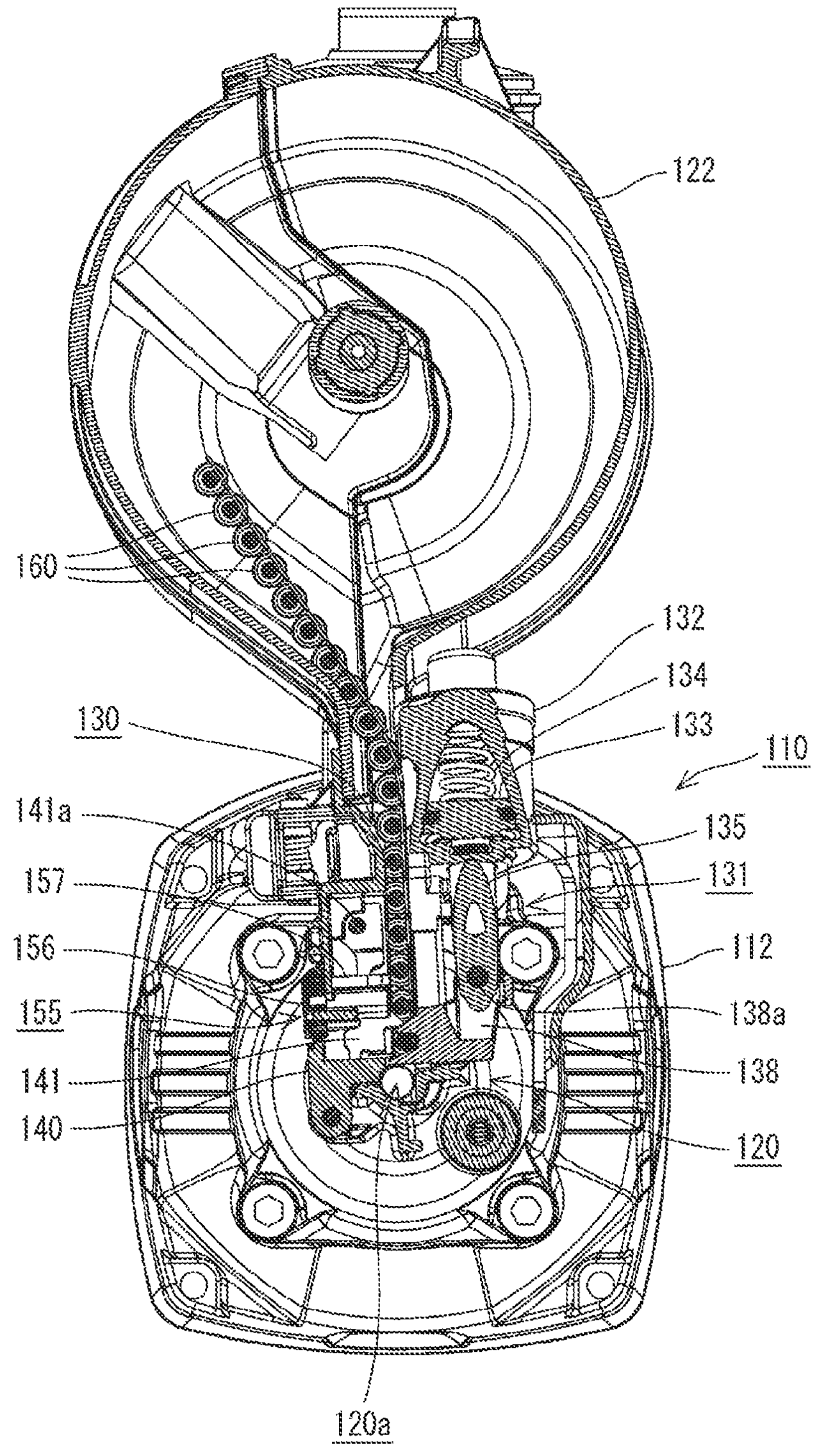
FIG. 24 is a cross-sectional view when the nail driving machine according to Modification 2 related to another aspect of the present disclosure is viewed from below.

The fastener supply path 130 is a path for guiding the connected fasteners pulled out from the magazine 122 to the injection passage 120*a*. The fastener supply path 130 is formed to connect the magazine 122 and the injection passage 120*a* with a width through which only one fastener 160 can pass. As illustrated in FIG. 24 and the like, a plurality of connected fasteners 160 are aligned and wait in the fastener supply path 130.

The feeding portion 131 is a mechanism that sequentially supplies the fastener 160 from the fastener supply path 130 to the injection passage 120*a*. The feeding portion 131 automatically supplies the fastener 160 accommodated in the magazine 122 to the injection passage 120*a* of the nose portion 120 one by one. The fastener 160 supplied to the injection passage 120*a* by the feeding portion 131 waits in the injection passage 120*a* until the next driving operation is executed.

The contact arm 126 is a safety mechanism for preventing an accident in which the fastener 160 is injected in the air. If the contact arm 126 is not brought into the sign-on state, the fastener 160 is not driven out even when the trigger lever 121 is operated.

The contact arm 126 is vertically slidable with respect to the nose portion 120, and is biased downward by a spring. An arm tip portion 127 disposed at a tip of the contact arm 126 protrudes to a position below the nose portion 120. The contact arm 126 can move upward by bringing the arm tip portion 127 into contact with and pressing the arm tip portion 127 against the fastening target object. When the contact arm 126 is pushed upward, the safety mechanism is brought into the sign-on state which is released, and the fastener 160 can be driven. On the other hand, in a state in which the contact arm 126 is not pushed upward, the safety mechanism is brought into a sign-off state in which the operation of the trigger lever 121 is disabled, and thus the fastener 160 cannot be driven out even when the trigger lever 121 is operated.

The arm tip portion 127 according to the present embodiment is attached in a manner of covering the tip of the nose portion 120. The arm tip portion 127 includes a cylindrical guide path, and the guide path communicates with the injection passage 120*a* of the nose portion 120. Therefore, the fastener 160 driven out from the tip of the nose portion 120 passes through the arm tip portion 127 and is driven into the fastening target object. In other words, an opening at a tip of the arm tip portion 127 serves as an injection port 127*a* for the fastener 160.

Nail Driving Operation Example of Nail Driving Machine According to Present Embodiment Related to Another Aspect of Present Disclosure The feeding portion 131 according to the present embodiment operates in conjunction with the driving operation, and automatically supplies the fastener 160 to the injection passage 120*a* of the nose portion 120 one by one. The operation of the feeding portion 131 is the same as that in the related art, and a basic feeding operation thereof will be described with reference to FIGS. 28A, 28B and 30.

As illustrated in FIGS. 15, 16, 28A, 28B, 30 and the like, the feeding portion 131 includes a feeding cylinder 132, a feeding piston 133, an air supply path 136, a feeding member 138, and a one-way member 141.

The feeding cylinder 132 is a cylindrical portion that slidably accommodates the feeding piston 133. The feeding piston 133 accommodated in the feeding cylinder 132 can move forward and rearward along an axial direction of the feeding cylinder 132 (a feeding direction of the fastener 160). The feeding piston 133 is constantly biased forward by a piston biasing member 134. A rod 135 protruding to the front of the feeding cylinder 132 is connected to the feeding piston 133. The feeding member 138 to be described later is pivotably attached to a tip of the rod 135. Accordingly, when the feeding piston 133 reciprocates forward and rearward, the rod 135 and the feeding member 138 also reciprocate forward and rearward simultaneously.

Figure 19:
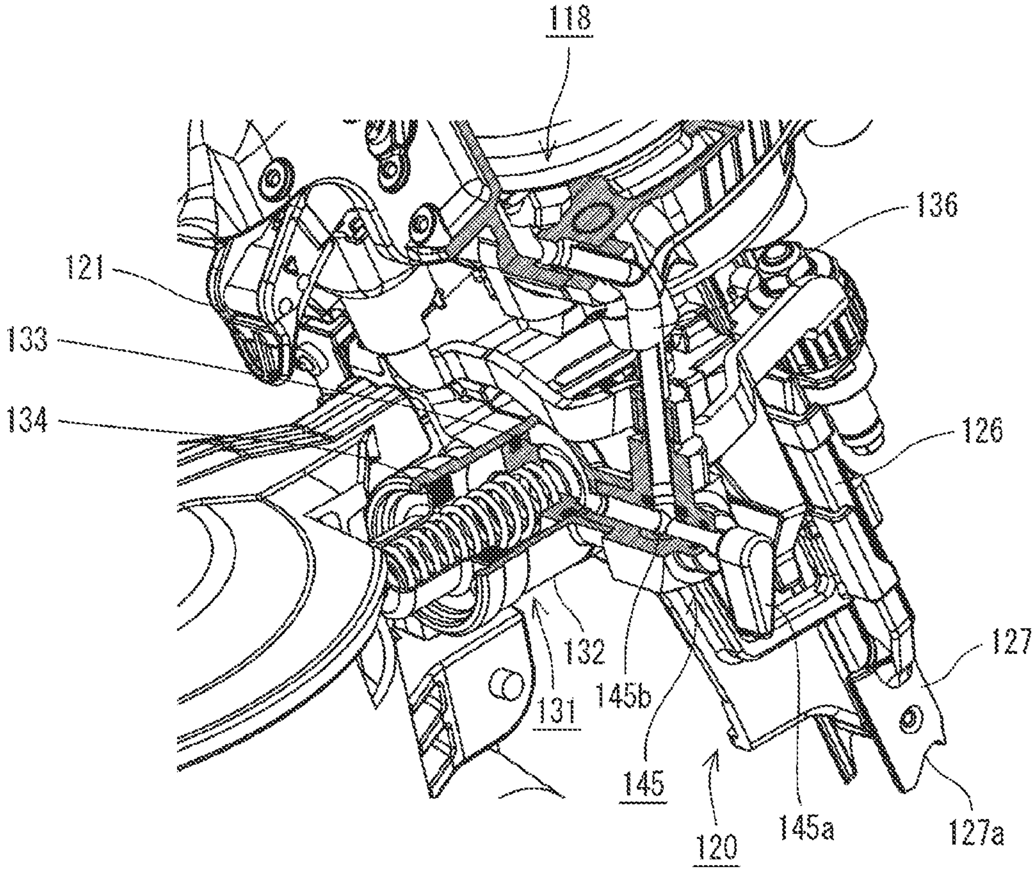
FIG. 19 is an enlarged perspective view illustrating an internal structure of a feeding portion in the vicinity of an air supply path according to another aspect of the present disclosure, in which the feeding portion is in an enabled state.

The air supply path 136 is a conduit for supplying the compressed air to the feeding piston 133. As illustrated in FIG. 19, the air supply path 136 is formed to communicate with the inside of the feeding cylinder 132. The feeding piston 133 described above operates when the compressed air is supplied from the air supply path 136. That is, when the compressed air is supplied to a front side of the feeding piston 133, the feeding piston 133 moves rearward to a predetermined position by the pressure of the compressed air. Then, when the pressure of the compressed air disappears, the feeding piston 133 advances by a biasing force of the piston biasing member 134 and returns to an initial state.

Figure 18:
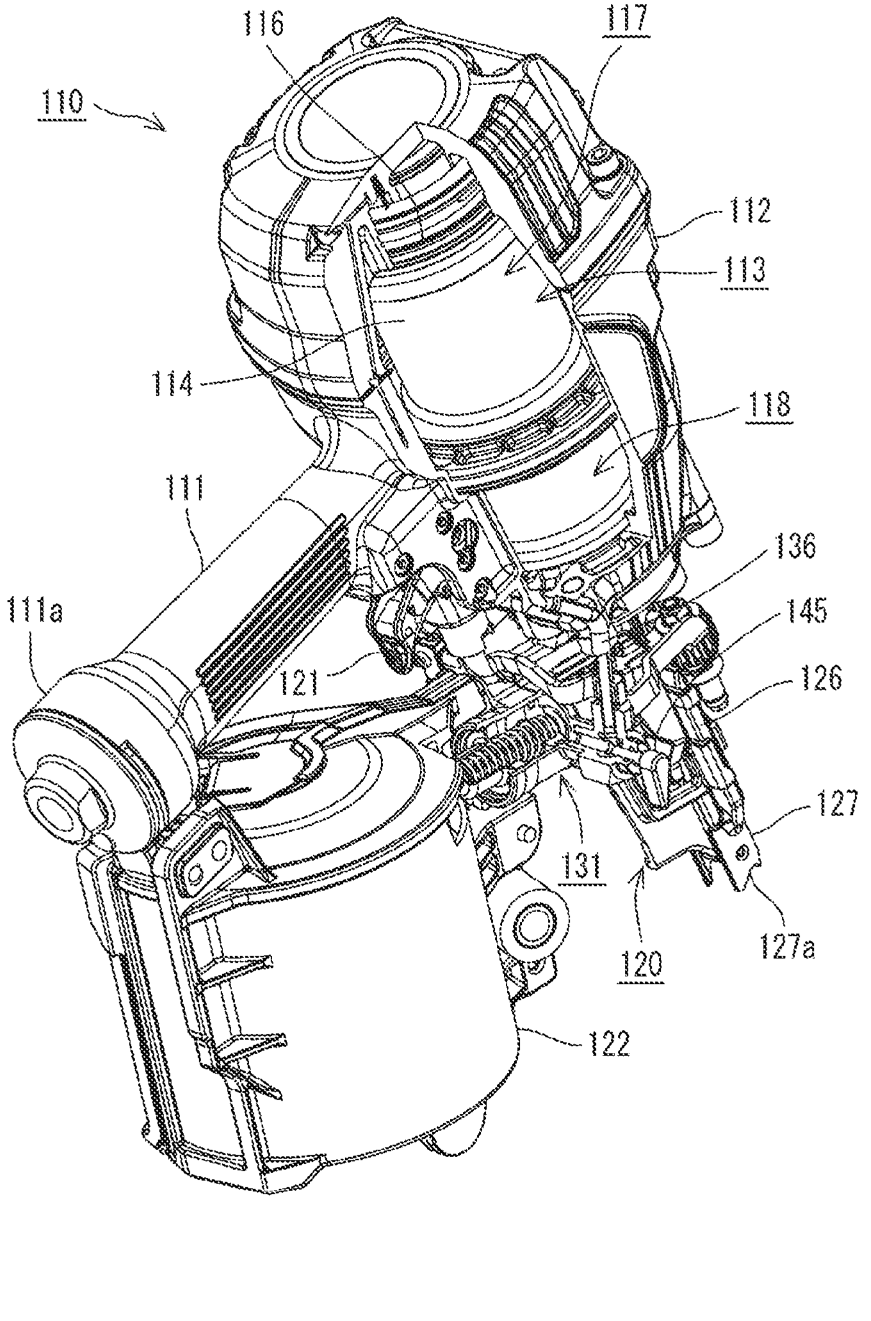
FIG. 18 is a perspective view illustrating an internal structure of the nail driving machine according to another aspect of the present disclosure.

The compressed air supplied to the feeding piston 133 is supplied from a blowback chamber 118 in FIGS. 17 and 18. That is, the air supply path 136 described above communicates with the blowback chamber 118 on an upstream side and communicates with the inside of the feeding cylinder 132 on a downstream side. The blowback chamber 118 is a space that can communicate with the inside of the cylinder 114 of the driving portion 113, and the compressed air flows into the blowback chamber 118 when the driving operation of the fastener 160 is executed. Specifically, when the driving portion 113 drives the piston 115 to descend to the vicinity of a bottom dead center, the compressed air above the piston 115 flows into the blowback chamber 118. The compressed air flowing into the blowback chamber 118 is supplied to the feeding cylinder 132 through the air supply path 136, and the feeding piston 133 is operated. Thereafter, when the arm tip portion 127 is separated from the fastening target object and the sign-off state is achieved, the piston 115 moves upward by the compressed air stored in the blowback chamber 118. After the piston 115 returns to a top dead center, the compressed air in the cylinder 114 pushing up the piston 115 is discharged to the outside of the tool, and the compressed air in the blowback chamber 118 communicating with the inside of the cylinder 114 is also discharged to the outside of the tool. Accordingly, since the pressure applied to the feeding piston 133 disappears, the feeding piston 133 returns to the initial state by the biasing force of the piston biasing member 134.

Although the air supply path 136 is provided outside the body housing 112 in FIG. 17, the air supply path 136 may be provided inside the body housing 112. Further, the air supply path 136 may be provided in the body housing 112, and may be provided in the nose portion 120.

The feeding member 138 is a member that can push out the connected fasteners to the injection passage 120*a* by reciprocating along the fastener supply path 130. The feeding member 138 can feed only one fastener 160 forward by moving forward while holding the fastener 160 at the time of backward movement (advance). The feeding member 138 is pivotably attached to the tip of the rod 135 via a pivotal shaft 138*a*. The pivotal shaft 138*a* of the feeding member 138 is a shaft orthogonal to a sliding direction of the feeding piston 133.

The feeding member 138 includes a feeding claw that engages with the fastener 160. Specifically, the feeding member 138 includes a front feeding claw 138*b* formed forward and a rear feeding claw 138*c* formed rearward. A distance between the front feeding claw 138*b* and the rear feeding claw 138*c* is set to a width large enough to hold a shaft of one fastener 160, and the pair of feeding claws can sandwich and hold the fastener 160 in the forward-rearward direction. The feeding member 138 is constantly biased by a feeding claw biasing member 138*d*. The feeding claw is biased by a biasing force of the feeding claw biasing member 138*d* so as to protrude into the fastener supply path 130 and engage with the fastener 160. On the other hand, the feeding member 138 can retract from the fastener supply path 130 by pivoting against the biasing force of the feeding claw biasing member 138*d*.

The feeding claw described above mainly holds the fastener 160 on a front surface of the rear feeding claw 138*c*. That is, when the feeding piston 133 advances, the front surface of the rear feeding claw 138*c* acts to push out the fastener 160 forward. On the other hand, a rear surface of the feeding claw is inclined with respect to a movement direction of the feeding piston 133 so that a force for holding the fastener 160 is released. Therefore, when the feeding piston 133 retracts, rear surfaces of the front feeding claw 138*b* and the rear feeding claw 138*c* are pressed against the fastener 160, and a reaction force for retracting the feeding claw from the fastener supply path 130 is generated.

The one-way member 141 is a member that regulates the connected fasteners from returning toward the magazine 122. The one-way member 141 is disposed to face the feeding member 138 with the connected fasteners sandwiched therebetween. The one-way member 141 according to the present embodiment is attached to a back side of a door 140 (see FIGS. 23 and 26A to 26C) attached to a side portion of the nose portion 120. The door 140 is used to open the fastener supply path 130, and is used for nail removal work or the like at the time of nail clogging. The door 140 is integrally fixed to the nose portion 120 when the nail driving machine 110 is used. The one-way member 141 is rotatably attached to a rear surface of the door 140 via a rotation shaft 141*a*. The rotation shaft 141*a* is a shaft parallel to a direction in which the fastener 160 is driven out. The one-way member 141 may be attached to the nose portion 120 instead of the door 140.

The one-way member 141 includes a one-way claw 141*b* that engages with the fastener 160. The one-way member 141 is constantly biased by a one-way claw biasing member 141*c*. The one-way claw 141*b* is biased by a biasing force of the one-way claw biasing member 141*c* so as to protrude into the fastener supply path 130 and engage with the fastener 160. On the other hand, the one-way member 141 can retract from the fastener supply path 130 by pivoting against the biasing force of the one-way claw biasing member 141*c*.

The one-way claw 141*b* described above holds the fastener 160 on a front surface thereof. That is, when the fastener 160 is going to be moved rearward, the front surface of the one-way claw 141*b* is engaged with the fastener 160 to prevent the fastener 160 from moving rearward. On the other hand, a rear surface of the one-way claw 141*b* is inclined with respect to the movement direction of the feeding piston 133 so that the force for holding the fastener 160 is released. Therefore, when the fastener 160 is going to be moved forward, the rear surface of the one-way claw 141*b* is pressed against the fastener 160, and the one-way claw 141*b* is retracted from the fastener supply path 130. In other words, when the feeding piston 133 advances, the one-way member 141 pivots against the biasing force of the one-way claw biasing member 141*c*.

Here, in the present disclosure, the state where the one-way claw 141*b* protrudes to the fastener supply path 130 is referred to as the regulated state.

Specifically, the feeding portion 131 described above executes the operation of feeding the fastener 160 in accordance with the following flow.

Figure 28A:
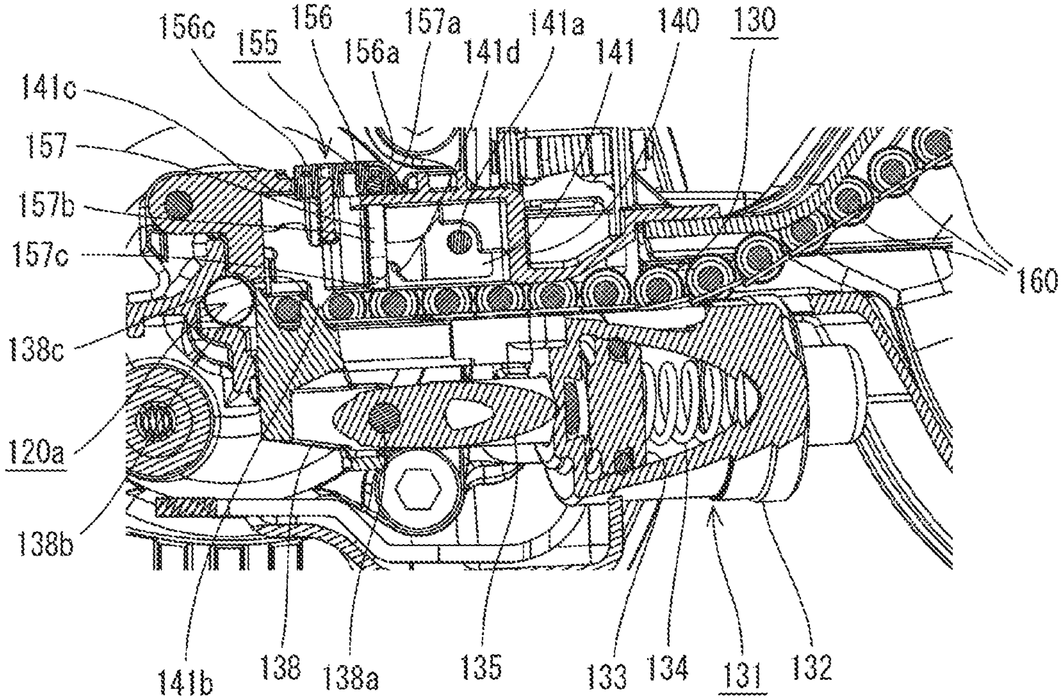
FIG. 28A is a diagram illustrating the feeding portion (in the enabled state) according to Modification 2 related to another aspect of the present disclosure, and is a diagram immediately after driving.

First, as illustrated in FIG. 28A, the driving portion 113 operates and the fastener 160 in the injection passage 120*a* is driven out. At this time, the compressed air flowing into the blowback chamber 118 is supplied to the feeding cylinder 132 via the air supply path 136.

Figure 28B:
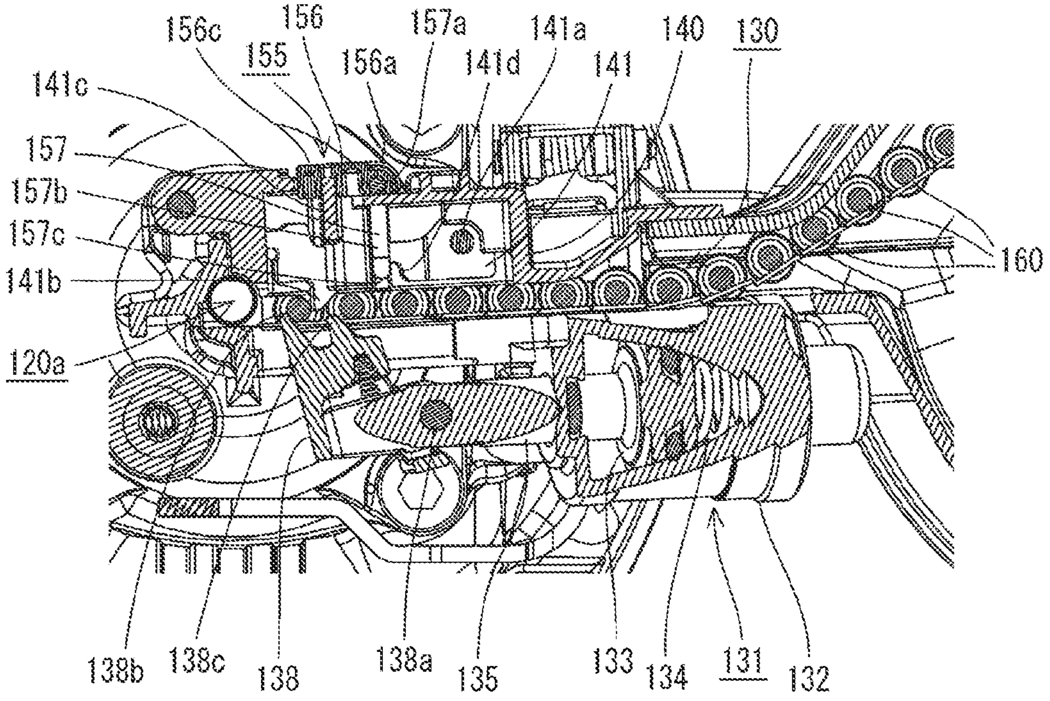
FIG. 28B is a diagram illustrating the feeding portion (in the enabled state) according to Modification 2 related to another aspect of the present disclosure, and is a diagram when a feeding piston starts to move rearward.

When the compressed air is supplied to the feeding cylinder 132, the feeding piston 133 starts to retract as illustrated in FIG. 28B. At this time, the feeding claw of the feeding member 138 is going to move the fastener 160 in the fastener supply path 130 rearward, but the retraction of the fastener 160 is prevented by the one-way claw 141*b*, and thus the fastener 160 does not move. Accordingly, the feeding claw is pushed out by receiving the reaction force of the fastener 160, and pivots in a direction in which the feeding member 138 retracts from the fastener supply path 130. The feeding claw pivots to move rearward while bypassing one fastener 160. When the feeding claw bypasses one fastener 160, the feeding claw protrudes to the fastener supply path 130 again by the biasing force of the feeding claw biasing member 138*d*.

Figure 29A:
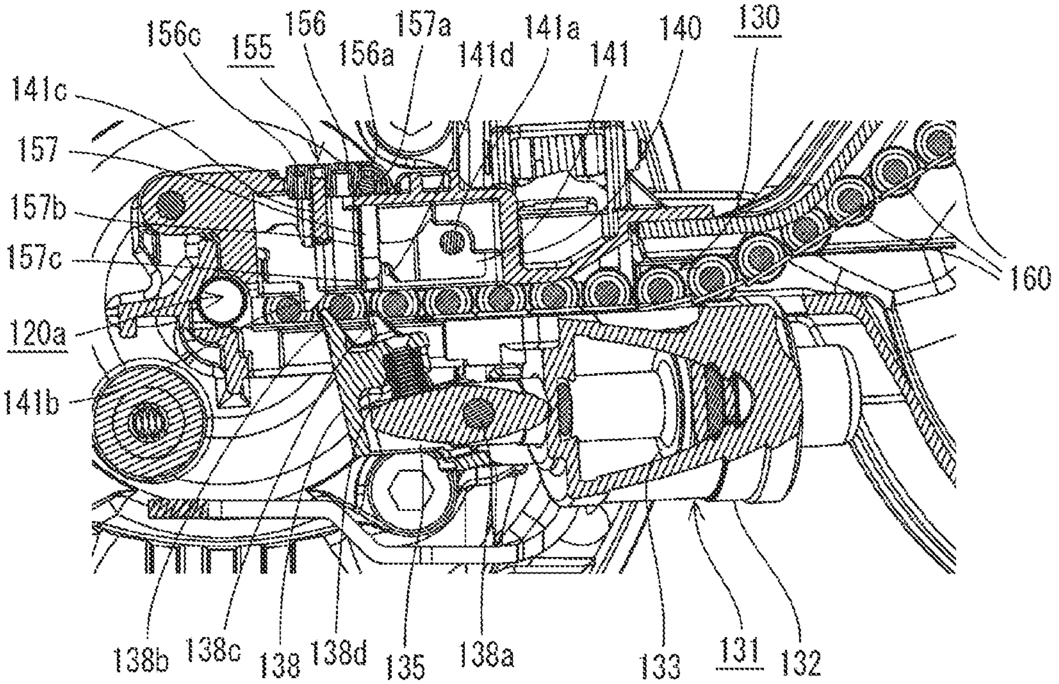
FIG. 29A is a diagram illustrating the feeding portion (in the enabled state) according to Modification 2 related to another aspect of the present disclosure, and is a diagram when the feeding piston completely moves rearward.

As illustrated in FIG. 29A, when the feeding piston 133 completely retracts, the feeding claw holds one immediately succeeding fastener 160.

Figure 29B:
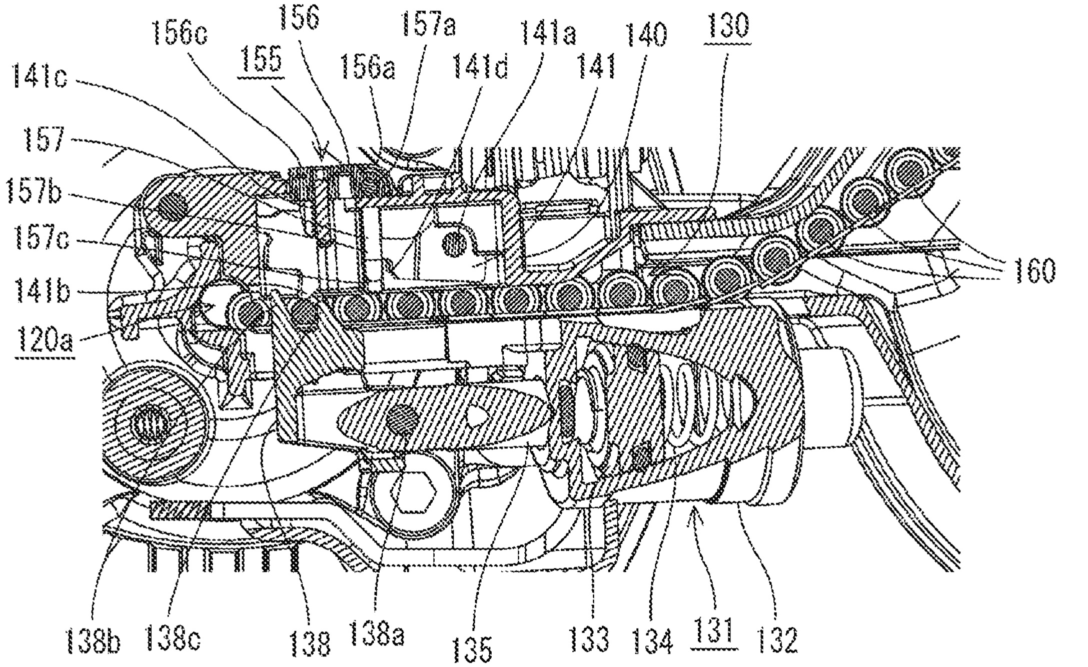
FIG. 29B is a diagram illustrating the feeding portion (in the enabled state) according to Modification 2 related to another aspect of the present disclosure, and is a diagram when the feeding piston starts to move forward.

Thereafter, when the sign-off state is achieved and the compressed air in the feeding cylinder 132 is discharged, as illustrated in FIG. 29B, the feeding piston 133 starts to advance by the biasing force of the piston biasing member 134. At this time, the feeding claw of the feeding member 138 advances while holding the fastener 160, and thus the fastener 160 in the fastener supply path 130 is fed forward. At this time, the one-way claw 141*b* of the one-way member 141 is pushed out by the fastener 160, and pivots in a direction in which the one-way member 141 retracts from the fastener supply path 130.

Figure 30:
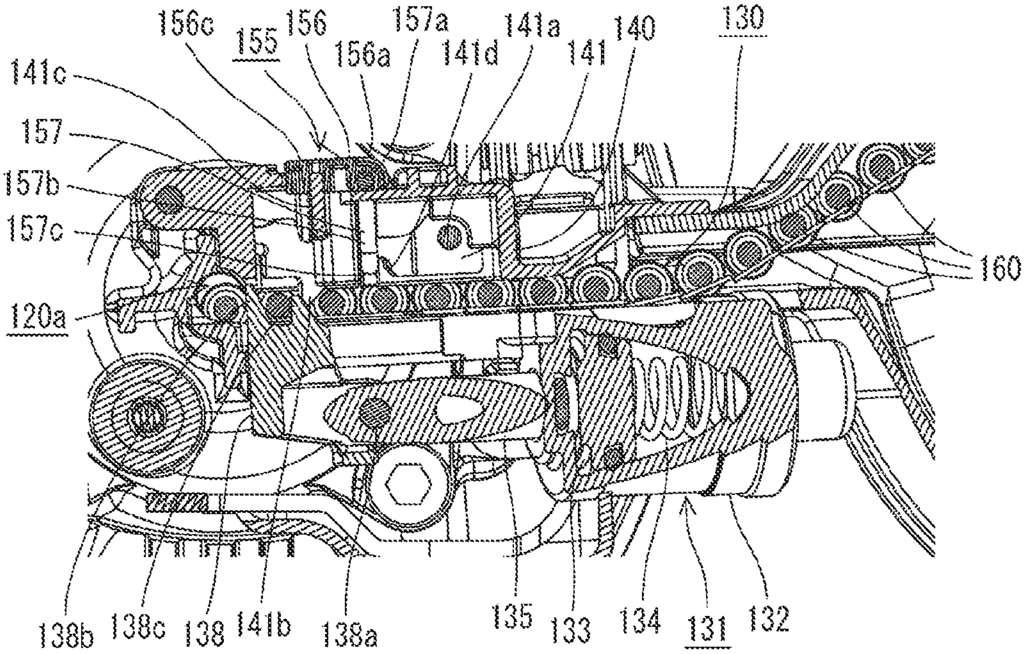
FIG. 30 is a diagram illustrating the feeding portion (in the enabled state) according to Modification 2 related to another aspect of the present disclosure, and is a diagram when the feeding piston completely moves forward and a feeding operation is completed.

As illustrated in FIG. 30, when the feeding piston 133 returns to an original state, only one fastener 160 is fed, and the leading fastener 160 waits in the injection passage 120*a*.

Here, the nail driving machine 110 according to the present embodiment can switch whether to perform the feeding operation of the feeding portion 131 described above. That is, the nail driving machine 110 includes a switcher that switches between a feeding-enabled state in which the feeding portion 131 feeds the fastener 160 to the injection passage 120*a*, and a feeding-disabled state in which the feeding portion 131 does not feed the fastener 160 to the injection passage 120*a*. The switcher according to the present embodiment can alternately switch between the feeding-enabled state and the feeding-disabled state by switching the operation of the feeding member 138.

Specifically, the switcher according to the present embodiment is a valve portion 145 capable of switching between an operating state and a non-operating state of the feeding piston 133. The valve portion 145 switches whether to operate the feeding piston 133 by opening and closing the air supply path 136.

Figure 20:
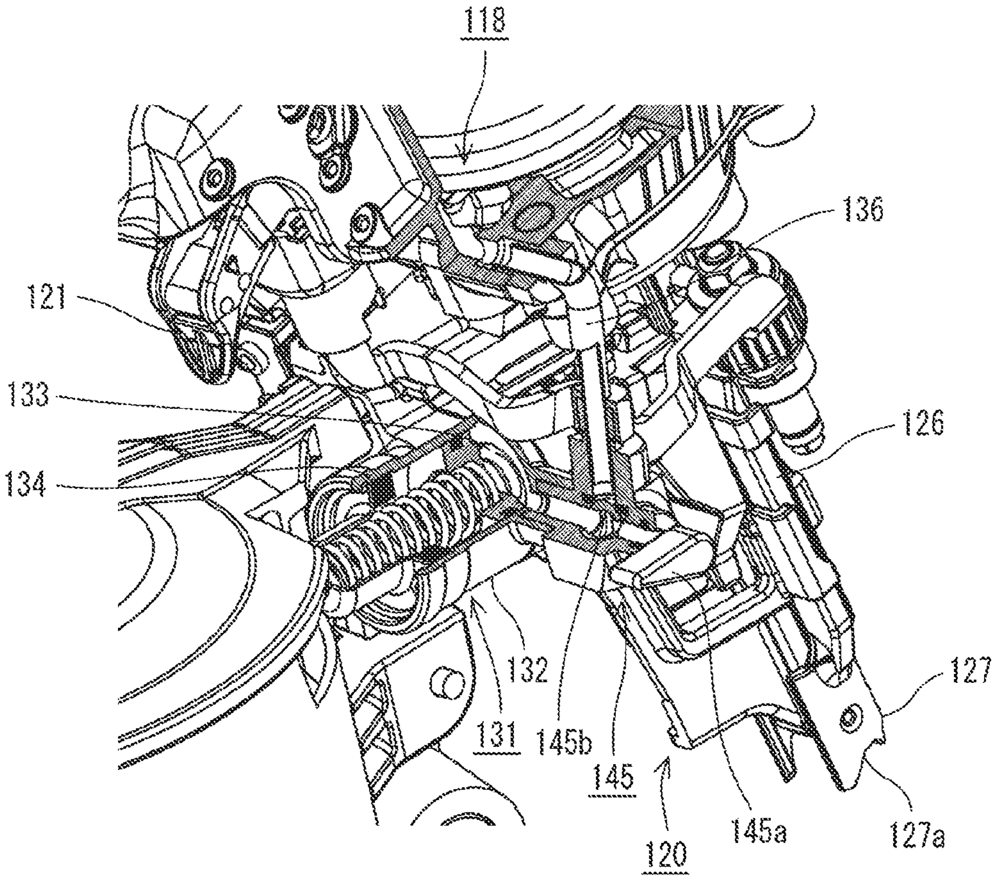
FIG. 20 is an enlarged perspective view illustrating the internal structure of the feeding portion in the vicinity of the air supply path according to another aspect of the present disclosure, in which the feeding portion is in a disabled state.

As illustrated in FIGS. 19 and 20, the valve portion 145 is a cock type valve, and includes a valve handle 145*a* and a ball valve 145*b*. By pivoting the valve handle 145*a*, the ball valve 145*b* provided in a halfway portion of the air supply path 136 opens and closes the air supply path 136. Needless to say, such a ball valve is merely an example of the valve portion 145, and any valve can be used for the valve portion 145.

FIG. 19 illustrates a state in which the air supply path 136 is not closed by the valve portion 145, and illustrates the feeding-enabled state in which the fastener 160 can be fed. In this state, when the driving portion 113 operates and the compressed air flows into the blowback chamber 118, the compressed air in the blowback chamber 118 is supplied to the feeding cylinder 132 via the air supply path 136. Accordingly, the feeding piston 133 reciprocates to feed the fastener 160.

On the other hand, FIG. 20 illustrates a state in which the air supply path 136 is closed by the valve portion 145, and illustrates the feeding-disabled state in which the fastener 160 is not fed. In this state, even when the driving portion 113 operates and the compressed air flows into the blowback chamber 118, the compressed air in the blowback chamber 118 is not supplied to the feeding cylinder 132. Accordingly, the feeding piston 133 does not reciprocate, and the fastener 160 is not fed.

The present embodiment is as described above, and includes the switcher that switches between the feeding-enabled state and the feeding-disabled state. Therefore, after the feeding-disabled state is set, the next fastener 160 is not fed to the injection passage 120*a* when the fastener 160 set in the injection passage 120*a* is driven out. That is, the tool can be used in a state in which no fastener 160 is present in the injection passage 120*a*, and thus the idle-driving is possible. Therefore, it is possible to execute the idle-driving without driving all the fasteners 160 loaded in the nail driving machine 110 or removing the connected fasteners from the nail driving machine 110.

In the present embodiment, the feeding portion 131 that is operated by the air pressure is described as an example, the present disclosure is not limited thereto, and the same effect can be obtained by switching the operation of the feeding member 138 even by using the feeding portion 131 including other power sources (for example, a motor). For example, when the feeding member 138 is operated by the motor, the feeding-enabled state and the feeding-disabled state can be switched by switching whether the motor operates.

Modification 1 of Nail Driving Machine According to Present Embodiment Related to Another Aspect of Present Disclosure The present modification has a feature in that a locking portion 150 (a switcher) as illustrated in FIGS. 21A, 21B, 22A, and 22B is provided instead of the valve portion 145 according to the embodiment described above. Since a basic configuration of the present modification is not different from that of the embodiment described above, only different points will be described while avoiding redundant description.

Similarly to the embodiment described above, the nail driving machine 110 according to the present embodiment can switch whether to perform the feeding operation of the feeding portion 131. That is, the nail driving machine 110 includes a switcher that switches between a feeding-enabled state in which the feeding portion 131 feeds the fastener 160 to the injection passage 120*a*, and a feeding-disabled state in which the feeding portion 131 does not feed the fastener 160 to the injection passage 120*a*. The switcher according to the present embodiment can alternately switch between the feeding-enabled state and the feeding-disabled state by switching the operation of the feeding member 138.

Specifically, the switcher according to the present embodiment is the locking portion 150 that can be set such that the feeding operation of the feeding portion 131 is not executed by switching an operation range of the feeding piston 133. The locking portion 150 switches whether to operate the feeding piston 133 by physically limiting a movement range of the feeding piston 133.

As illustrated in FIGS. 21A, 21B, 22A, and 22B, the locking portion 150 includes a bar-shaped main body 151 and a pin 151*a* fixed to the main body 151. The pin 151*a* is used for guiding the movement of the locking portion 150, and is inserted into a guide groove 152*a* to be described later.

A plate-shaped guiding portion 152 is provided on a side portion of the feeding cylinder 132 according to the present embodiment. The substantially L-shaped guide groove 152*a* is formed in the guiding portion 152. The pin 151*a* is inserted into the guide groove 152*a*, and the pin 151*a* can move along a longitudinal direction of the guide groove 152*a*. Therefore, the locking portion 150 can be manually moved along the guide groove 152*a*.

Figure 21A:
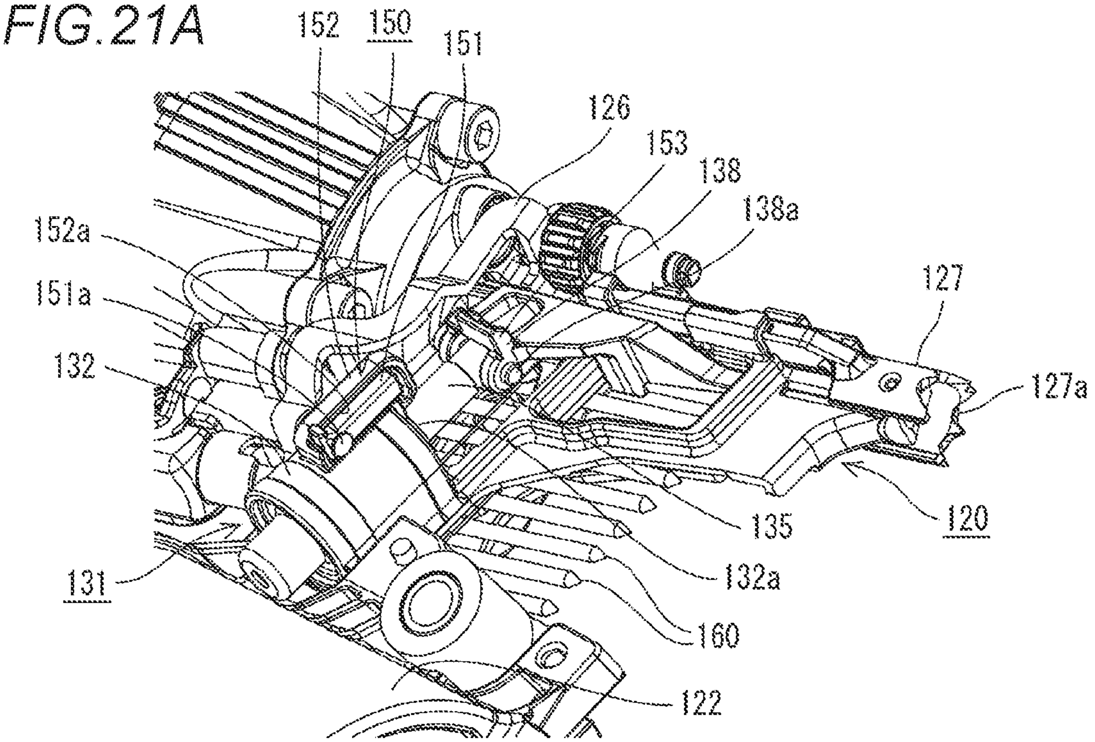
FIG. 21A is an enlarged perspective view of a vicinity of a nose portion according to Modification 1 related to another aspect of the present disclosure, in which the feeding portion is in the enabled state.
Figure 22A:
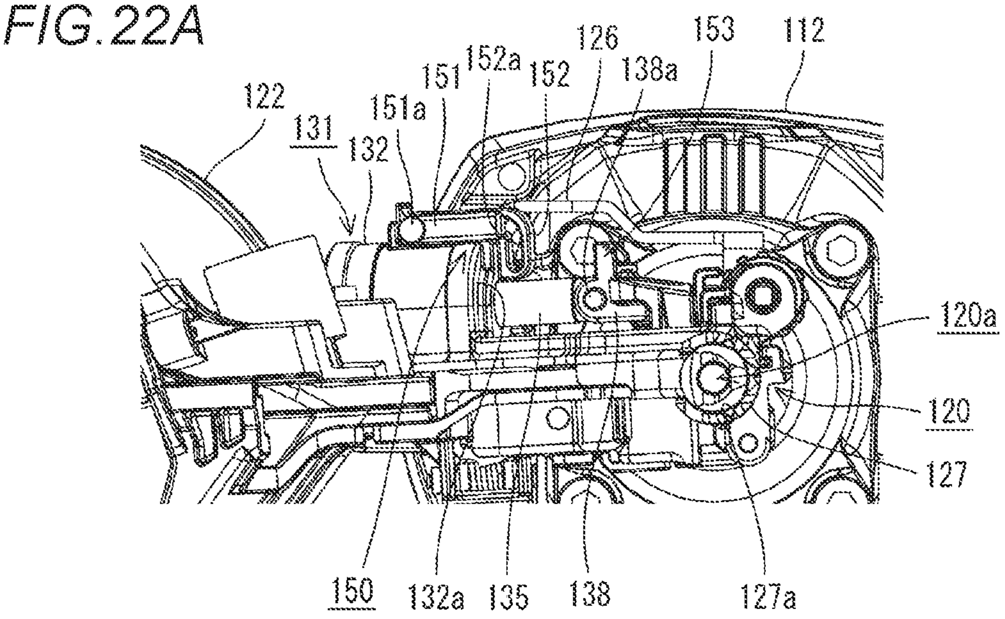
FIG. 22A is an enlarged bottom view of the vicinity of the nose portion according to Modification 1 related to another aspect of the present disclosure, in which the feeding portion is in the enabled state.

FIGS. 21A and 22A illustrate a state in which the locking portion 150 is moved rearward, and illustrate the feeding-enabled state in which the fastener 160 can be fed. In this state, the locking portion 150 is disposed at a position at which the locking portion 150 does not interfere with the feeding piston 133 (or the rod 135 or the feeding member 138).

Accordingly, the movement of the feeding piston 133 is not regulated. When the driving portion 113 operates in this state, the compressed air is supplied to the feeding cylinder 132, and the feeding piston 133 reciprocates to feed the fastener 160.

Figure 21B:
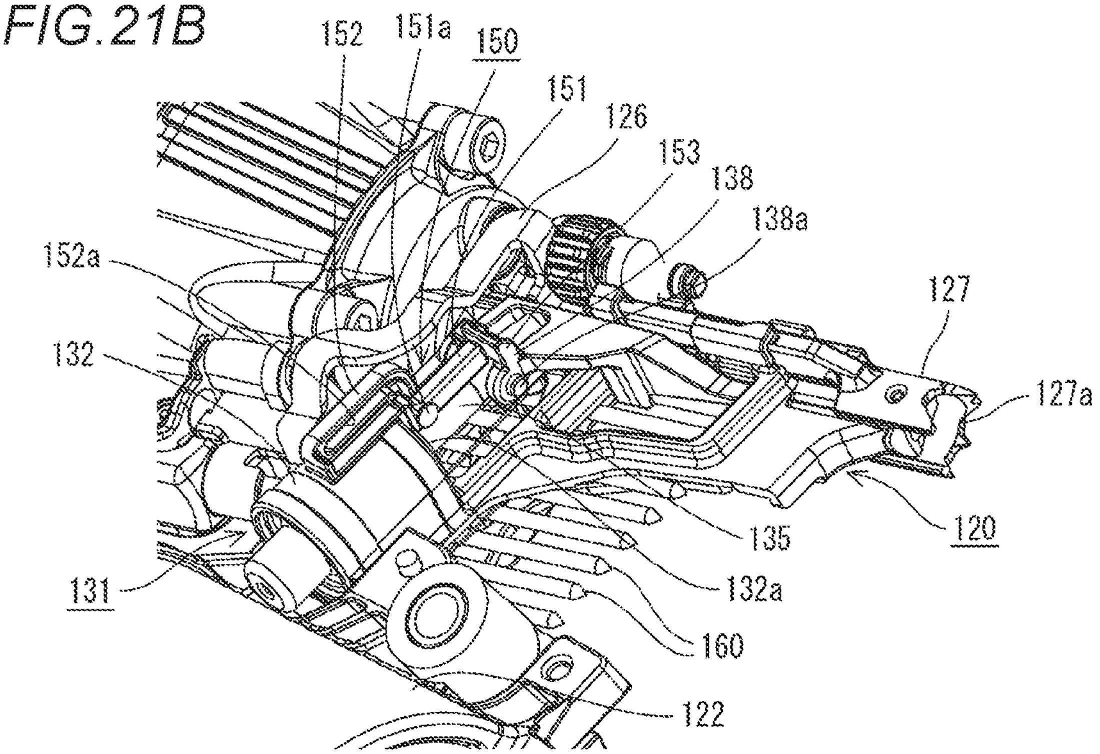
FIG. 21B is an enlarged perspective view of the vicinity of the nose portion according to Modification 1 related to another aspect of the present disclosure, in which the feeding portion is in the disabled state.
Figure 22B:
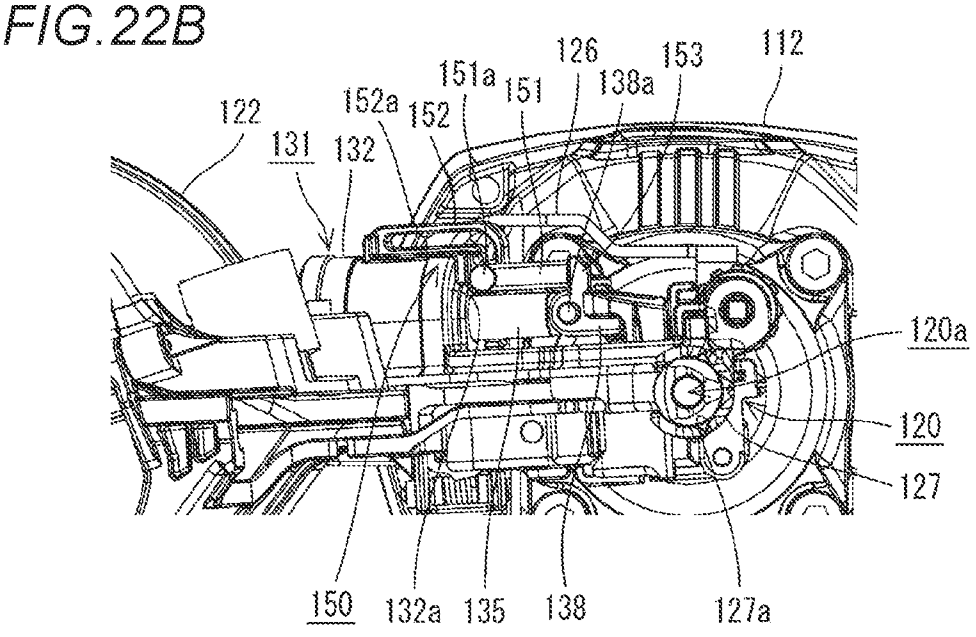
FIG. 22B is an enlarged bottom view of the vicinity of the nose portion according to Modification 1 related to another aspect of the present disclosure, in which the feeding portion is in the disabled state.
Figure 23:
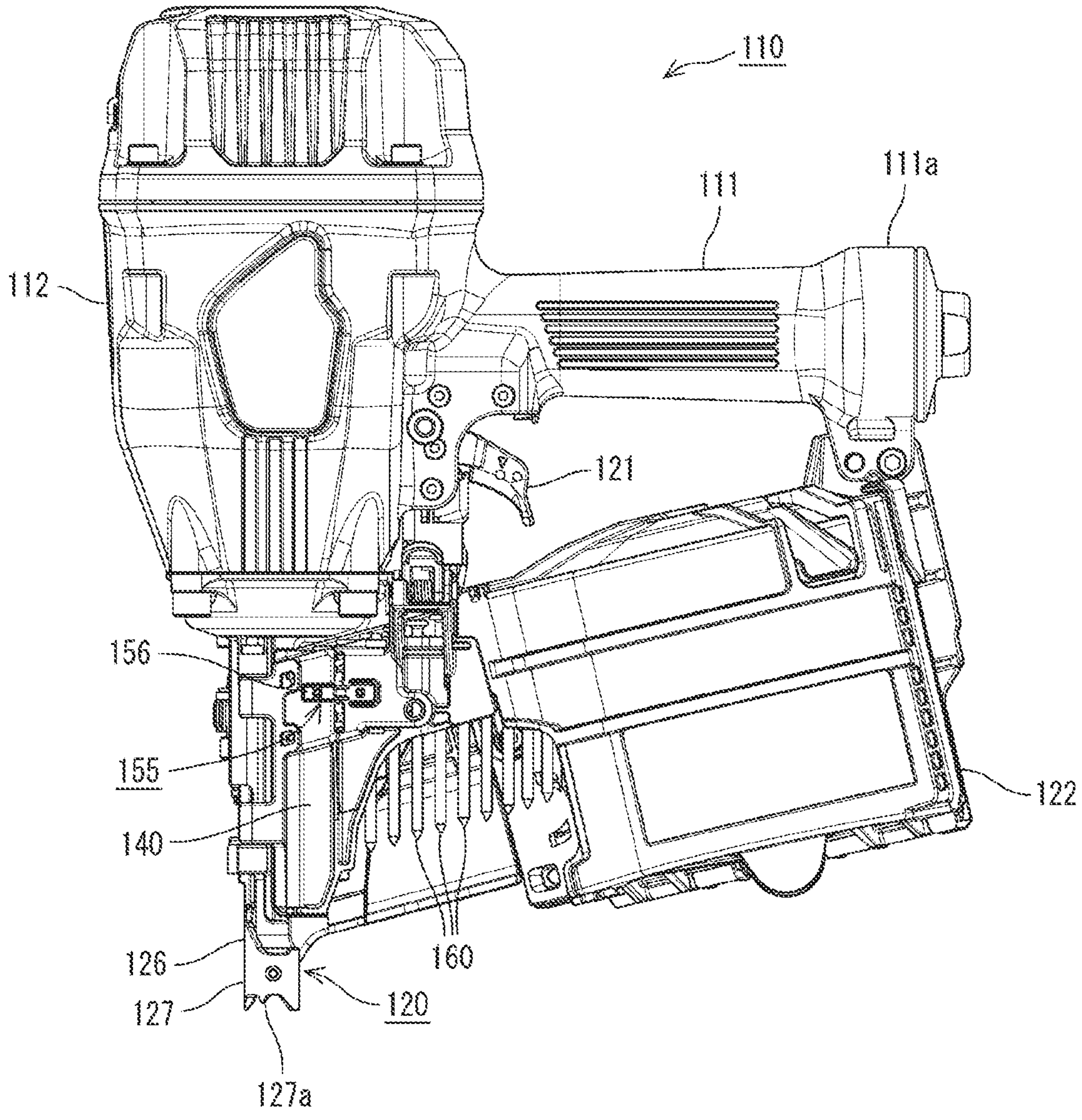
FIG. 23 is a side view of a nail driving machine according to Modification 2 related to another aspect of the present disclosure.

On the other hand, FIGS. 21B and 22B illustrate a state in which the locking portion 150 is moved forward, and illustrate the feeding-disabled state in which the fastener 160 is not fed. In this state, the locking portion 150 is disposed at a position at which the locking portion 150 interferes with the feeding piston 133 (or the rod 135 or the feeding member 138). Accordingly, the movement of the feeding piston 133 is physically regulated by the locking portion 150. Specifically, the main body 151 of the locking portion 150 is inserted between a front surface 132*a* of the feeding cylinder 132 and a protrusion 153 of the feeding member 138. At this time, the pin 151*a* is engaged with the guide groove 152*a*, and thus the locking portion 150 is locked so as not to be movable rearward. Further, a front end of the locking portion 150 is disposed to face a rear surface of the protrusion 153 formed on the feeding member 138. Therefore, even when the feeding member 138 (the feeding piston 133 and the rod 135) is going to retract, the locking portion 150 interferes with the feeding member 138, and the feeding member 138 can retract by only an amount required for the operation of feeding the fastener 160. The amount required for the operation of feeding the fastener 160 is a movement amount by which the feeding claw bypasses one fastener and engages with one immediately succeeding fastener. In this way, the locking portion 150 serves as a tension rod, and interferes with the retraction of the feeding piston 133. When the driving portion 113 operates in this state, the compressed air is supplied to the feeding cylinder 132, but the feeding piston 133 can move by only the amount required for the operation of feeding the fastener 160, and thus the fastener 160 is not fed.

In this modification, the locking portion 150 can be fixed between the front surface 132*a* of the feeding cylinder 132 and the protrusion 153 of the feeding member 138. However, a method of physically regulating the movement of the feeding piston 133 is not limited thereto. That is, the locking portion 150 may be engaged at any position. For example, the protrusion 153 may be formed on the rod 135, and the locking portion 150 may be engaged with the protrusion 153.

The present modification is as described above, and includes the switcher that switches between the feeding-enabled state and the feeding-disabled state. Therefore, after the feeding-disabled state is set, the next fastener 160 is not fed to the injection passage 120*a* when the fastener 160 set in the injection passage 120*a* is driven out. That is, the tool can be used in a state in which no fastener 160 is present in the injection passage 120*a*, and thus the idle-driving is possible. Therefore, it is possible to execute the idle-driving without driving all the fasteners 160 loaded in the nail driving machine 110 or removing the connected fasteners from the nail driving machine 110.

Modification 2 of Nail Driving Machine According to Present Embodiment Related to Another Aspect of Present Disclosure The present modification has a feature in that a retracting portion 155 (a switcher) as illustrated in FIGS. 23 to 31B is provided instead of the valve portion 145 according to the embodiment described above. Since a basic configuration of the present modification is not different from that of the embodiment described above, only different points will be described while avoiding redundant description.

Similarly to the embodiment described above, the nail driving machine 110 according to the present embodiment can switch whether to perform the feeding operation of the feeding portion 131. That is, the nail driving machine 110 includes a switcher that switches between a feeding-enabled state in which the feeding portion 131 feeds the fastener 160 to the injection passage 120*a*, and a feeding-disabled state in which the feeding portion 131 does not feed the fastener 160 to the injection passage 120*a*. The switcher according to the present embodiment can alternately switch between the feeding-enabled state and the feeding-disabled state by switching an operation of the one-way member 141.

Specifically, the switcher according to the present embodiment is the retracting portion 155 that can be set such that the feeding operation of the feeding portion 131 is not executed by setting the one-way member 141 to not regulate the movement of the connected fasteners. The retracting portion 155 can hold the one-way member 141 at a position at which the one-way member 141 does not interfere with the connected fasteners.

Figure 26A:
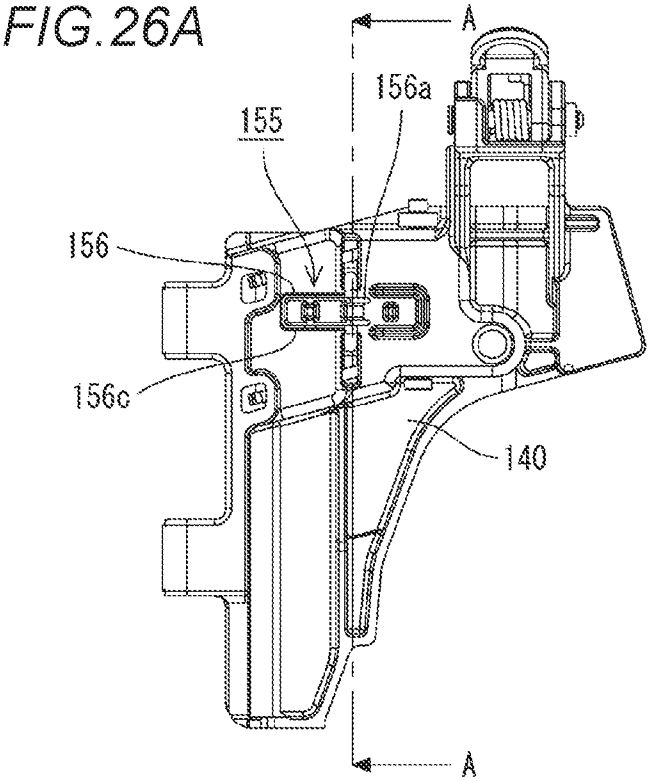
FIG. 26A is a view illustrating a door according to Modification 2 related to another aspect of the present disclosure, which is viewed from a front surface.
Figure 26C:
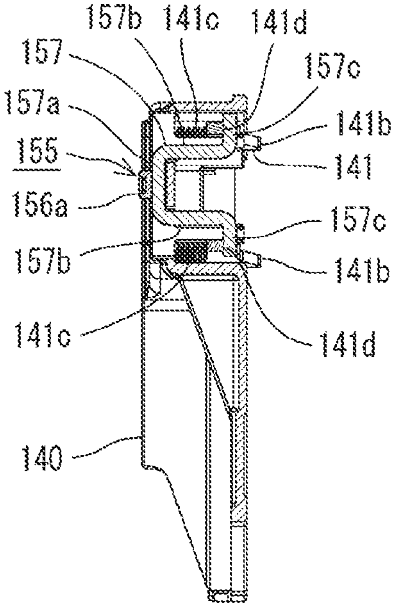
FIG. 26C is a view illustrating the door according to Modification 2 related to another aspect of the present disclosure, and is a cross-sectional view taken along a line A-A.
Figure 26B:
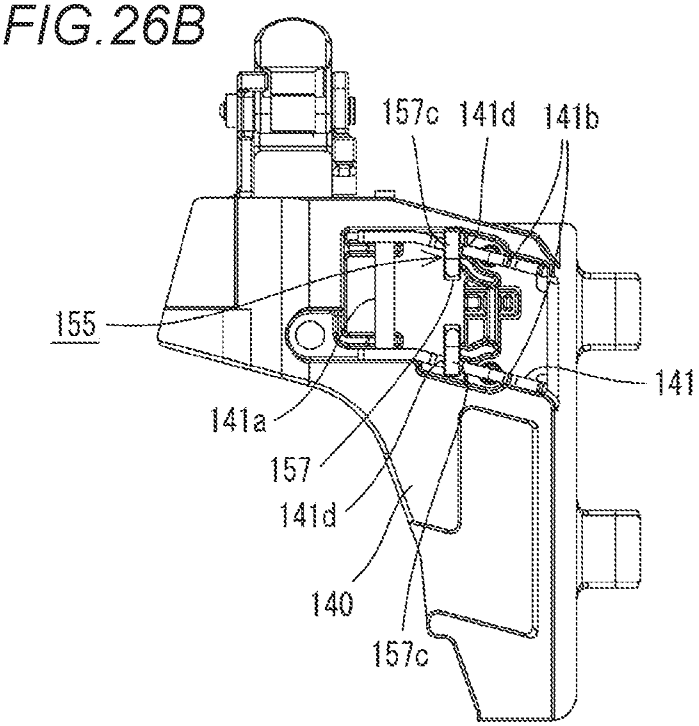
FIG. 26B is a view illustrating the door according to Modification 2 related to another aspect of the present disclosure, which is viewed from a rear surface.
Figure 27:
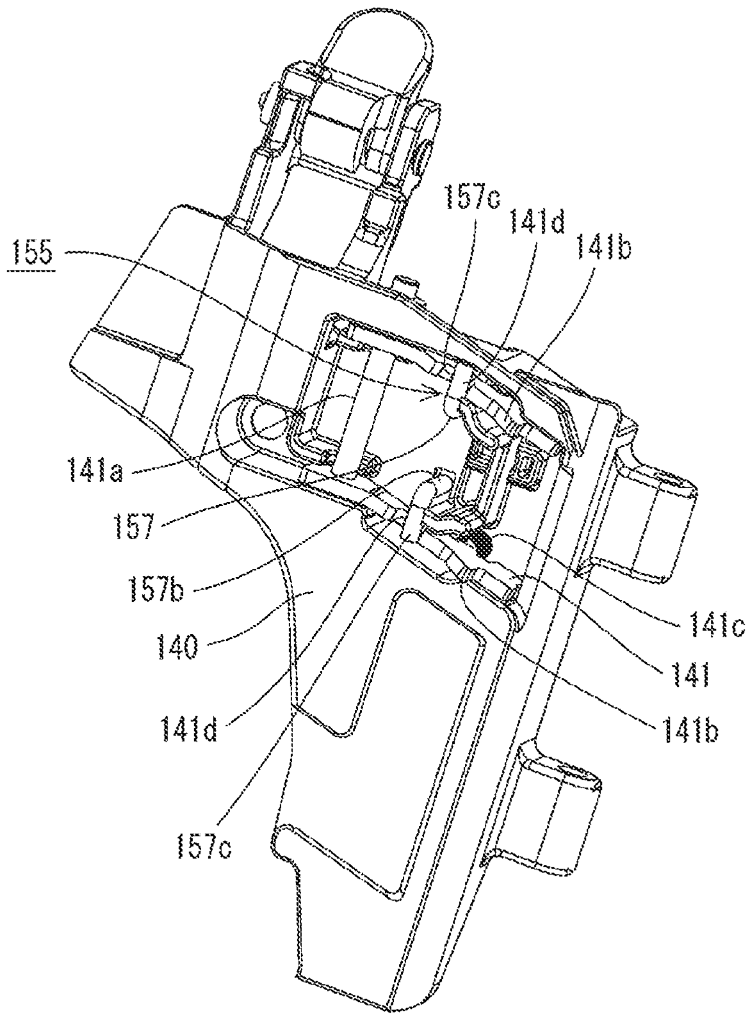
FIG. 27 is a perspective view when the door according to Modification 2 related to another aspect of the present disclosure is viewed from the rear surface.

As illustrated in FIGS. 26A to 26C, the retracting portion 155 is provided on the door 140, and includes a lever 156 and a pulling-up portion 157. The retracting portion 155 may be attached to the nose portion 120 instead of the door 140. That is, when the one-way member 141 is attached to the nose portion 120, the retracting portion 155 can also be attached to the nose portion 120.

Figure 25A:
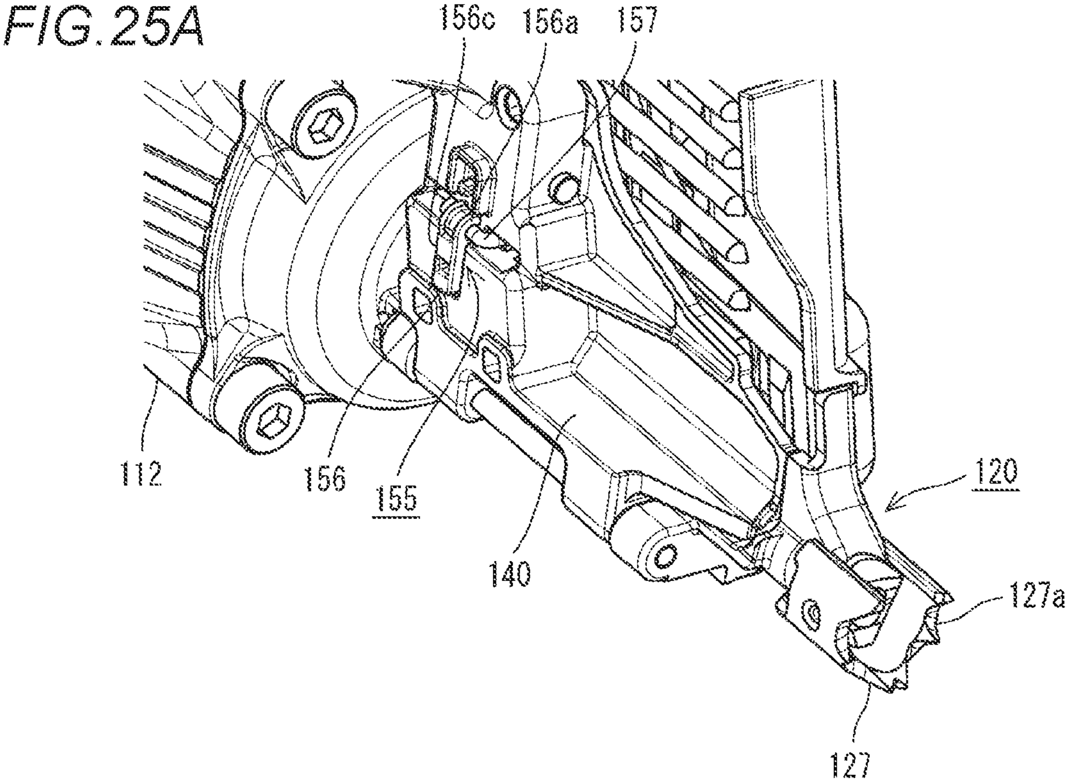
FIG. 25A is an enlarged perspective view of a vicinity of a nose portion according to Modification 2 related to another aspect of the present disclosure, in which the feeding portion is in the enabled state.
Figure 25B:
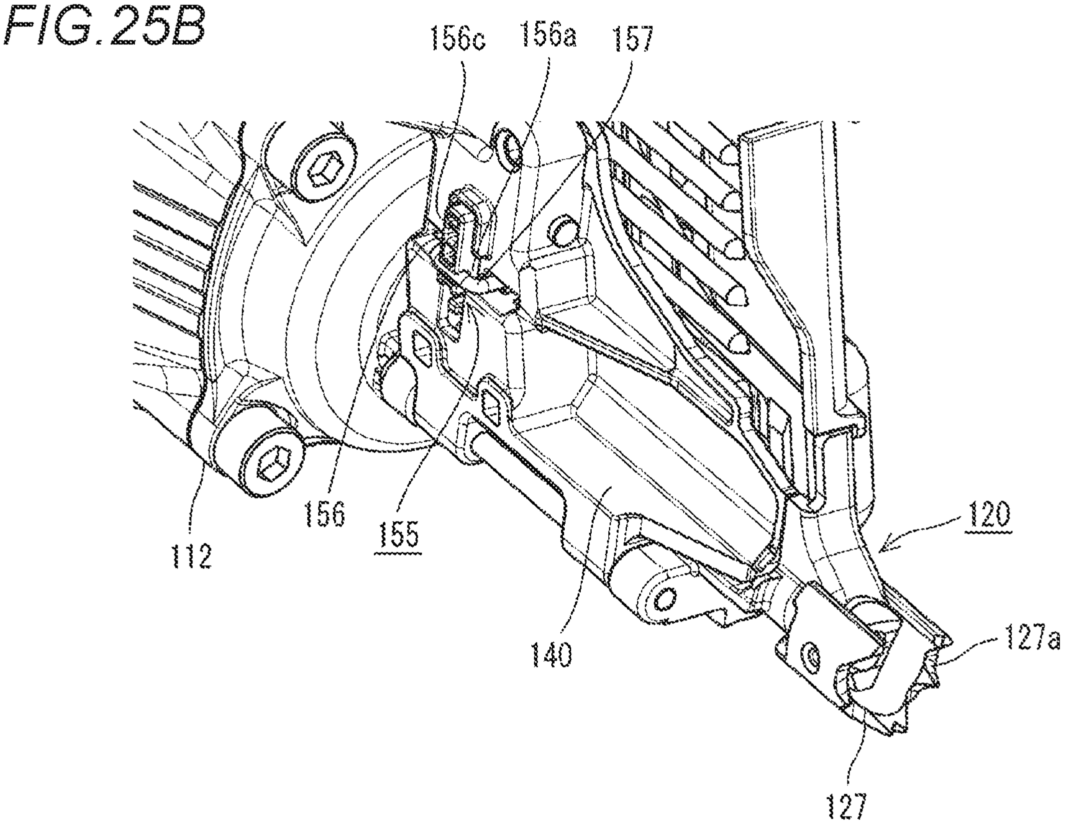
FIG. 25B is an enlarged perspective view of the vicinity of the nose portion according to Modification 2 related to another aspect of the present disclosure, in which the feeding portion is in the disabled state.

The lever 156 is a member operably attached to a surface of the door 140. The lever 156 can be pivoted about 180 degrees with a cam engaging portion 157*a* to be described later as a fulcrum. By tilting the lever 156 to a front side as illustrated in FIG. 25A, the feeding-enabled state is achieved. In contrast, by tilting the lever 156 to a rear side as illustrated in FIG. 25B, the feeding-disabled state is achieved. The lever 156 includes a cam portion 156*a* and an operation unit 156*c*.

The cam portion 156*a* has a cam shape formed around a pivotal shaft (the cam engaging portion 157*a*). When the cam portion 156*a* presses the surface of the door 140, a distance from the surface of the door 140 to the pivotal shaft (the cam engaging portion 157*a*) varies. Specifically, when the lever 156 is tilted to the rear side, the distance from the surface of the door 140 to the pivotal shaft (the cam engaging portion 157*a*) relatively increases, and thus the pulling-up portion 157 to be described later is pulled by the cam portion 156*a* in a direction (the left direction in FIG. 24) of retracting from the fastener supply path 130. On the other hand, when the lever 156 is tilted to the front side, the distance from the surface of the door 140 to the pivotal shaft (the cam engaging portion 157*a*) relatively decreases, and thus the pulling-up portion 157 to be described later is not pulled.

The operation unit 156*c* is a rod-shaped portion that is provided to be operable by a user to operate the lever 156. The operation unit 156*c* is operably provided on the surface of the door 140.

The pulling-up portion 157 is a member disposed between the lever 156 and the one-way member 141. When the pulling-up portion 157 is pulled by the lever 156 (the feeding-disabled state), the pulling-up portion 157 moves the one-way member 141 in the direction of retracting from the fastener supply path 130. Further, when the pulling-up portion 157 is not pulled by the lever 156 (the feeding-enabled state), the pulling-up portion 157 does not act on the one-way member 141.

As illustrated in FIGS. 26A to 26C and 27, the pulling-up portion 157 is formed by bending a metal wire material in a hat shape, and includes the cam engaging portion 157*a* at an intermediate portion, a pair of leg portions 157*b* extending at a right angle from both ends of the cam engaging portion 157*a*, and claw engaging portions 157*c* extending at a right angle from the pair of leg portions 157*b*. As described above, the cam engaging portion 157*a* is held by the lever 156, and also functions as the pivotal shaft of the lever 156. The claw engaging portions 157*c* are engaged with an engaging portion 141*d* of the one-way member 141 inside the door 140.

FIGS. 28A, 28B, and 30 illustrate a state in which the lever 156 is tilted to the front side, and illustrate the feeding-enabled state in which the fastener 160 can be fed. In this state, the one-way member 141 protrudes to the fastener supply path 130, and thus when the driving portion 113 operates, the fastener 160 is fed in accordance with the flow as described above.

Figure 31A:
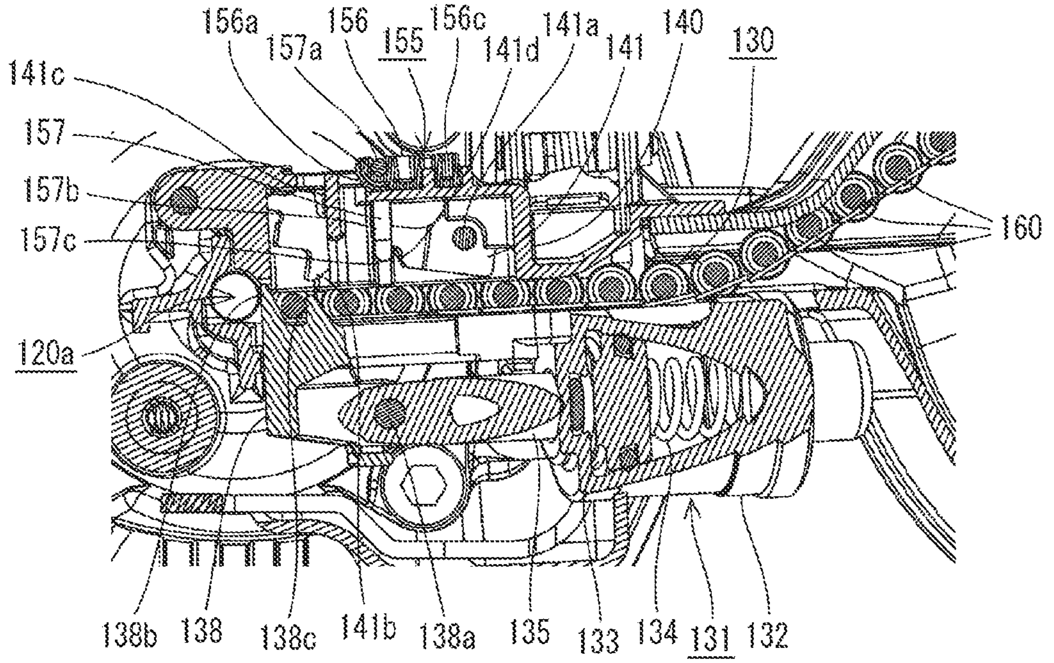
FIG. 31A is a diagram illustrating the feeding portion (in the disabled state) according to Modification 2 related to another aspect of the present disclosure, and is a diagram immediately after the driving.
Figure 31B:
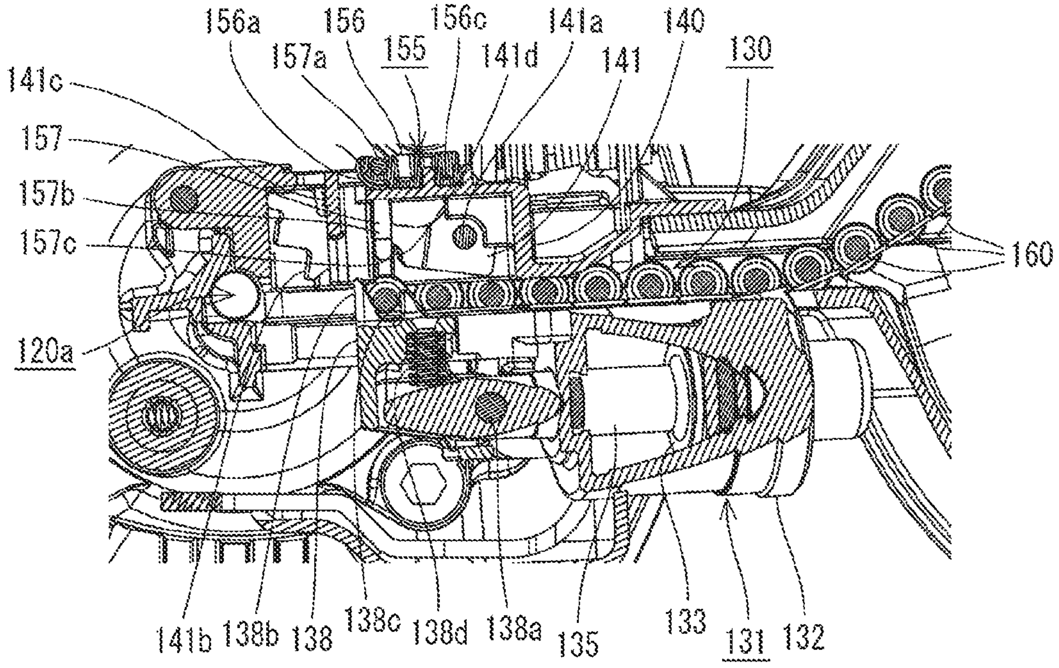
FIG. 31B is a diagram illustrating the feeding portion (in the disabled state) according to Modification 2 related to another aspect of the present disclosure, and is a diagram when the feeding piston completely moves rearward.

On the other hand, FIGS. 31A and 31B illustrate a state in which the lever 156 is tilted to the rear side, and illustrate the feeding-disabled state in which the fastener 160 is not fed. In this state, the pulling-up portion 157 is pulled by the lever 156, and thus the one-way member 141 waits at a position at which the one-way member 141 retracts from the fastener supply path 130, against the biasing force of the one-way claw biasing member 141*c*. Specifically, the claw engaging portions 157*c* are displaced to a front surface side of the door 140, and the one-way member 141 engaged by the engaging portion 141*d* is moved to the front surface side of the door 140, whereby the one-way member 141 moves to the position at which the one-way member 141 retracts from the fastener supply path 130. In this state, the one-way member 141 does not regulate the movement of the fastener 160, and thus the fastener 160 is not fed even when the driving portion 113 operates.

A specific operation in the feeding-disabled state is as follows. First, as illustrated in FIG. 31A, the driving portion 113 operates and the fastener 160 in the injection passage 120*a* is driven out. Then, when the compressed air is supplied to the feeding cylinder 132, the feeding piston 133 starts to retract.

At this time, the retraction of the fastener 160 is not prevented by the one-way claw 141*b*. Therefore, as illustrated in FIG. 31B, the feeding claw of the feeding member 138 moves rearward while holding the leading fastener 160 in the fastener supply path 130.

Thereafter, even when the feeding piston 133 advances by the biasing force of the piston biasing member 134, the held leading fastener 160 merely returns to the same position again, and thus the state of FIG. 31A is restored. In this way, although the feeding piston 133 reciprocates, the operation of feeding the fastener 160 to the injection passage 120*a* is not executed.

The present modification is as described above, and includes the switcher that switches between the feeding-enabled state and the feeding-disabled state. Therefore, after the feeding-disabled state is set, the next fastener 160 is not fed to the injection passage 120*a* when the fastener 160 set in the injection passage 120*a* is driven out. That is, the tool can be used in a state in which no fastener 160 is present in the injection passage 120*a*, and thus the idle-driving is possible. Therefore, it is possible to execute the idle-driving without driving all the fasteners 160 loaded in the nail driving machine 110 or removing the connected fasteners from the nail driving machine 110.

What is claimed is:

1. A driving tool, comprising:

an injection passage provided with an injection port for injecting at least one fastener of a connected fastener obtained by connecting a plurality of fasteners;

a feeding portion that supplies the fastener to the injection passage; and a driving-out portion configured to drive out, from the injection port, the fastener supplied to the injection passage, a trigger that causes the driving-out portion to operate; and a retracting portion configured to retract the fastener supplied to the injection passage from a portion other than the injection port to outside of the injection passage, in a state where the fastener is engaged with the feeding portion, wherein the driving-out portion includes a driver configured to move in the injection passage, and wherein the driving-out portion is configured to operate in a state where the fastener is retracted by the retracting portion such that the driver moves in the injection passage without driving out the fastener from the injection port in a state where the connected fastener is held in the feeding portion.

2. The driving tool according to claim 1, wherein the retracting portion includes the feeding portion, and retracts the fastener supplied to the injection passage to the outside of the injection passage by moving the feeding portion in a direction away from the injection passage.

3. The driving tool according to claim 2, wherein the feeding portion includes a feeding member that is engaged with the fastener.

4. The driving tool according to claim 3, wherein the feeding portion includes:

a feeding piston that moves the feeding member in the direction away from the injection passage; and a feeding cylinder that slidably accommodates the feeding piston.

5. The driving tool according to claim 4, wherein the feeding portion operates the feeding piston by supplying compressed air to the feeding cylinder, and the retracting portion moves the feeding cylinder in the direction away from the injection passage in a state where a position of the feeding piston is fixed with respect to the feeding cylinder without supplying the compressed air.

6. The driving tool according to claim 5, wherein the feeding portion includes a switcher that switches whether to supply the compressed air to the feeding cylinder, and the switcher blocks supplying the compressed air to the feeding cylinder when the feeding portion moves in the direction away from the injection passage.

7. The driving tool according to claim 4, further comprising:

a magazine that accommodates the plurality of fasteners, wherein the magazine is movable in the direction away from the injection passage and a direction approaching the injection passage, and wherein the feeding portion is connected to the magazine.

8. The driving tool according to claim 7, wherein the feeding cylinder is connected to the magazine.

9. The driving tool according to claim 8, further comprising:

a holding portion configured to regulate the feeding portion from moving in the direction away from the injection passage.

10. The driving tool according to claim 9, further comprising:

an operation unit configured to move the magazine in the direction away from the injection passage and the direction approaching the injection passage, wherein the operation unit is provided in the holding portion.

11. The driving tool according to claim 4, wherein the feeding portion includes a regulating portion that regulates the fastener from moving in the direction away from the injection passage, and when the feeding portion moves in the direction away from the injection passage, the regulating portion releases a state where the fastener is regulated from moving in the direction away from the injection passage.

12. The driving tool according to claim 11, further comprising:

a fastener supply path through which the fastener supplied to the injection passage passes, wherein the regulating portion sets the movement of the fastener into a regulated state by protruding to the fastener supply path, and releases the regulated state by retracting from the fastener supply path.

13. The driving tool according to claim 1, further comprising:

a magazine that accommodates the plurality of fasteners, the magazine having a cap portion;

a nose portion in which the injection passage for guiding the injection of the fastener is formed;

a fastener supply path configured to guide the connected fastener pulled out from the magazine to the injection passage;

a feeding portion configured to sequentially feed the fastener from the fastener supply path to the injection passage; and a switcher configured to switch between a feeding-enabled state in which the feeding portion feeds the fastener to the injection passage, and a feeding-disabled state in which the feeding portion does not feed the fastener to the injection passage, wherein the feeding portion includes a feeding piston that reciprocates the feeding portion, wherein the switcher is capable of switching between operation and non-operation of the feeding piston, and wherein the switcher is configured to switch the feeding piston in non-operation even when the cap portion is closed to the magazine.

14. The driving tool according to claim 13, wherein the feeding portion includes:

a feeding member that is engaged with the connected fastener and is capable of pushing out the connected fastener to the injection passage by reciprocating along the fastener supply path; and a one-way member that regulates the connected fastener from returning toward the magazine, and the switcher is capable of alternately switching between the feeding-enabled state and the feeding-disabled state by switching an operation of at least one of the feeding member and the one-way member.

15. The driving tool according to claim 14, wherein the feeding portion includes a feeding cylinder that slidably accommodates the feeding piston, the feeding piston is operable by supplying compressed air to the feeding cylinder, and the switcher includes a valve portion that opens and closes an air supply path for supplying the compressed air to the feeding cylinder.

16. A driving tool comprising:

an injection passage provided with an injection port for injecting at least one fastener of a connected fastener obtained by connecting a plurality of fasteners;

a feeding portion that supplies the fastener to the injection passage;

a driving-out portion configured to drive out the fastener supplied to the injection passage from the injection port;

a nose portion in which the injection passage for guiding the injection of the fastener is formed;

a fastener supply path configured to guide the connected fastener pulled out from a magazine to the injection passage;

a feeding portion configured to sequentially feed the fastener from the fastener supply path to the injection passage; and a switcher configured to switch between a feeding-enabled state in which the feeding portion feeds the fastener to the injection passage, and a feeding-disabled state in which the feeding portion does not feed the fastener to the injection passage, wherein the driving-out portion is configured to operate such that a driver moves in the injection passage without driving out the fastener from the injection port in a state where the connected fastener is held in the feeding portion, wherein the feeding portion includes:

a feeding member that is engaged with the connected fastener and is capable of pushing out the connected fastener to the injection passage by reciprocating along the fastener supply path;

a one-way member that regulates the connected fastener from returning toward the magazine; and a feeding piston that reciprocates the feeding member, wherein the switcher is capable of alternately switching between the feeding-enabled state and the feeding-disabled state by switching an operation of at least one of the feeding member and the one-way member, wherein the switcher is capable of setting a feeding operation of the feeding portion to not be executed by switching an operation range of the feeding piston, and wherein the switcher includes a locking portion configured to physically limit movement of the feeding piston.

17. A driving tool comprising:

an injection passage provided with an injection port for injecting at least one fastener of a connected fastener obtained by connecting a plurality of fasteners;

a feeding portion that supplies the fastener to the injection passage;

a driving-out portion configured to drive out the fastener supplied to the injection passage from the injection port;

a nose portion in which the injection passage for guiding the injection of the fastener is formed;

a fastener supply path configured to guide the connected fastener pulled out from a magazine to the injection passage;

a feeding portion configured to sequentially feed the fastener from the fastener supply path to the injection passage; and a switcher configured to switch between a feeding-enabled state in which the feeding portion feeds the fastener to the injection passage, and a feeding-disabled state in which the feeding portion does not feed the fastener to the injection passage, wherein the driving-out portion is configured to operate such that a driver moves in the injection passage without driving out the fastener from the injection port in a state where the connected fastener is held in the feeding portion, wherein the feeding portion includes:

a feeding member that is engaged with the connected fastener and is capable of pushing out the connected fastener to the injection passage by reciprocating along the fastener supply path; and a one-way member that regulates the connected fastener from returning toward the magazine, wherein the switcher is capable of alternately switching between the feeding-enabled state and the feeding-disabled state by switching an operation of at least one of the feeding member and the one-way member, and wherein, when the one-way member is set to not regulate the movement of the connected fastener, the switcher is capable of setting a feeding operation of the feeding portion to not be executed.

18. The driving tool according to claim 17, wherein the switcher is capable of holding the one-way member at a position where the one-way member does not interfere with the connected fastener.

19. The driving tool according to claim 18, wherein the one-way member regulates the movement of the connected fastener by protruding to the fastener supply path, and the switcher does not cause the one-way member to interfere with the connected fastener by retracting the one-way member from the fastener supply path.

* * * * *